US00RE48489E

(19) United States
(12) Reissued Patent
Hussell et al.

(10) Patent Number: US RE48,489 E
(45) Date of Reissued Patent: Mar. 30, 2021

(54) GAS COOLED LED LAMP

(71) Applicant: Ideal Industries Lighting LLC, Durham, NC (US)

(72) Inventors: Christopher P. Hussell, Cary, NC (US); John Adam Edmond, Durham, NC (US); Gerald H. Negley, Chapel Hill, NC (US); Curt Progl, Raleigh, NC (US); Mark Edmond, Raleigh, NC (US); Praneet Athalye, Morrisville, NC (US); Charles M. Swoboda, Cary, NC (US); Antony Paul van de Ven, Hong Kong (CN); Paul Kenneth Pickard, Acton, CA (US); Bart P. Reier, Cary, NC (US); James Michael Lay, Apex, NC (US); Peter E. Lopez, Cary, NC (US)

(73) Assignee: IDEAL Industries Lighting LLC, Durham, NC (US)

(21) Appl. No.: 15/904,789

(22) Filed: Feb. 26, 2018

Related U.S. Patent Documents

Reissue of:
(64) Patent No.: 9,353,937
Issued: May 31, 2016
Appl. No.: 14/268,003
Filed: May 2, 2014

U.S. Applications:
(60) Division of application No. 13/774,193, filed on Feb. 22, 2013, now Pat. No. 8,757,839, which is a
(Continued)

(51) Int. Cl.
*F21K 9/232* (2016.01)
*F21V 29/65* (2015.01)
(Continued)

(52) U.S. Cl.
CPC ..... *F21K 9/232* (2016.08); *F21V 29/65* (2015.01); *F21V 29/85* (2015.01); *F21V 3/061* (2018.02);
(Continued)

(58) Field of Classification Search
CPC ..... F21V 29/004; F21V 29/85; F21V 29/65; F21V 29/74; F21V 29/75; F21V 3/061;
(Continued)

(56) References Cited

U.S. PATENT DOCUMENTS 3,581,162 A 5/1971 Wheatley
3,936,686 A 2/1976 Moore
(Continued)

FOREIGN PATENT DOCUMENTS

CN 100552286 C 10/2009
CN 101910707 A 12/2010
(Continued)

OTHER PUBLICATIONS

Panasonic, Screw Type 4W LED Bulb Equivalent to 20W, http://www.panasonic.co.uk/html/en_GB/Products/Lighting/LED+Lamps/LDAHV4L27CG/Overview/7848548/index.html.
(Continued)

*Primary Examiner* — Minh Nguyen
(74) *Attorney, Agent, or Firm* — Withrow & Terranova, P.L.L.C.

(57) ABSTRACT

In one embodiment, a lamp comprises an optically transmissive enclosure. An LED array is disposed in the optically transmissive enclosure operable to emit light when energized through an electrical connection. A gas is contained in the enclosure to provide thermal coupling to the LED array. The gas may include oxygen.

32 Claims, 43 Drawing Sheets

Related U.S. Application Data continuation-in-part of application No. 13/467,670, filed on May 9, 2012, now Pat. No. 9,322,543, which is a continuation-in-part of application No. 13/446,759, filed on Apr. 13, 2012, now Pat. No. 9,395,051.

(60) Provisional application No. 61/738,668, filed on Dec. 18, 2012, provisional application No. 61/712,585, filed on Oct. 11, 2012, provisional application No. 61/716,818, filed on Oct. 22, 2012, provisional application No. 61/670,686, filed on Jul. 12, 2012.

(51) Int. Cl.

| | |
|---|---|
| ***F21V 29/85*** | (2015.01) |
| ***F21V 3/06*** | (2018.01) |
| ***F21Y 107/30*** | (2016.01) |
| ***F21Y 107/40*** | (2016.01) |
| ***F21V 29/75*** | (2015.01) |
| ***F21Y 107/00*** | (2016.01) |
| ***F21V 3/10*** | (2018.01) |
| ***F21V 29/74*** | (2015.01) |
| ***F21Y 115/10*** | (2016.01) |

(52) U.S. Cl.

CPC ..... *F21V 3/10* (2018.02); *F21V 29/74* (2015.01); *F21V 29/75* (2015.01); *F21Y 2107/00* (2016.08); *F21Y 2107/30* (2016.08); *F21Y 2107/40* (2016.08); *F21Y 2115/10* (2016.08)

(58) Field of Classification Search

CPC ..... F21V 3/10; F21K 9/232; F21Y 2115/10; F21Y 2107/00; F21Y 2017/30; F21Y 2107/40

See application file for complete search history.

(56) References Cited

U.S. PATENT DOCUMENTS

| | | | | |
|---|---|---|---|---|
| 5,463,280 | A | 10/1995 | Johnson | |
| 5,561,346 | A | 10/1996 | Byrne | |
| 5,585,783 | A | 12/1996 | Hall | |
| 5,655,830 | A | 8/1997 | Ruskouski | |
| 5,688,042 | A | 11/1997 | Madadi et al. | |
| 5,806,965 | A | 9/1998 | Deese | |
| 5,843,808 | A | 12/1998 | Karnezos | |
| 5,947,588 | A | 9/1999 | Huang | |
| 5,949,347 | A | 9/1999 | Wu | |
| 5,952,916 | A | 9/1999 | Yamabe | |
| 6,161,910 | A | 12/2000 | Reisenauer et al. | |
| 6,220,722 | B1 | 4/2001 | Begemann | |
| 6,227,679 | B1 | 5/2001 | Zhang et al. | |
| 6,234,648 | B1 | 5/2001 | Borner et al. | |
| 6,250,774 | B1 | 6/2001 | Begemann et al. | |
| 6,276,822 | B1 | 8/2001 | Bedrosian et al. | |
| 6,414,801 | B1 | 7/2002 | Roller | |
| 6,425,678 | B1 | 7/2002 | Verdes et al. | |
| 6,452,217 | B1 | 9/2002 | Wojnarowski et al. | |
| 6,465,961 | B1 | 10/2002 | Cao | |
| 6,523,978 | B1 | 2/2003 | Huang | |
| 6,550,953 | B1 | 4/2003 | Ichikawa et al. | |
| 6,634,770 | B2 | 10/2003 | Cao | |
| 6,635,987 | B1 | 10/2003 | Wojnarowski et al. | |
| 6,659,632 | B2 | 12/2003 | Chen | |
| 6,709,132 | B2 | 3/2004 | Ishibashi | |
| 6,746,885 | B2 | 6/2004 | Cao | |
| 6,803,607 | B1 | 10/2004 | Chan et al. | |
| 6,848,819 | B1 | 2/2005 | Arndt et al. | |
| 6,853,151 | B2 | 2/2005 | Leong | |
| 6,864,513 | B2 | 3/2005 | Lin et al. | |
| 6,936,855 | B1 | 8/2005 | Harrah | |
| 6,948,829 | B2 | 9/2005 | Verdes et al. | |
| 6,982,518 | B2 | 1/2006 | Chou et al. | |
| 7,048,412 | B2 | 5/2006 | Martin et al. | |
| 7,080,924 | B2 | 7/2006 | Tseng et al. | |
| 7,086,756 | B2 | 8/2006 | Maxik | F21K 9/90 362/249.04 |
| 7,086,767 | B2 | 8/2006 | Sidwell et al. | |
| 7,144,135 | B2 | 12/2006 | Martin et al. | |
| 7,165,866 | B2 | 1/2007 | Li | |
| 7,172,314 | B2 | 2/2007 | Currie et al. | |
| 7,213,940 | B1 | 5/2007 | Van De Ven et al. | |
| 7,354,174 | B1 | 4/2008 | Yan | |
| 7,396,142 | B2 | 7/2008 | Laizure, Jr. et al. | |
| 7,434,964 | B1 | 10/2008 | Zheng et al. | |
| 7,600,882 | B1 | 10/2009 | Morejon et al. | |
| 7,726,836 | B2 | 6/2010 | Chen | |
| 7,819,562 | B2 | 10/2010 | Freeman et al. | |
| 7,824,065 | B2 | 11/2010 | Maxik | |
| 7,938,562 | B2 | 5/2011 | Ivey et al. | |
| 7,964,883 | B2 | 6/2011 | Mazzochette et al. | |
| 7,965,023 | B1 | 6/2011 | Liang | |
| 8,021,025 | B2 | 9/2011 | Lee | |
| 8,132,934 | B2 | 3/2012 | An | |
| 8,253,316 | B2 | 8/2012 | Sun et al. | |
| 8,272,762 | B2 | 9/2012 | Maxik et al. | |
| 8,274,241 | B2 | 9/2012 | Guest et al. | |
| 8,277,082 | B2 | 10/2012 | Dassanayake et al. | |
| 8,282,249 | B2 | 10/2012 | Liang et al. | |
| 8,282,250 | B1 | 10/2012 | Dassanayake et al. | |
| 8,292,468 | B2 | 10/2012 | Narendran et al. | |
| 8,322,896 | B2 | 12/2012 | Falicoff et al. | |
| 8,371,722 | B2 | 2/2013 | Carroll | |
| 8,400,051 | B2 | 3/2013 | Hakata et al. | |
| 8,408,748 | B2 | 4/2013 | Janik et al. | |
| 8,415,865 | B2 | 4/2013 | Liang et al. | |
| 8,421,320 | B2 | 4/2013 | Chuang | |
| 8,421,321 | B2 | 4/2013 | Chuang | |
| 8,421,322 | B2 | 4/2013 | Carroll et al. | |
| 8,427,037 | B2 | 4/2013 | Liang et al. | |
| 8,449,154 | B2 | 5/2013 | Uemoto et al. | |
| 8,476,836 | B2 | 7/2013 | van de Ven et al. | |
| D687,580 | S | 8/2013 | Reier et al. | |
| 8,502,468 | B2 | 8/2013 | Li et al. | |
| 8,556,465 | B2 | 10/2013 | Lee et al. | |
| D693,948 | S | 11/2013 | Reier et al. | |
| 8,591,062 | B2 | 11/2013 | Hussell et al. | |
| 8,641,237 | B2 | 2/2014 | Chuang | |
| 8,653,723 | B2 | 2/2014 | Cao et al. | |
| 8,680,754 | B2 | 3/2014 | Premysler | |
| D702,375 | S | 4/2014 | Pickard et al. | |
| 8,696,168 | B2 | 4/2014 | Li et al. | |
| 8,740,415 | B2 | 6/2014 | Wheelock | |
| 8,742,671 | B2 | 6/2014 | van de Ven et al. | |
| 8,750,671 | B1 | 6/2014 | Kelly et al. | |
| 8,752,983 | B2 | 6/2014 | Hussell et al. | |
| 8,752,984 | B2 | 6/2014 | Lenk et al. | |
| 8,757,839 | B2 | 6/2014 | Hussell et al. | |
| 8,760,042 | B2 | 6/2014 | Sakai et al. | |
| 8,791,641 | B2 | 7/2014 | van de Ven et al. | |
| 8,810,144 | B2 | 8/2014 | Hu et al. | |
| 8,823,271 | B2 | 9/2014 | van de Ven et al. | |
| D714,971 | S | 10/2014 | Negley et al. | |
| 8,853,958 | B2 | 10/2014 | Athalye et al. | |
| 8,858,027 | B2 * | 10/2014 | Takeuchi | F21V 23/001 362/249.02 |
| 9,016,901 | B2 | 4/2015 | Janik et al. | |
| 9,030,120 | B2 | 5/2015 | Pickard et al. | |
| D732,210 | S | 6/2015 | Pickard et al. | |
| 9,101,021 | B2 | 8/2015 | Lys | |
| 9,131,561 | B2 | 9/2015 | Athalye | |
| 9,134,006 | B2 | 9/2015 | Rodgers et al. | |
| 9,234,638 | B2 | 1/2016 | Hussell et al. | |
| 9,261,242 | B2 * | 2/2016 | Ge | F21V 19/003 |
| 9,310,028 | B2 | 4/2016 | Hussell et al. | |
| 9,310,065 | B2 | 4/2016 | Hussell et al. | |
| 9,322,543 | B2 | 4/2016 | Hussell et al. | |
| 9,335,531 | B2 | 5/2016 | Athalye et al. | |
| 9,353,937 | B2 | 5/2016 | Hussell et al. | |
| 9,395,051 | B2 | 7/2016 | Hussell et al. | |
| 9,395,074 | B2 | 7/2016 | Hussell et al. | |
| 9,410,687 | B2 | 8/2016 | Hussell et al. | |

(56) References Cited

U.S. PATENT DOCUMENTS

| | | | | |
|---|---|---|---|---|
| 9,810,379 | B2 | 11/2017 | Hussell et al. | |
| 9,951,909 | B2 | 4/2018 | Progl et al. | |
| 2001/0026440 | A1 | 10/2001 | Melberg et al. | |
| 2003/0063476 | A1 | 4/2003 | English et al. | |
| 2003/0214810 | A1 | 11/2003 | Zhang | |
| 2004/0201990 | A1 | 10/2004 | Meyer | F21V 3/00 362/255 |
| 2005/0030761 | A1 | 2/2005 | Burgess | |
| 2005/0174769 | A1 | 8/2005 | Yong et al. | |
| 2005/0207152 | A1 | 9/2005 | Maxik | |
| 2005/0254264 | A1 | 11/2005 | Sidwell et al. | |
| 2006/0193130 | A1 | 8/2006 | Ishibashi | |
| 2007/0267976 | A1 | 11/2007 | Bohler et al. | |
| 2007/0268694 | A1 | 11/2007 | Bailey et al. | |
| 2008/0037255 | A1 | 2/2008 | Wang | |
| 2008/0253125 | A1 | 10/2008 | Kang et al. | |
| 2008/0310158 | A1 | 12/2008 | Harbers et al. | |
| 2008/0316755 | A1 | 12/2008 | Zheng et al. | |
| 2009/0050907 | A1 | 2/2009 | Yuan et al. | |
| 2009/0184618 | A1 | 7/2009 | Hakata et al. | |
| 2009/0251882 | A1 | 10/2009 | Ratcliffe | |
| 2010/0244071 | A1* | 9/2010 | Wada | B29C 43/021 257/98 |
| 2010/0259925 | A1 | 10/2010 | Hsu et al. | |
| 2010/0264800 | A1 | 10/2010 | Liu et al. | |
| 2011/0006679 | A1 | 1/2011 | Stekelenburg | |
| 2011/0204393 | A1 | 8/2011 | Masumoto et al. | |
| 2011/0220920 | A1 | 9/2011 | Collins et al. | |
| 2012/0040585 | A1 | 2/2012 | Huang | |
| 2012/0057327 | A1* | 3/2012 | Le et al. | 362/84 |
| 2012/0155059 | A1 | 6/2012 | Hoelen et al. | |
| 2012/0224374 | A1 | 9/2012 | Aliberti | |
| 2012/0268936 | A1 | 10/2012 | Pickard et al. | |
| 2013/0026923 | A1 | 1/2013 | Athalye et al. | |
| 2013/0026925 | A1 | 1/2013 | Ven et al. | |
| 2013/0058098 | A1 | 3/2013 | Kim et al. | |
| 2013/0062641 | A1 | 3/2013 | Lin et al. | |
| 2013/0069535 | A1 | 3/2013 | Athalye | |
| 2013/0069547 | A1 | 3/2013 | van de Ven et al. | |
| 2013/0070461 | A1 | 3/2013 | Pickard | |
| 2013/0088848 | A1 | 4/2013 | Lee et al. | |
| 2013/0127353 | A1 | 5/2013 | Athalye et al. | |
| 2013/0148341 | A1 | 6/2013 | Williams | |
| 2013/0162149 | A1 | 6/2013 | van de Ven et al. | |
| 2013/0162153 | A1 | 6/2013 | van de Ven et al. | |
| 2013/0169159 | A1 | 7/2013 | Lys | |
| 2013/0170175 | A1 | 7/2013 | Negley et al. | |
| 2013/0170221 | A1 | 7/2013 | Isogai et al. | |
| 2013/0242580 | A1 | 9/2013 | Stephany et al. | |
| 2013/0271981 | A1 | 10/2013 | Hussell et al. | |
| 2013/0293135 | A1 | 11/2013 | Hu et al. | |
| 2014/0175473 | A1 | 6/2014 | Donofrio et al. | |
| 2014/0175966 | A1 | 6/2014 | Tan | |
| 2014/0218932 | A1 | 8/2014 | Huang | |
| 2014/0340870 | A1 | 11/2014 | Premysler | |
| 2015/0131293 | A1 | 5/2015 | Bucklen et al. | |
| 2019/0363224 | A1* | 11/2019 | Baretz | H01L 33/504 |
| 2020/0119234 | A1* | 4/2020 | Baretz | H01L 33/52 |

FOREIGN PATENT DOCUMENTS

| | | | |
|---|---|---|---|
| CN | 202048397 | U | 11/2011 |
| DE | 29923899 | U1 | 4/1999 |
| DE | 102007034123 | A1 | 1/2009 |
| EP | 1058221 | A2 | 12/2000 |
| EP | 0890059 | A1 | 6/2004 |
| EP | 0890059 | B1 | 6/2004 |
| EP | 1471564 | A2 | 10/2004 |
| EP | 1645794 | A2 | 4/2006 |
| EP | 1853096 | A2 | 11/2007 |
| EP | 2236907 | A2 | 10/2010 |
| EP | 2413029 | A2 | 2/2012 |
| EP | 2416056 | A2 | 2/2012 |
| GB | 2345954 | A | 7/2000 |
| GB | 2366610 | A | 3/2002 |
| JP | H09265807 | A | 10/1997 |
| JP | 11111819 | A | 4/1999 |
| JP | 2000173304 | A | 6/2000 |
| JP | 2000188001 | | 7/2000 |
| JP | 2000188001 | A | 7/2000 |
| JP | 2001118403 | A | 4/2001 |
| JP | 2007059930 | A | 3/2007 |
| JP | 2008288183 | A | 11/2008 |
| JP | 2009117346 | A | 5/2009 |
| JP | 3153766 | U | 9/2009 |
| JP | 2009277586 | A | 11/2009 |
| TW | M286462 | U | 1/2006 |
| TW | M360982 | U | 7/2009 |
| TW | M412319 | U | 9/2011 |
| WO | 0114789 | A1 | 3/2001 |
| WO | 0124583 | A1 | 4/2001 |
| WO | 0160119 | A2 | 8/2001 |
| WO | 2011098358 | A1 | 8/2011 |
| WO | 2012011279 | A1 | 1/2012 |
| WO | 2012031533 | A1 | 3/2012 |
| WO | 2013040506 | A1 | 3/2013 |

OTHER PUBLICATIONS

3 Watt—Dimmable, LED Light Bulb, 1000Bulbs.com.
TCP—3 Watt—Dimmable LED—G16.5, 1000Bulbs.com.
Energy Star® Program Requirements for Integral LED Lamps, Mar. 22, 2010, pp. 1-30.
TCP PRO, LED Dimmable Decorative Series.
Lighting Science, Introduction to LSGC, Satellite Beach, Florida, Dec. 11, 2012.
Cree, Inc., International Application No. Pct/Us2014/036283, International Search Report and Written Opinion, Feb. 19, 2015.
U.S. Appl. No. 13/340,928, filed Dec. 30, 2011.
U.S. Appl. No. 13/462,388, filed May 2, 2012.
U.S. Appl. No. 13/662,618, filed Oct. 29, 2012.
U.S. Appl. No. 13/467,670, filed May 9, 2012.
U.S. Appl. No. 13/446,759, filed Apr. 13, 2012.
U.S. Appl. No. 61/738,668, filed Dec. 18, 2012.
U.S. Appl. No. 61/712,585, filed Oct. 11, 2012.
U.S. Appl. No. 61/716,818, filed Oct. 22, 2012.
U.S. Appl. No. 61/670,686, filed Jul. 12, 2012.
U.S. Appl. No. 13/758,565, filed Feb. 4, 2013.
U.S. Appl. No. 12/775,842, filed May 7, 2010.
U.S. Appl. No. 13/192,755, filed Jul. 28, 2011.
U.S. Appl. No. 13/339,974, filed Dec. 29, 2011.
U.S. Appl. No. 13/235,103, filed Sep. 16, 2011.
U.S. Appl. No. 13/360,145, filed Jan. 27, 2012.
U.S. Appl. No. 13/338,095, filed Dec. 27, 2011.
U.S. Appl. No. 13/338,076, filed Dec. 27, 2011.
U.S. Appl. No. 13/405,891, filed Feb. 27, 2012.
U.S. Appl. No. 13/781,847, filed Mar. 1, 2013.
U.S. Appl. No. 13/774,078, filed Feb. 22, 2013.
U.S. Appl. No. 13/781,844, filed Mar. 1, 2013.
U.S. Appl. No. 13/657,421, filed Oct. 22, 2012.
U.S. Appl. No. 13/341,337, filed Dec. 30, 2011.
Cree, Inc., International Application No. PCT/US2013/035400 Invitation to Pay Additional Fees, and, Where Applicable, Protest Fee, Jun. 5, 2013.
Cree, Inc., International Application No. PCT/US2013/035403 International Search Report and Written Opinion, May 29, 2013.
Cree, Inc., International Application No. PCT/US2013/035400, International Search Report and Written Opinion, Sep. 17, 2013.
Cree, Inc., International Application No. PCT/US2014/052120, International Search Report and Written Opinion, Nov. 11, 2014.
Cree, Inc., European Application No. 13716151.9, Office Action, Nov. 28, 2014.
Cree, Inc., International Application No. PCT/US2014/036283, Invitation to Pay Additional Fees and, Where Applicable, Protest Fee, Sep. 1, 2014.
Cree, Inc. International Application No. PCT/US2014/045951, International Search Report and Written Opinion, Sep. 15, 2014.

(56) References Cited

OTHER PUBLICATIONS

Cree, Inc., Taiwanese Application No. 102113095, Official Letter, Nov. 30, 2015.

* cited by examiner

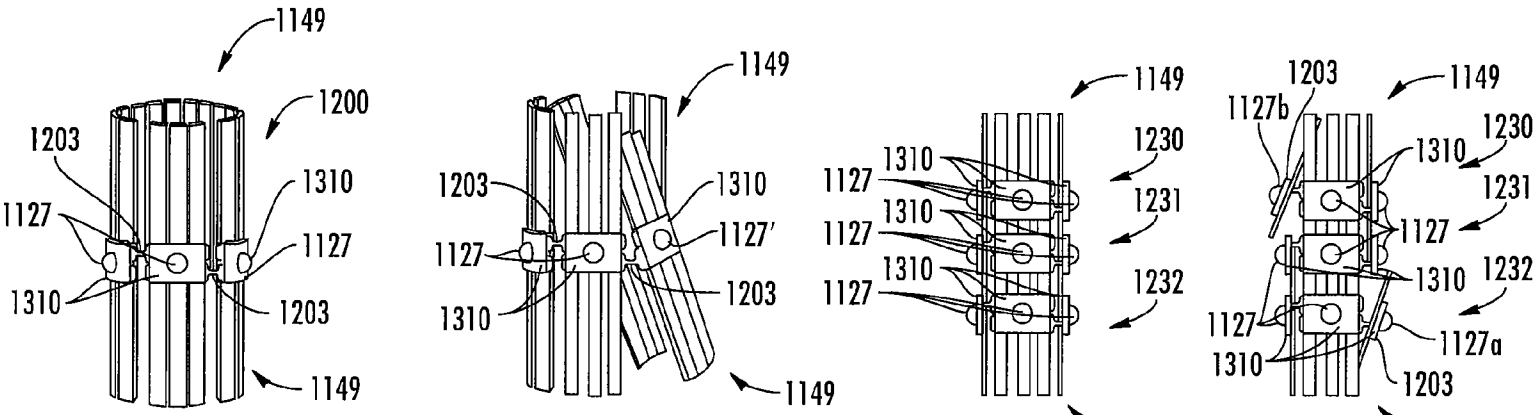
FIG. 25
FIG. 26
FIG. 27
FIG. 28
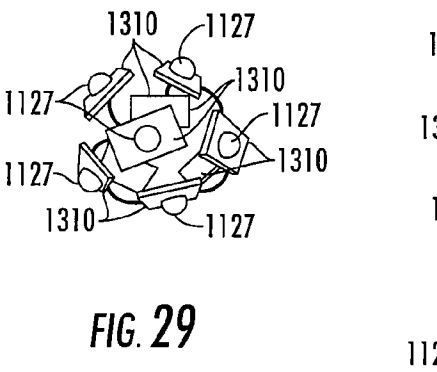
FIG. 30
FIG. 29
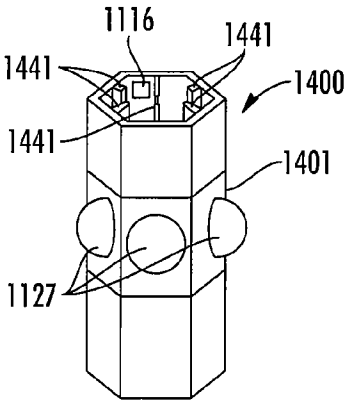
FIG. 37

GAS COOLED LED LAMP

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

[This] *The present* application is a *reissue of U.S. patent application Ser. No. 14/268,003, filed May 2, 2014, now U.S. Pat. No. 9,353,937, issued May 31, 2016 which is a* divisional of U.S. application Ser. No. 13/774,193, as filed on Feb. 22, 2013, now U.S. Pat. No. 8,757,839, which is incorporated by reference herein in its entirety, which in turn claims benefit of priority under 35 U.S.C. [§ 119(e)] *§ .119(e)* to the filing date of U.S. Provisional Application No. 61/738,668, as filed on Dec. 18, 2012, which is incorporated by reference herein in its entirety; and to the filing date of U.S. Provisional Application No. 61/712,585, as filed on Oct. 11, 2012, which is incorporated by reference herein in its entirety; and to the filing date of U.S. Provisional Application No. 61/716,818, as filed on Oct. 22, 2012, which is incorporated by reference herein in its entirety; and to the filing date of U.S. Provisional Application No. 61/670,686, as filed on Jul. 12, 2012. U.S. application Ser. No. 13/774,193, now U.S. Pat. No. 8,757,839, is also a continuation-in-part (CIP) of U.S. application Ser. No. 13/467,670, as filed on May 9, 2012, now U.S. [Publication No. 2013/0271987,] *Pat. No. 9,322,543*, which is incorporated by reference herein in its entirety, and which is a continuation-in-part (CIP) of U.S. application Ser. No. 13/446,759, as filed on Apr. 13, 2012, now U.S. [Publication No. 2013/0271972,] *Pat. No. 9,395,051*, which is incorporated by reference herein in its entirety.

BACKGROUND

Light emitting diode (LED) lighting systems are becoming more prevalent as replacements for older lighting systems. LED systems are an example of solid state lighting (SSL) and have advantages over traditional lighting solutions such as incandescent and fluorescent lighting because they use less energy, are more durable, operate longer, can be combined in multi-color arrays that can be controlled to deliver virtually any color light, and generally contain no lead or mercury. A solid-state lighting system may take the form of a lighting unit, light fixture, light bulb, or a "lamp."

An LED lighting system may include, for example, a packaged light emitting device including one or more light emitting diodes (LEDs), which may include inorganic LEDs, which may include semiconductor layers forming p-n junctions and/or organic LEDs (OLEDs), which may include organic light emission layers. Light perceived as white or near-white may be generated by a combination of red, green, and blue ("RGB") LEDs. Output color of such a device may be altered by separately adjusting supply of current to the red, green, and blue LEDs. Another method for generating white or near-white light is by using a lumiphor such as a phosphor. Still another approach for producing white light is to stimulate phosphors or dyes of multiple colors with an LED source. Many other approaches can be taken.

An LED lamp may be made with a form factor that allows it to replace a standard incandescent bulb, or any of various types of fluorescent lamps. LED lamps often include some type of optical element or elements to allow for localized mixing of colors, collimate light, or provide a particular light pattern. Sometimes the optical element also serves as an envelope or enclosure for the electronics and or the LEDs in the lamp.

Since, ideally, an LED lamp designed as a replacement for a traditional incandescent or fluorescent light source needs to be self-contained; a power supply is included in the lamp structure along with the LEDs or LED packages and the optical components. A heatsink is also often needed to cool the LEDs and/or power supply in order to maintain appropriate operating temperature. The power supply and especially the heatsink can often hinder some of the light coming from the LEDs or limit LED placement. Depending on the type of traditional bulb for which the solid-state lamp is intended as a replacement, this limitation can cause the solid-state lamp to emit light in a pattern that is substantially different than the light pattern produced by the traditional light bulb that it is intended to replace.

Traditional incandescent bulbs typically comprise a filament supported on support wires where the support wires are mounted on a glass stem that is fused to the bulb. Wires are run through the stem to provide electric current from the bulb's base to the filament. The stem is fused to the enclosure using heat to melt the glass. In traditional incandescent bulbs fusing the stem to the enclosure does not present a particular problem because the heat generated during the fusing operation does not adversely affect the bulb components. However, such an arrangement has been considered to be unsuitable for LED lamp designs because the heat generated during the manufacturing process is known to have an adverse impact on the LEDs. Heat such as applied during the fusing operation can degrade the performance of the LEDs in use such as by substantially shortening LED life. The heat may also affect the solder connection between the LEDs and the PCB, base or other submount where the LEDs may loosen or become dislodged from the PCB, base or other submount. Thus, traditional manufacturing processes and structures have been considered wholly unsuitable for LED based lighting technologies.

SUMMARY OF THE INVENTION

In one embodiment, a lamp comprises an optically transmissive enclosure. An LED array is disposed in the optically transmissive enclosure operable to emit light when energized through an electrical connection. A gas is contained in the enclosure to provide thermal coupling to the LED array. A heat sink structure is thermally coupled to the LED array for transmitting heat from the LED array to the gas. The heat sink structure is at a distance from the enclosure of less than 8 mm.

In one embodiment, a lamp comprises an optically transmissive enclosure. An LED array is disposed in the optically transmissive enclosure to be operable to emit light when energized through an electrical connection. A gas is contained in the enclosure to provide thermal coupling to the LED array. A heat sink structure is thermally coupled to the LED array for transmitting heat from the LED array to the gas, where the heat sink structure is surrounded by the gas.

In one embodiment, a lamp comprises an optically transmissive enclosure. An LED array is disposed in the optically transmissive enclosure and is operable to emit light when energized through an electrical connection. The LED array is thermally coupled to the enclosure. A base forms part of the electrical connection to the LED assembly and comprises an upper part that is connected to the enclosure and a lower part that is joined to the upper part.

In one embodiment, a lamp comprises an optically transmissive enclosure. An LED array is disposed in the optically transmissive enclosure to be operable to emit light when energized through an electrical connection. The LED array is mounted on an LED assembly comprising a heat sink structure where the LED array is disposed toward one side of the LED assembly with the heat sink structure extending toward the opposite side of the LED assembly. The LED array is positioned substantially in the center of the enclosure. A gas is contained in the enclosure to provide thermal coupling to the LED array.

In one embodiment, a lamp comprises an optically transmissive sealed enclosure. An LED is disposed in the optically transmissive enclosure operable to emit light when energized through an electrical connection. A gas is contained in the enclosure to provide thermal coupling to the LED array where the gas comprises oxygen.

The LED array may be disposed at one end of an LED assembly and the heat sink structure may extend at least substantially to one side of the LED array. The heat sink structure may comprise fins. The LED array may be disposed toward a top of the LED assembly and the heat sink structure may extend toward a bottom of the LED assembly. The LED array may be disposed on an LED assembly and the LED assembly may be supported on a glass stem where the heat sink structure at least partially surrounds the glass stem. The LED array may be positioned such that it is disposed substantially in the center of the enclosure and the heat sink structure is offset to one side of the enclosure. The heat sink structure may contact the enclosure. The gas may comprise helium. The gas may also comprise hydrogen.

An Edison screw may be formed on the base. The base may have a relatively narrow proximal end that is secured to the enclosure where a diameter of the base gradually increases from the proximal end to a point along the base. A portion of the base with a larger diameter may define an internal space for receiving a power supply. The base may gradually narrow from the widest diameter portion to the Edison screw. An external surface of the base may be formed by a smooth curved shape. The external surface of the base may transition from a relatively smaller concave portion to a relatively larger convex portion from the proximal end to the Edison screw.

The electrical connection may comprise a thermally resistive electrical path that prevents overtemperature of the LED array. The thermally resistive electrical path may comprise a wire, the wire having a dimension such that the dimension prevents overtemperature of the LED array.

The oxygen may be provided in the enclosure in an amount that is sufficient to prevent degradation of the LED. The lamp may emit light equivalent to a 40 watt equivalent bulb and the gas may comprise at least approximately 50% by volume of oxygen. The gas may comprise a second thermally conductive gas. The second thermally conductive gas may have a higher thermal conductivity than oxygen. The second thermally conductive gas may comprise helium. The gas may have a thermal conductivity of about at least 87.5 mW/m-K. The lamp may emit light equivalent to a 40 watt equivalent bulb and the gas may comprise approximately 40-60% by volume of oxygen. The lamp may emit light equivalent to a 40 watt equivalent bulb and the gas may comprise approximately 50% by volume of oxygen. The lamp may emit light equivalent to a 60 watt equivalent bulb and the gas may comprise at least approximately 80% by volume of oxygen. The lamp may emit light equivalent to a 60 watt equivalent bulb and the gas may comprise approximately 100% by volume of oxygen. The lamp may emit light equivalent to a 60 watt equivalent bulb and the gas may comprise approximately 90% by volume of oxygen. The lamp may comprise a gas movement device. The gas movement device may comprise at least one of an electric fan, a rotary fan, a piezoelectric fan, corona or ion wind generator, and diaphragm pump.

BRIEF DESCRIPTION OF THE DRAWINGS

In FIG. 3 the lens of the LED lamp is shown as completely transparent to make interior detail visible notwithstanding the fact that a diffusive lens material might be used in some embodiments.

FIG. 5 shows an alternate type of submount and packaged LED devices that can be used.

FIG. 25 is a perspective view of a lead frame configuration usable in embodiments of the LED assembly of the invention.

FIG. 26 is a perspective view of another lead frame configuration usable in embodiments of the LED assembly of the invention.

FIG. 27 is a side view of yet another lead frame configuration usable in embodiments of the LED assembly of the invention.

FIG. 28 is a side view of still another lead frame configuration usable in embodiments of the LED assembly of the invention.

FIG. 29 is a perspective view of another lead frame configuration usable in embodiments of the LED assembly of the invention.

FIG. 30 is a side view of yet another lead frame configuration usable in embodiments of the LED assembly of the invention.

FIG. 37 is a perspective view of an extruded submount usable in embodiments of the LED assembly of the invention.

FIGS. 57a-58b show additional embodiments of portions of the lamp of the invention.

DETAILED DESCRIPTION

Figure 1:
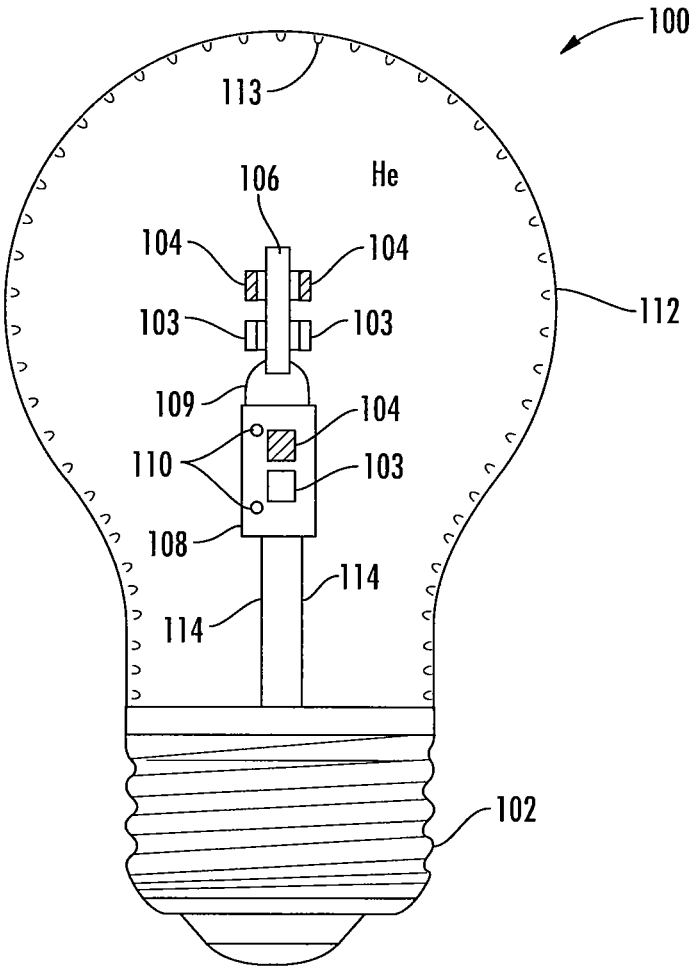
FIG. 1 is a side view of an LED lamp according to embodiments of the invention. The optical enclosure of the lamp is shown as cross-sectioned so that the inter detail may be appreciated.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Unless otherwise expressly stated, comparative, quantitative terms such as "less" and "greater", are intended to encompass the concept of equality. As an example, "less" can mean not only "less" in the strictest mathematical sense, but also, "less than or equal to."

The terms "LED" and "LED device" as used herein may refer to any solid-state light emitter. The terms "solid state light emitter" or "solid state emitter" may include a light emitting diode, laser diode, organic light emitting diode, and/or other semiconductor device which includes one or more semiconductor layers, which may include silicon, silicon carbide, gallium nitride and/or other semiconductor materials, a substrate which may include sapphire, silicon, silicon carbide and/or other microelectronic substrates, and one or more contact layers which may include metal and/or other conductive materials. A solid-state lighting device produces light (ultraviolet, visible, or infrared) by exciting electrons across the band gap between a conduction band and a valence band of a semiconductor active (light-emitting) layer, with the electron transition generating light at a wavelength that depends on the band gap. Thus, the color (wavelength) of the light emitted by a solid-state emitter depends on the materials of the active layers thereof. In various embodiments, solid-state light emitters may have peak wavelengths in the visible range and/or be used in combination with lumiphoric materials having peak wavelengths in the visible range. Multiple solid state light emitters and/or multiple lumiphoric materials (i.e., in combination with at least one solid state light emitter) may be used in a single device, such as to produce light perceived as white or near white in character. In certain embodiments, the aggregated output of multiple solid-state light emitters and/or lumiphoric materials may generate warm white light output having a color temperature range of from about 2200K to about 6000K.

Solid state light emitters may be used individually or in combination with one or more lumiphoric materials (e.g., phosphors, scintillators, lumiphoric inks) and/or optical elements to generate light at a peak wavelength, or of at least one desired perceived color (including combinations of colors that may be perceived as white). Inclusion of lumiphoric (also called 'luminescent') materials in lighting devices as described herein may be accomplished by direct coating on solid state light emitter, adding such materials to encapsulants, adding such materials to lenses, by embedding or dispersing such materials within lumiphor support elements, and/or coating such materials on lumiphor support elements. Other materials, such as light scattering elements (e.g., particles) and/or index matching materials, may be associated with a lumiphor, a lumiphor binding medium, or a lumiphor support element that may be spatially segregated from a solid state emitter.

Embodiments of the present invention provide a solid-state lamp with centralized light emitters, more specifically, LEDs. Multiple LEDs can be used together, forming an LED array. The LEDs can be mounted on or fixed within the lamp in various ways. In at least some example embodiments, a submount is used. In some embodiments, the submount is light transmissive. A light transmissive submount can be translucent, diffusive, transparent or semi-transparent. The submount can have two or more sides, and LEDs can be included on both or all sides. The centralized nature and minimal and/or light transmissive mechanical support of the LEDs allows the LEDs to be configured near the central portion of the structural envelope of the lamp. In some example embodiments, a gas provides thermal coupling to the LED array in order to cool the LEDs. However, the light transmissive submount can be used with a liquid, a heatsink, or another thermic constituent. Since the LED array can be configured in some embodiments to reside centrally within the structural envelope of the lamp, a lamp can be constructed so that the light pattern is not adversely affected by the presence of a heat sink and/or mounting hardware, or by having to locate the LEDs close to the base of the lamp. If an optically transmissive submount is used, light can pass through the submount making for a more even light distribution pattern in some embodiments. It should also be noted that the term "lamp" is meant to encompass not only a solid-state replacement for a traditional incandescent bulb as illustrated herein, but also replacements for fluorescent bulbs, replacements for complete fixtures, and any type of light fixture that may be custom designed as a solid state fixture for mounting on walls, in or on ceilings, on posts, and/or on vehicles.

FIG. 1 shows a side view of a lamp, 100, according to some embodiments of the present invention. Lamp 100 is an A-series lamp with an Edison base 102, more particularly; lamp 100 is designed to serve as a solid-state replacement for an A19 incandescent bulb. An Edison base herein may be implemented through the use of an Edison cap over a plastic form. The LEDs in the LED array include LEDs 103, which are LED die disposed in an encapsulant such as silicone, and LEDs 104, which are encapsulated with a phosphor to provide local wavelength conversion, as will be described later when various options for creating white light are discussed. The LEDs of the LED array of lamp 100 are mounted on multiple sides of a light transmissive submount and are operable to emit light when energized through an electrical connection. The light transmissive submount includes a top portion 106 and a bottom portion 108. The two portions of the submount are connected by wires 109, which provide structural support as well as an electrical connection. The submount in lamp 100 includes four mounting surfaces or "sides," two on each portion. In some embodiments, a driver or power supply is included with the LED array on the submount. In some cases the driver may be formed by components on a printed circuit board or "PCB." In the case of the embodiments of FIG. 1, power supply components 110 are schematically shown on the bottom portion of the submount.

Still referring to FIG. 1, enclosure 112 is, in some embodiments, a glass enclosure of similar shape to that commonly used in household incandescent bulbs. In this example embodiment, the glass enclosure is coated on the inside with silica 113, providing a diffuse scattering layer that produces a more uniform far field pattern. Wires 114 run between the submount and the lamp base 102 to carry both sides of the supply to provide critical current to the LEDs. Base 102 may include a power supply or driver and form all or a portion of the electrical path between the mains and the LEDs. The base may also include only part of the power supply circuitry while some smaller components reside on the submount. The centralized LED array and any power supply components for lamp 100 in enclosure 112 are cooled by helium gas, or another thermal material which fills or partially fills the optically transmissive enclosure 112 and provides thermal coupling to the LED array. The helium may be under pressure, for example the helium may be at 2 atmospheres, 3, atmospheres, or even higher pressures. With the embodiment of FIG. 1, as with many other embodiments of the invention, the term "electrical path" can be used to refer to the entire electrical path to the LED array, including an intervening power supply disposed between the electrical connection that would otherwise provide power directly to the LEDs and the LED array, or it may be used to refer to the connection between the mains and all the electronics in the lamp, including the power supply. The term may also be used to refer to the connection between the power supply and the LED array. Likewise the term "electrical connection" can refer to the connection to the LED array, to the power supply, or both.

Figure 2:
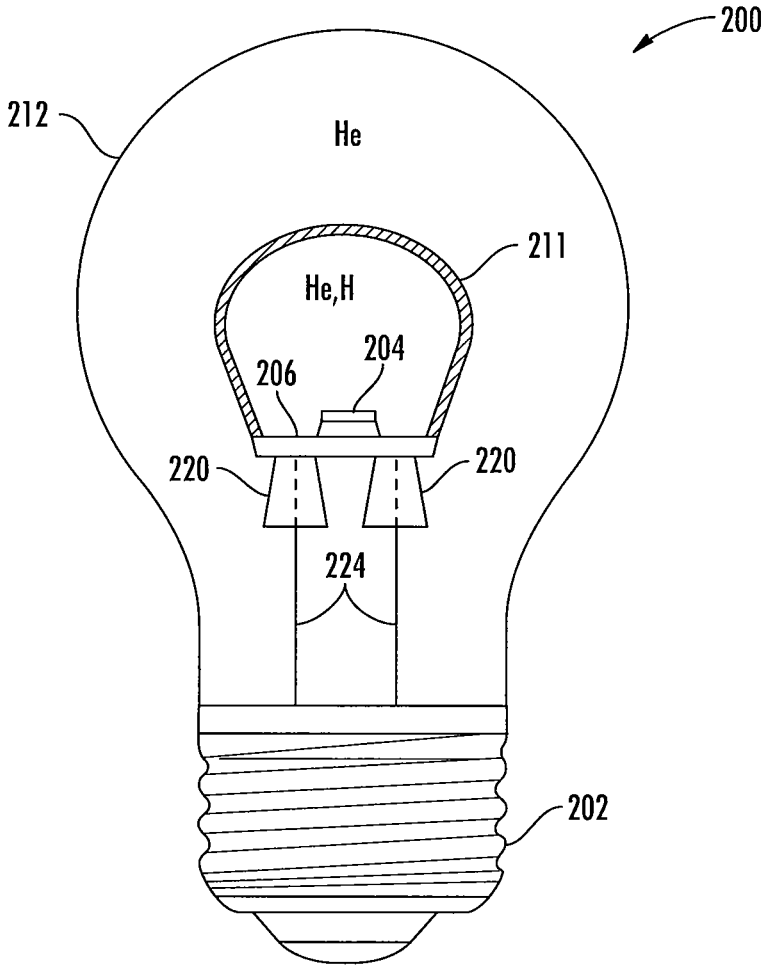
FIG. 2 is a side view of an LED lamp according to other embodiments of the invention. In the case of FIG. 2, the optical enclosure as well as the interior optical envelope of the lamp is shown as cross-sectioned.

FIG. 2 shows a side view of a lamp, 200, according to further embodiments of the present invention. Lamp 200 is again an A-series lamp with an Edison base 202. Lamp 200 includes an LED array that includes a single LED 204 on a submount 206, which may be optically transmissive. Power supply components may be included on the submount or in the base, but are not shown in this case. Lamp 200 includes an optically transmissive inner envelope 211, which is internally or externally coated with phosphor to provide remote wavelength conversion and thus produce substantially white light. The LED array and the power supply for lamp 200 are cooled by a non-explosive mixture of helium gas and hydrogen gas in the inner optical envelope 211 that provides thermal coupling to the LED. Cooling is also provided by helium gas between the inner optical envelope and optical enclosure 212, which again takes the form and shape of the glass envelope of a household incandescent bulb, but can be made out of various materials, including glass with silica coating (not shown) and various types of plastics. For purposes of this disclosure, the outermost optical element of a lamp is typically referred to as an "enclosure" and an internal optical element may be referred to as an "envelope."

Still referring to FIG. 2, lamp 200 includes thermic constituents in addition the above-mentioned gasses. Heatsinks 220 are connected to submount 206 and provide additional coupling between the submount and the helium gas between envelope 211 and enclosure 212. These heatsinks could also be considered part of the submount and/or could actually be formed as part of the submount out of the same material. Each heatsink is a cone-like structure with open space in the center through which wires 224 pass. Wires 224 provide a thermally resistive electrical path between the lamp base and the electronics on submount 206 of lamp 200. The thermal resistance (as opposed to electrical resistance) prevents heat that may be used to seal the lamp during manufacturing from damaging the LEDs and/or the driver for the lamp. Generally, electrical connections for LEDs are designed to minimize thermal resistance to provide additional cooling during operation. However, with the other thermic elements provided to cool the LEDs with embodiments of the invention, the connecting wires to the base can be made thermally resistive to protect the LEDs during manufacture, while still providing power through an electrical connection to the LED and/or the power supply. In the embodiment of FIG. 2, thermal resistance is increased by using small diameter, long wires, but specific wire geometries and/or specific materials can also be used to provide a thermally resistive electrical path to the LED array. It should be noted that a lamp according to embodiments of the invention might include multiple inner envelopes, which can take the form of spheres, tubes or any other shapes.

It should be noted that if a lamp like lamp 200 in FIG. 2 can be the same size as a lamp like that shown in FIG. 1. However, in some embodiments, a lamp like that of FIG. 1 may be designed to be physically smaller than that shown in FIG. 2, for example, lamp 200 of FIG. 2 may have the size and form factor of a standard-sized household incandescent bulb, while lamp 100 of FIG. 1 may have the size and form factor of a smaller incandescent bulb, such as that commonly used in appliances, since space for an inner optical envelope is not required. It should also be noted that in this or any of the embodiments shown here, the optically transmissive enclosure or a portion of the optically transmissive enclosure could be coated or impregnated with phosphor or a diffuser.

Figure 3:
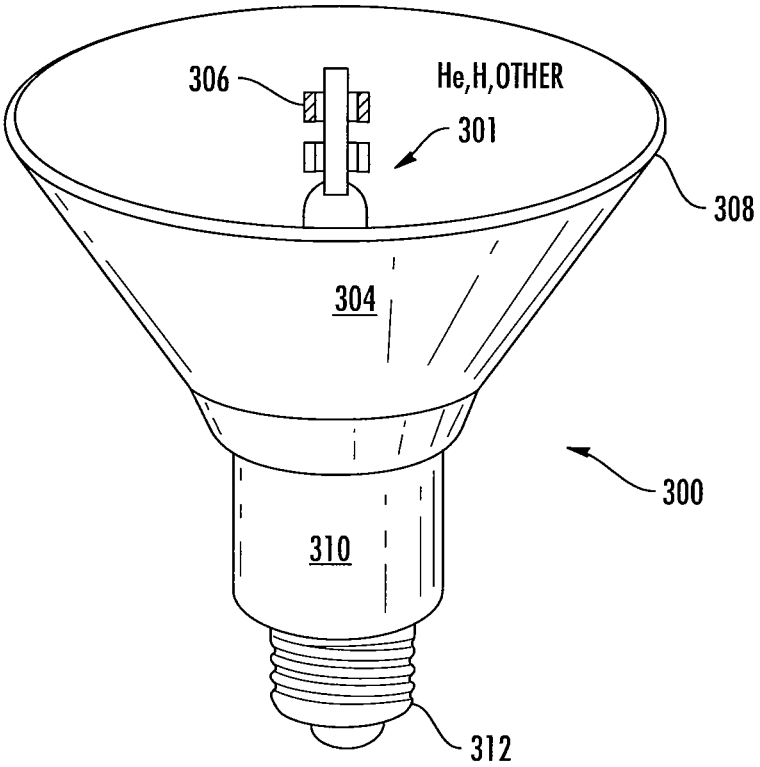
FIG. 3 is a perspective view of an LED lamp according to other embodiments of the invention.

FIG. 3 is a perspective view of a PAR-style lamp 300 such as a replacement for a PAR-38 incandescent bulb. Lamp 300 includes an LED array on submount 301 like that shown in FIG. 1, disposed within an outer reflector 304. The top portion 306 of the submount can be seen through a glass or plastic lens 308, which covers the front of lamp 300. In this case, the power supply (not shown) can be housed in base portion 310 of lamp 300. Lamp 300 again includes an Edison base 312. Reflector 304 and lens 308 together form an optically transmissive enclosure for the lamp, albeit light transmission in this case is directional. Note that a lamp like lamp 300 could be formed with a unitary enclosure, formed as an example from glass, appropriately shaped and silvered or coated on an appropriate portion to form a directional, optically transmissive enclosure. Lamp 300 again includes gas within the optically transmissive enclosure to provide thermal coupling to the LED array and any power supply components that might be included on the submount. In this example embodiment, the gas includes helium and/or hydrogen.

Any of various gasses can be used to provide an embodiment of the invention in which an LED lamp includes gas as a thermic constituent. A combination of gasses can be used. Examples include all those that have been discussed thus far, helium, hydrogen, and additional component gasses, including a chlorofluorocarbon, a hydrochlorofluorocarbon, difluoromethane and pentafluoroethane. Gasses with a thermal conductivity in milliwatts per meter Kelvin (mW/m-K) of from about 45 to about 180 can be made to work well. For purposes of this disclosure, thermal conductivities are given at standard temperature and pressure (STP). Air, Nitrogen and Oxygen have a thermal conductivity of about 26, Helium gas has a thermal conductivity of about 156, and hydrogen gas has a thermal conductivity of about 186, and neon gas has a thermal conductivity of about 49 at 300K. It is to be understood that thermal conductivity values of gasses may change at different pressures and temperatures. Gasses can be used with an embodiment of the invention where the gas has a thermal conductivity of at least about 45 mW/m-K, least about 60 mW/m-K, at least about 70 mW/m-K, least about 100 mW/m-K, at least about 150 mW/m-K, from about 60 to about 180 mW/m-K, or from about 70 to about 150 mW/m-K.

A gas used for cooling in example embodiments of the invention can be pressurized, either negatively or positively. In fact, a gas inserted in the enclosure or internal optical envelope at atmospheric pressure during manufacturing may end up at a slight negative pressure once the lamp is sealed. Under pressure, the thermal resistance of the gas may drop, enhancing cooling properties. The gas inside a lamp according to example embodiments of the invention may be at any pressure from about 0.5 to about 10 atmospheres. It may be at a pressure from about 0.8 to about 1.2 atmospheres, at a pressure of about 2 atmospheres, or at a pressure of about 3 atmospheres. The gas pressure may also range from about 0.8 to about 4 atmospheres.

It should also be noted that a gas used for cooling a lamp need not be a gas at all times. Materials which change phase can be used and the phase change can provide additional cooling. For example, at appropriate pressures, alcohol or water could be used in place of or in addition to other gasses. Porous substrates, envelopes, or enclosure can be used that act as a wick. The diffuser on the lamp can also act as the wick.

The inventors of the present invention have determined that in a sealed environment such as described herein, in some embodiments operating an LED in an oxygen depleted environment may cause degradation of the LED. One result of such degradation is the browning of the silicone that may be used as an encapsulant for the LED chip. It is believed that the browning of the silicone may be caused by a combination of the environment in which the LED is operated (oxygen depleted), contaminants such as organics in the LED assembly or other components in the enclosure, the flux density of the optical energy from the LEDs and/or the thermal energy generated by the LEDs. While the exact cause of the degradation is not known, it has been discovered that the adverse effects may be prevented or reversed by lowering or eliminating the contaminants and/or by operating the LED in an oxygen containing environment. An LED that is operated in an oxygen containing environment does not exhibit the degradation, and the degradation of an LED that occurs due to the lack of oxygen may be reversed by operating the LED in an oxygen containing environment.

The amount of oxygen used in the enclosure may be related to the presence or absence of the contaminants such that in an environment containing few contaminants less oxygen is required and in an environment containing higher levels of contaminants higher levels of oxygen may be required. In some embodiments, no oxygen is required such that the gas may contain only highly efficient thermal gas such as H and/or He. In environments having low levels of contaminants the oxygen may comprise approximately 5%, 4% or less by volume of the total gas in the enclosure such as approximately 1%. The oxygen may comprise less than approximately 50% by volume of the total gas in the enclosure. In some embodiments, the oxygen may comprise less than approximately 40% or less than approximately 25% by volume of the total gas in the enclosure.

In one embodiment, for a 40 watt equivalent bulb having 20 LEDs the gas may comprise at least approximately 50% by volume of oxygen with the remaining gas being a higher thermally conductive gas such as helium or a combination of other more thermally conductive gases such as helium and hydrogen. At a mixture of 50% oxygen and 50% helium the gas has a thermal conductivity of about 87.5 mW/m-K. The greater the volume of oxygen in the enclosure, the better the environment is for preventing the degradation of the LED; however, the greater the volume of a high thermally conductive gas in the enclosure, the better the dissipation of heat from the LED assembly. Because the degradation of the LED may be related to contaminants in the LED assembly, the specific amount of oxygen needed in the enclosure may be determined for a specific application based on the construction of the LED assembly or other components in the enclosure. In some embodiments the gas may comprise at least approximately 40% oxygen by volume with the remaining gas being a higher thermal conductivity gas or a combination of other gases. In some embodiments the gas may comprise approximately 40-60% oxygen by volume with the remaining gas being a higher thermal conductivity gas or a combination of other gases.

In another example embodiment, for a 60 watt equivalent bulb having 20 LEDs the gas may comprise approximately 100% by volume oxygen as the gas in the enclosure. However, because oxygen is not a particularly good thermal conductor the use of about 100% oxygen in the enclosure may not provide sufficient heat transfer from the LED assembly. To increase the heat transfer from the LED assembly a gas movement device may be used such as described herein to circulate the oxygen over the LED assembly to increase the heat transfer from the LED assembly to the gas. As described with respect to FIG. 17, the gas movement device 1116 may comprise an electric fan, a rotary fan, a piezoelectric fan, corona or ion wind generator, synjet diaphragm pump or the like. The increased gas circulation created by the gas movement device compensates for the lower thermal conductivity of the oxygen. While the use of a gas movement device has been described with respect to a gas of approximately 100% oxygen the gas movement device may be used with any gas composition to increase heat transfer from the LED assembly. As previously explained, because the degradation of the LED may be related to the level of contaminants in the enclosure, the specific amount of oxygen needed in the enclosure may be determined for a specific LED assembly being used. In some embodiments, for a 60 watt equivalent bulb the gas may comprise at least approximately 90% oxygen by volume with the remaining gas being a higher thermal conductivity gas or a combination of other gases. In some embodiments the gas may comprise at least approximately 80% oxygen by volume with the remaining gas being a higher thermal conductivity gas or a combination of other gases. Further, it is believed that the degradation occurs at the silicone layer near the LED chip, the degradation may be lessened or eliminated by using different encapsulant materials or different LED structures such that oxygen may not be required in all embodiments.

In some embodiments, the degradation of the LED may be prevented by the construction of the LED. For example, a silicon nitride layer may be included on the light emitting surface and a sealed environment may surround the light emitting surface. In some embodiments, the silicon nitride layer is directly on and covers the light emitting surface. The sealed environment may comprise a sealed gaseous environment as described herein.

The silicon nitride layer may provide an embodiment of a substance blocking or impermeable layer that can prevent substances such as moisture, carbon, and/or Volatile Organic Compounds (VOCs) that contain carbon, from reaching the light emitting surface. The substance blocking layer is directly on, and completely covers, the light emitting surface and in some embodiments, the substance blocking layer may comprise a plurality of sublayers. Moreover, materials other than silicon nitride, such as boron nitride and/or other inorganic/organic materials, may also be used. One such example is described U.S. patent application Ser. No. 13/758,565 filed on Feb. 4, 2013, titled "Lighting Emitting Diodes Including Light Emitting Surface Barrier Layers, and Methods of Fabricating Same," *now U.S. Publication No. 2014/0175473,* the disclosure of which is incorporated by reference herein in its entirety.

Referring to FIGS. 10 through 21 embodiments of a lamp 1000 and an embodiment of a method of making a lamp will be described. The lamp 1000 comprises an enclosure 1112 that is, in some embodiments, a glass, quartz, borosilicate, silicate or other suitable material. In some embodiments, the enclosure is of a similar shape to that commonly used in household incandescent bulbs. The glass enclosure may be coated on the inside with silica 1113, or other surface treatment, to provide a diffuse scattering layer that produces a more uniform far field pattern or the surface treatment may be omitted and a clear enclosure may be provided. The glass enclosure 1112 may have a traditional bulb shape having a globe shaped main body 1114 that tapers to a narrower neck 1115. A lamp base 1102 such as an Edison base may be connected to the neck 1115 where the base functions as the electrical connector to connect the lamp 1000 to an electrical socket or other connector. Depending on the embodiment, other base configurations are possible to make the electrical connection such as other standard bases or non-traditional bases.

A glass stem 1120 is fused to the glass enclosure 1112 in the area of neck 1115. The glass stem 1120 may comprise a generally hollow outer dome 1121 having a first end that extends into the body 1114 and a second end that is fused to the enclosure 1112 such that the interior of the enclosure 1112 is sealed from the external environment. A tube 1126 having an internal passageway 1123 extends through the interior of dome 1121. An annular cavity 1125 is created between the tube 1126 and dome 1121. Wires 1150 may extend between the LED assembly 1130 and base 1102 through the annular cavity 1125. The LED assembly may be implemented using a printed circuit board ("PCB") and may be referred by in some cases as an LED PCB.

The lamp 1000 comprises a solid-state lamp comprising a LED assembly 1130 with light emitting LEDs 1127. Multiple LEDs 1127 can be used together, forming an LED array 1128. The LEDs 1127 can be mounted on or fixed within the lamp in various ways. In at least some example embodiments, a submount 1129 is used. The LEDs 1127 in the LED array 1128 include LEDs which may comprise an LED die disposed in an encapsulant such as silicone, and LEDs which may be encapsulated with a phosphor to provide local wavelength conversion, as will be described later when various options for creating white light are discussed. A wide variety of LEDs and combinations of LEDs may be used in the LED assembly 1130 as described herein. The LEDs 1127 of the LED array 1128 of lamp 1000 may be mounted on multiple sides of submount 1129 and are operable to emit light when energized through an electrical connection. Wires 1150 run between the submount 1129 and the lamp base 1102 to carry both sides of the supply to provide critical current to the LEDs 1127. The wires 1150 may be used to both supply current to the LEDs and to physically support the LEDs on the stem 1120.

Figure 17:
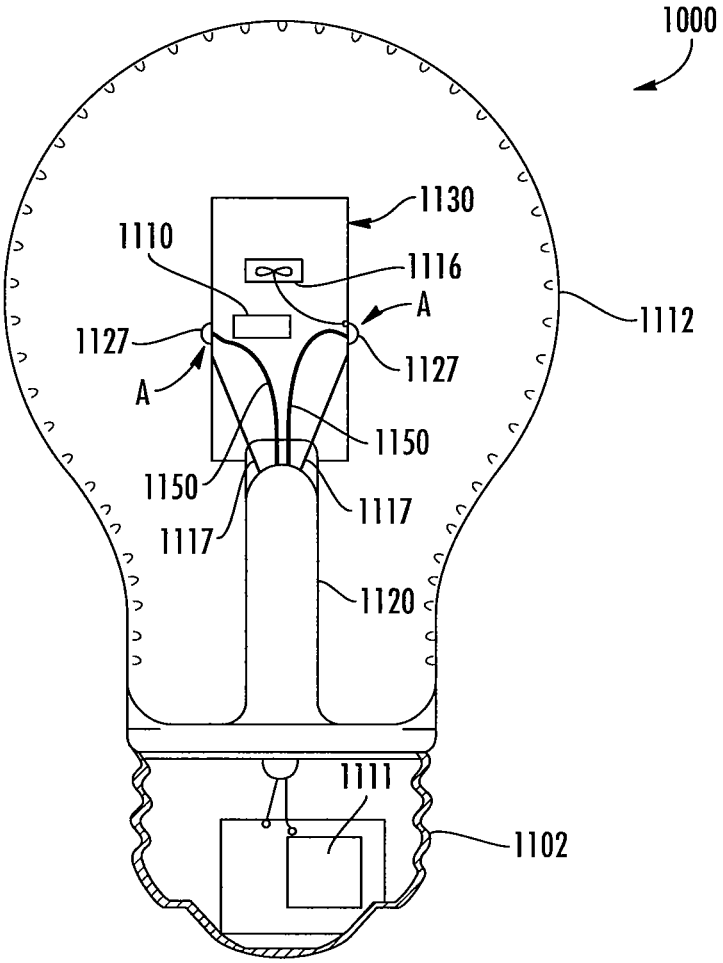
FIG. 17 is a schematic side view of another embodiment of the lamp of FIG. 10.
Figure 18:
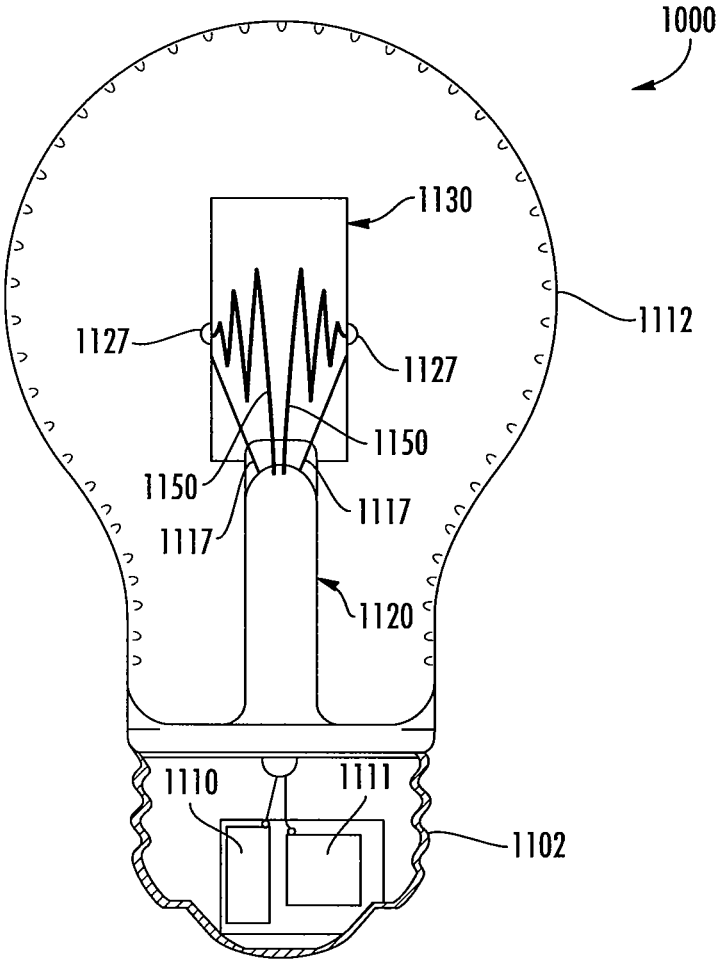
FIG. 18 is a schematic side view of yet another embodiment of the lamp of FIG. 10.
Figure 19:
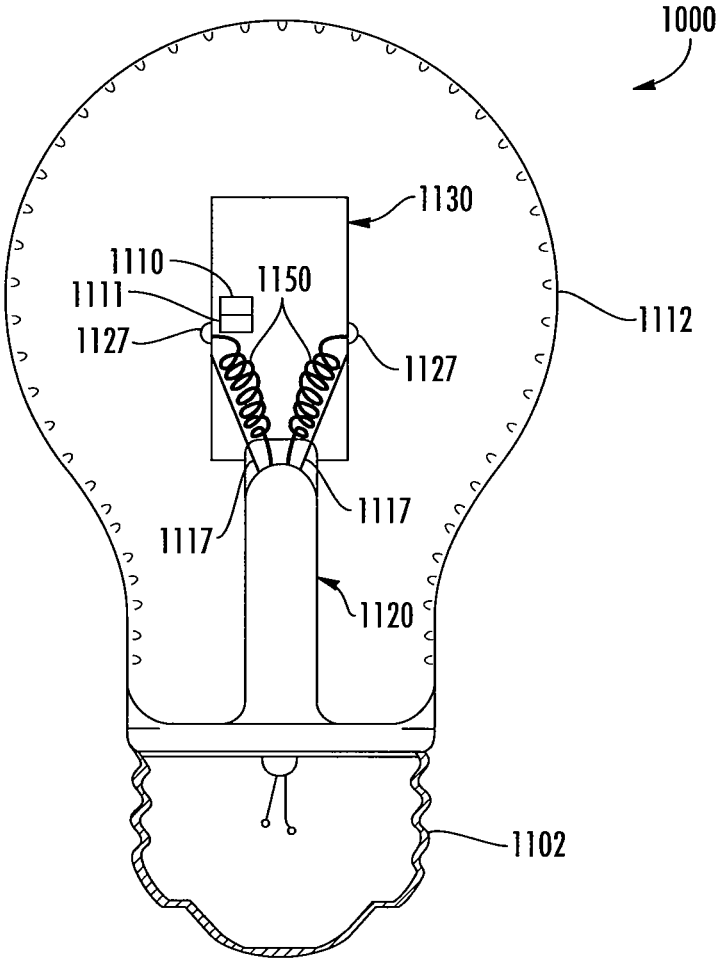
FIG. 19 is a schematic side view of still another embodiment of the lamp of FIG. 10.

In some embodiments, a driver 1110 and/or power supply 1111 are included with the LED array on the submount 1129 as shown in FIG. 19. In other embodiments the driver 1110 and/or power supply 1111 are included in the base 1102 as shown in FIG. 18. The power supply 1111 and drivers 1110 may also be mounted separately where components of the power supply 1111 are mounted in the base 1102 and the driver 1110 is mounted with the submount 1129 in the enclosure 1112 as shown in FIG. 17. Base 1102 may include a power supply 1111 or driver 1110 and form all or a portion of the electrical path between the mains and the LEDs 1127. The base 1102 may also include only part of the power supply circuitry while some smaller components reside on the submount 1129. In some embodiments any component that goes directly across the AC input line may be in the base 1102 and other components that assist in converting the AC to useful DC may be in the glass enclosure 1112. In one example embodiment, the inductors and capacitor that form part of the EMI filter are in the Edison base. Suitable power supplies and drivers are described in U.S. patent application Ser. No. 13/462,388 filed on May 2, 2012 and titled "Driver Circuits for Dimmable Solid State Lighting Apparatus," *now U.S. Pat. No. 8,810,144,* which is incorporated herein by reference in its entirety; U.S. patent application Ser. No. 12/775,842 filed on May 7, 2010 and titled "AC Driven Solid State Lighting Apparatus with LED String Including Switched Segments," *now U.S. Pat. No. 8,476,836,* which is incorporated herein by reference in its entirety; U.S. patent application Ser. No. 13/192,755 filed Jul. 28, 2011 titled "Solid State Lighting Apparatus and Methods of Using Integrated Driver Circuitry," *now U.S. Pat. No. 8,742,671,* which is incorporated herein by reference in its entirety; U.S. patent application Ser. No. 13/339,974 filed Dec. 29, 2011 titled "Solid-State Lighting Apparatus and Methods Using Parallel-Connected Segment Bypass Circuits" *now U.S. Pat. No. 9,101,021,* which is incorporated herein by reference in its entirety; U.S. patent application Ser. No. 13/235,103 filed Sep. 16, 2011 titled "Solid-State Lighting Apparatus and Methods Using Energy Storage," *now U.S. Pat. No. 9,131,561,* which is incorporated herein by reference in its entirety; U.S. patent application Ser. No. 13/360,145 filed Jan. 27, 2012 titled "Solid State Lighting Apparatus and Methods of Forming," *now U.S. Pat. No. 9,510,413,* which is incorporated herein by reference in its entirety; U.S. patent application Ser. No. 13/338,095 filed Dec. 27, 2011 titled "Solid-State Lighting Apparatus Including an Energy Storage Module for Applying Power to a Light Source Element During Low Power Intervals and Methods of Operating the Same," *now U.S. Pat. No. 8,823,271,* which is incorporated herein by reference in its entirety; U.S. patent application Ser. No. 13/338,076 filed Dec. 27, 2011 titled "Solid-State Lighting Apparatus Including Current Diversion Controlled by Lighting Device Bias States and Current Limiting Using a Passive Electrical Component," *now U.S. Pat. Publication No. 2013/0162153,* which is incorporated herein by reference in its entirety; and U.S. patent application Ser. No. 13/405,891 filed Feb. 27, 2012 titled "Solid-State Lighting Apparatus and Methods Using Energy Storage," *now U.S. Pat. No. 8,791,641,* which is incorporated herein by reference in its entirety.

The AC to DC conversion may be provided by a boost topology to minimize losses and therefore maximize conversion efficiency. The boost supply is connected to high voltage LEDs operating at greater than 200V. Other embodiments are possible using different driver configurations, or a boost supply at lower voltages.

The LED assembly 1130 also may be physically supported by the stem 1120. In certain embodiments, a tube 1133 extends beyond the end of the hollow stem 1120. In one embodiment the tube 1133 and stem 1120 are formed of glass and may be formed as a one-piece member. In some embodiments, there is no tube 1133. The tube 1133 comprises a passageway 1135 that receives a post or base 1137 formed on a support 1143. Support 1143 further comprises retention features 1139, such as a plurality of radially extending arms 1139 that are supported by the post 1137. The arms 1139 may extend from the post 1137 in a star pattern where, for example, about six arms are provided. The exact number of arms 1139 may be dictated by the amount of support required for a particular LED assembly. In one embodiment the post 1137 and arms 1139 may be formed as one-piece from molded plastic. The arms 1139 engage the LED assembly 1130 to support the LED assembly on stem 1120. In one embodiment the arms 1139 are inserted between fins 1141 formed on LED assembly 1130 such that the LED assembly is constrained from movement. The wires 1150 may be used to maintain the LED assembly 1130 in position on the support 1143 and to maintain the support 1143 in tube 1133. In some embodiments, the support 1143 rests on the stem 1120 or tube 1133. The LED assembly 1130 may also be supported by separate support wires 1117 that are fused into the glass stem 1120 and are connected to the LED assembly as shown in FIG. 17. While two support wires 1117 are shown a greater number of support wires may be used to provide three-dimensional support for the LED assembly 1130. Moreover, support wires 1117 and support 1143 may be used in combination. Further, if wires 1150 adequately support the LED assembly 1130, the support 1143 and/or support wires 1117 may be eliminated.

The use of a glass stem 1120 to support the LED assembly 1130 is counter to LED lamp design because glass is thermally insulating. Typically, the LEDs in a lamp are supported on a metal support that thermally connects the LEDs to the base 1102 and/or to an associated heat sink such that heat generated by the LEDs may be conducted away from the LEDs and dissipated from the lamp via the metal support, the base and/or the heat sink. Because glass stem 1120 is not thermally conductive it will not efficiently conduct heat away from the LEDs 1127. Because thermal management is critical for the operation of LEDs such an arrangement has not been considered suitable for an LED lamp.

The inventors of the present invention have discovered that the centralized LED array 1128 and any co-located power supply and/or drivers for lamp 1000 may be adequately cooled by helium gas, hydrogen gas, and/or another thermal material which fills the optically transmissive enclosure 1112 and provides thermal coupling to the LEDs 1127. The thermal material may comprise a combination of gasses such as helium and oxygen, or helium and air, or helium and hydrogen, or helium and neon or other combination of gases. In a preferred embodiment the thermal conductivity of the combined gases is at least about 60 mW/m-K. The helium, hydrogen or other gas may be under pressure, for example the pressure of the helium or other gas may be greater than 0.5 atmosphere. The pressure of the helium or other gas may be greater than 1 atmosphere. The helium or other gas may be about 2 atmospheres, about 3 atmospheres, or even higher pressures. In some embodiments the gas pressure may be in a range from about 0.5 to 1 atmosphere, about 0.5 to 2 atmospheres, about 0.5 to 3 atmospheres, or about 0.5 to 10 atmospheres. Because the gas adequately cools the LEDs, the lamp 1000 may use a traditional glass stem 1120 to support the LED assembly 1130.

To facilitate the cooling of the LEDs 1127, the LEDs may be mounted on a thermally conductive submount 1129 that improves and increases the heat transfer between the thermal gas contained in enclosure 1112 and the LEDs 1127. The submount 1129 may comprise heat sink structure 1149 comprising a plurality of fins or other similar structure 1141 that increases the surface area of contact between the heat sink and the thermal gas in enclosure 1112.

In some embodiments a gas movement device 1116 may be provided to move the thermal gas within the enclosure 1112 to increase the heat transfer between the LEDs 1127, LED array 1128, submount 1129, and/or heat sink 1149 of LED assembly 1130 and the thermal gas contained in enclosure 1112 as shown in FIG. 17. The movement of the gas over the LED assembly 1130 moves the gas boundary layer on the components of the LED assembly. In some embodiments the gas movement device 1116 comprises a small fan. The fan may be connected to the power source that powers the LEDs 1127. Tests have shown that by moving the thermal gas inside the enclosure 1112, the temperature in the enclosure may be reduced by 40° C. (Tjunction reduced from ~125 C to 85 C). Reducing the temperature provides a significant increase in thermal management. Use of a gas movement device 1116 also allows the surface area of the LED assembly 1130 to be reduced thereby reducing the cost of the lamp. While the gas movement device 1116 may comprise an electric fan, the gas movement device 1116 may comprise a wide variety of apparatuses and techniques to move air inside the enclosure such as a rotary fan, a piezoelectric fan, corona or ion wind generator, synjet diaphragm pumps or the like.

Figure 10:
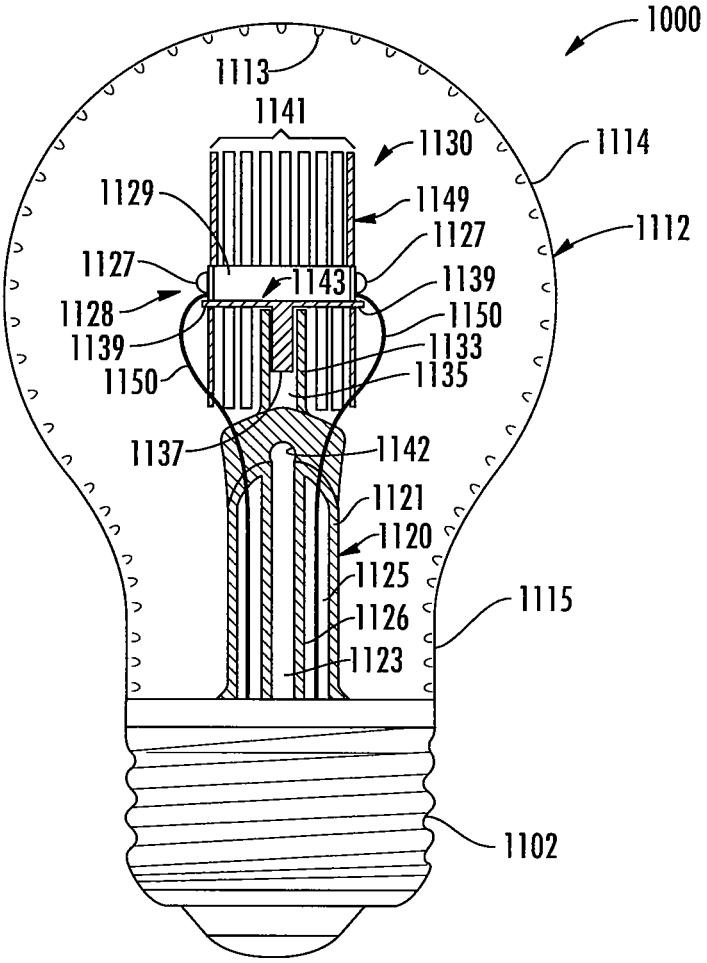
FIG. 10 is a partial section view of an LED lamp showing an alternate embodiment of the invention where the enclosure, LED assembly and stem are shown in cross-section.

In the embodiment of FIG. 10 the LED assembly 1130 comprises a submount 1129 arranged such that the LED array 1128 is disposed in the center of the LED assembly with the heat sink structure 1149 extending to both sides of the LED array 1128, above and below the LED array 1128. In this arrangement the LED assembly is disposed substantially in the center of the enclosure 1112 with the LED array 1128 centered on the submount such that the LED's 1127 are positioned at the approximate center of enclosure 1112. As used herein the term "center of the enclosure" refers to the vertical position of the LEDs in the enclosure as being aligned with the approximate largest diameter area of the globe shaped main body 1114. As used herein the terms "center of the enclosure" and "optical center of the enclosure" refers to the vertical position of the LEDs in the enclosure as being aligned with the approximate largest diameter area of the globe shaped main body 114. "Vertical" as used herein means along the longitudinal axis of the bulb where the longitudinal axis extends from the base to the free end of the bulb. In one embodiment, the LED array 1128 is arranged in the approximate location that the visible glowing filament is disposed in a standard incandescent bulb. The terms "center of the enclosure" and "optical center of the enclosure" do not necessarily mean the exact center of the enclosure and are used to signify that the LEDs are located along the longitudinal axis of the lamp at a position between the ends of the enclosure near a central portion of the enclosure.

Figure 48:
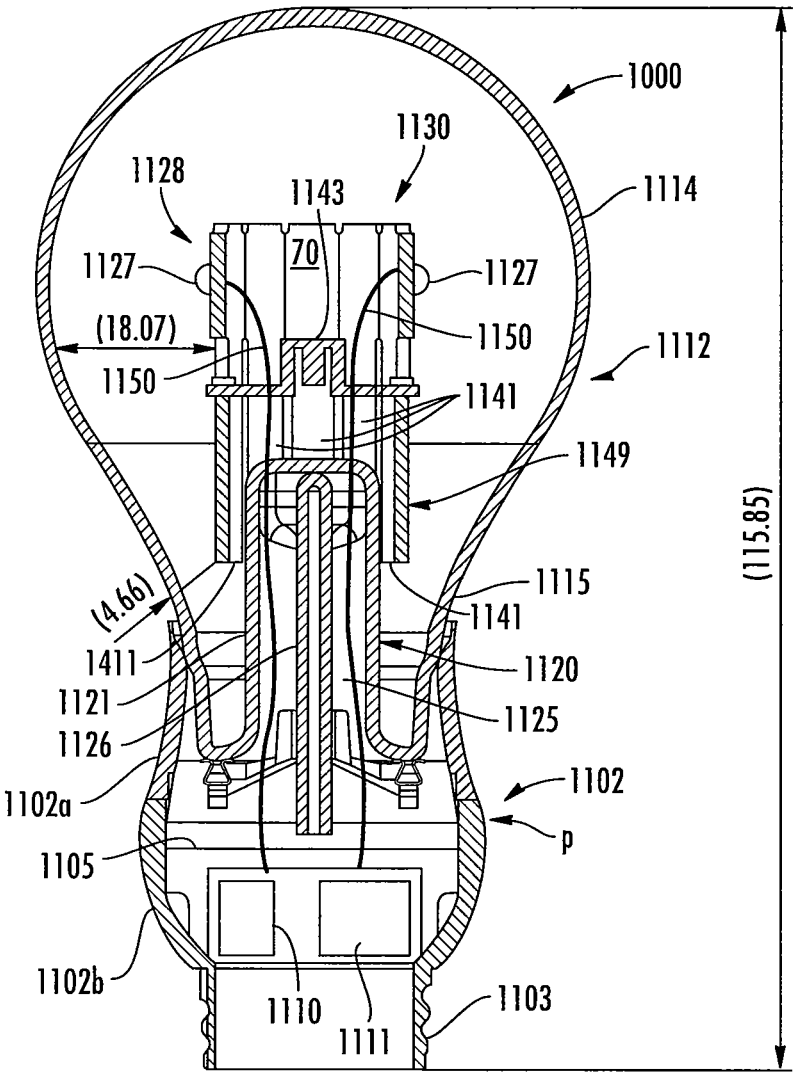
FIG. 48 is a partial section view of an LED lamp showing an alternate embodiment of the invention where the enclosure, LED assembly and stem are shown in cross-section.
Figure 49:
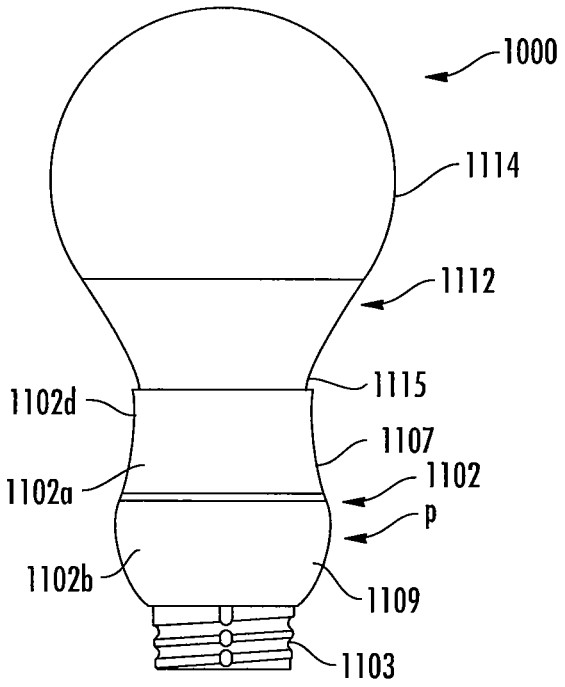
FIG. 49 is a side view of the LED lamp of FIG. 48.
Figure 50:
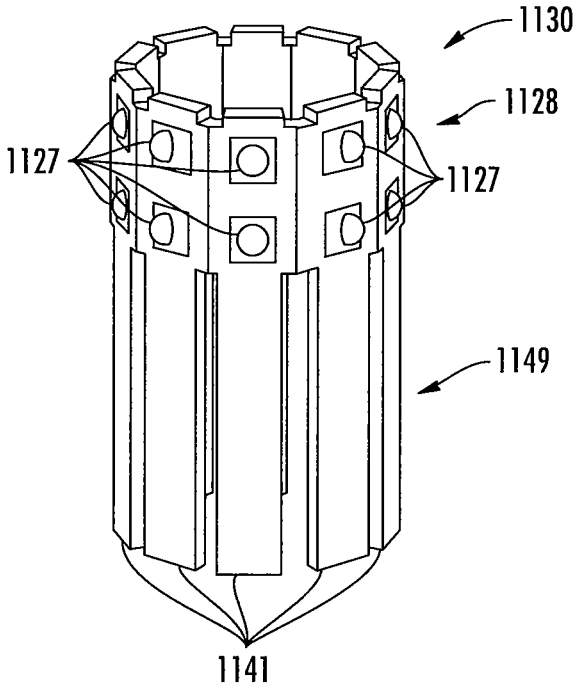
FIG. 50 is a perspective view of the LED assembly used in the LED lamp of FIG. 48.

FIGS. 48, 49 and 50 show another embodiment of the LED lamp and LED assembly 1130 using an asymmetric LED assembly 1130 where the LED array 1128 is disposed at one end of the LED assembly 1130 with the heat sink structure 1149 configured in asymmetric fashion relative to the positioning of the LED array 1128, for example such as fins 1141 extending substantially to one side of the LED array 1128. In the illustrated embodiment the LED array 1128 is disposed toward the top of the LED assembly 1130 (to the side opposite base 1102) with the heat sink structure 1149 extending toward the base. The heat sink structure 1149 may at least partially encircle or surround the stem 1120 in some embodiments. In the illustrated embodiment, the heat sink structure 1149 encircles the stem 1120. The LED's 1127 are positioned such that they are disposed substantially in the center of the enclosure 1112 with the heat sink structure 1149 being offset to one side of the enclosure. One advantage of such an arrangement is that the dimensions of the enclosure 1112 may be configured to shorten the overall height of the enclosure 1112 while still retaining the LED assembly 1130 with the LED's 1127 disposed in the approximate center of the enclosure. A second advantage of such an arrangement relates to the cooling of the LED assembly 1130. The inventors have discovered that the LED assembly 1130 is more efficiently cooled when the heat sink structure 1149 is disposed closer to the enclosure 1112. It is understood that such an arrangement increases cooling of the LED assembly 1130 because the gas inside of the enclosure 1112 acts as a thermally conductive path between the LED assembly 1130 and the enclosure 1112. The enclosure 1112 dissipates the heat to the ambient environment. By minimizing the distance between at least a portion or area of the LED assembly 1130, for example the distance between at least a portion or area of the heat sink structure 1149 and the enclosure 1112, the thermal path between the LED assembly 1130 and the enclosure is shortened thereby creating more efficient cooling of the LED assembly 1130. In some embodiments, by positioning the LED assembly over the stem, the diameter of the LED assembly 1130 is increased and the distance to the enclosure is reduced thereby further improving thermal management.

The LED array 1128 is mounted on a first portion of the LED assembly and the heat sink structure 1149 forms a second part of the LED assembly that is thermally coupled to, and extends from, the first portion of the LED assembly. "Thermally coupled" is meant to be a thermal path that provides sufficient heat dissipation to enable acceptable LED performance and longevity but is not meant to cover any path where heat may travel in a very inefficient manner, such as through a thermally insulating material. As described herein the first portion and second portion may be formed of single or multiple components of single or multiple layers and/or materials. The first portion is dimensioned to support the LED array while the second portion is dimensioned to dissipate heat from the LEDs. The second portion may be significantly larger than the first portion to increase the surface area of the heat sink portion to more effectively transfer heat to the gas. The heat sink structure 1149 may comprise fins 1141. Because the heat sink structure 1149 transfers heat from the LED assembly to the gas in the enclosure 1114 the heat sink structure is completely contained in the sealed enclosure such that a significant thermal path from the LED assembly 1130 is through the fins, the gas and the enclosure. As a result, the heat sink structure 1149 need not be directly connected to the base 1102 via a thermal coupling such as a metal connection. In certain embodiments, the only metal connection between the heat sink structure and the base is through the electrically conductive wires 1150 that form part of the electrical path to the LED array and the primary thermal path from the LED assembly 1130 is through the fins, the gas and the enclosure.

The LED assembly 1130 may be supported on the glass stem 1120 such as by support 1143. In certain embodiments the glass stem and support are thermal insulators, or at least are poor thermal conductors, such that the thermal paths from the LED assembly 1130 is through the gas and enclosure and a secondary thermal path is through wires 1150. In FIG. 48, a support 1143 engages the LED assembly 1130 to provide support to the LED assembly 1130. The support 1143 can be formed of single or multiple components of single and/or multiple layers and or materials. In this embodiment, the support 1143 is made of an electrically insulating material and comprises retention features or arms 1139 extending from a base 1137 as shown for example in FIGS. 56a-56d. The base 1137 can either rest on the stem 1120 or the base 1137 can be configured to receive a tube 1133, for example with a cavity 1147. In certain embodiments, the base 1137 and arms 1139 may be formed as one-piece from molded plastic. The arms 1139 engage the LED assembly 1130 to support the LED assembly on stem 1120. In one embodiment, the arms 1139 are inserted in spaces between fins 1141 formed on LED assembly 1130 such that the LED assembly is supported. The support 1143 can include channels, grooves, holes and/or other wire engaging structures 1145 to receive wires 1150, which can also be used to maintain the position of the support 1143 relative to the LED assembly 1130. As previously mentioned, the support 1143 or LED assembly 1130 may also be supported by separate support wires. Further, if wires 1150 adequately support the LED assembly 1130, the support 1143 and/or support wires 1117 may be eliminated.

Depending on the embodiment, different types of supports and multiple supports 1143 are possible to provide support for the LED assembly. In certain embodiments the support is built integral with the stem 1120 or integral with the LED assembly 1130. In other embodiments, a separate support 1143 is used. In certain embodiments, supporting surfaces 1139 engage the LED assembly 1130, and a base 1137 retains the position of the support 1143 relative to the LED assembly 1130. In some embodiments, the base 1137 engages a tube 1133 that is integral to the stem 1120. In some embodiments the base 1137 simply rests on the stem 1120. In some embodiments, the base 1137 is integral with the supporting surfaces 1139. The arms or support members 1139 may engage the LED assembly 1130 through grooves, channels or holes in the support 1143. The supporting surfaces 1139 engage the LED assembly 1130 between the fins 1141. In other embodiments, other supporting arrangements are possible which engage the LED assembly using holes, grooves, notches, friction fit and/or other engagement structures. FIGS. 56a-d show different supports 1143 where like reference numbers indicate like features. Note, in FIGS. 56c-d, grooves 1146 allow wires 150 to come from within the LED assembly 1130, be guided into groove 1146, folded through groove 1146 in the support members 1139 for bonding the wires 1150 to the LED assembly 1130 on an outer surface of the LED assembly 1130 for electrical contact. The supports 1143 can comprise a hole 1147 to engage the stem 1120, for example with the tube 1133 extending from the stem 1120. For example the support 1143 can be slid over the tube 1133 through the hole 1147. Depending on the embodiments, different supports 1143 are possible.

In certain embodiments, because heat is primarily dissipated from the LED assembly 1130 through the gas and enclosure, rather than though a physical heat path to the base, a significantly larger thermal path is created through the heat sink structure, gas and enclosure than through the wires 1150. The heat transfer through the wires 1150 is less than the heat transfer through the heat sink structure, gas and enclosure, and in some embodiments significantly less. Accordingly, in some embodiments the LED assembly 1130 is arranged in the enclosure such that the heat sink structure extends into the volume of gas. The ends of the heat sink structure terminate in the enclosure. The heat sink structure is surrounded by or substantially surrounded by the gas in the enclosure. In other words the heat sink structure and LED assembly are disposed in the gas such that the gas substantially surrounds and contacts the external surfaces of the heat sink structure and LED array. It is to be understood that the gas surrounding or substantially surrounding the heat sink structure distinguishes from arrangements where the heat sink structure extends into and/or is directly connected to the base or other external structure by a physical thermal coupler where the primary thermal path follows the physical connection. The term surrounding or substantially surrounding the heat sink structure includes heat sink structures that may comprise multiple layers where the gas may contact some of the layers or portions of some of the layers but not contact all of the layers. In some embodiments, the ends of the heat sink structure may be described as terminating in the gas inside of the sealed enclosure rather than extending to the base or to a metal thermal conductor. In some embodiments, the heat sink structure is not directly connected to the base other than by the electrical wires 1150 such that the primary thermal transfer path from the LEDs is through the gas to the enclosure. In some embodiments, the heat sink structure and LED assembly are physically separated from the base.

Because heat is conducted away from the LEDs by the heat sink structure and the gas, the effectiveness of the heat transfer may be affected by the surface area of the heat sink structure and the proximity of the heat sink structure to the enclosure. Making the heat sink structure of a suitable surface area increases heat transfer from the LED assembly to the gas. Making at least a portion of the heat sink structure in relatively close proximity to the enclosure shortens the length of the thermal path to the enclosure where the heat is dissipated to the ambient environment.

Figure 52:
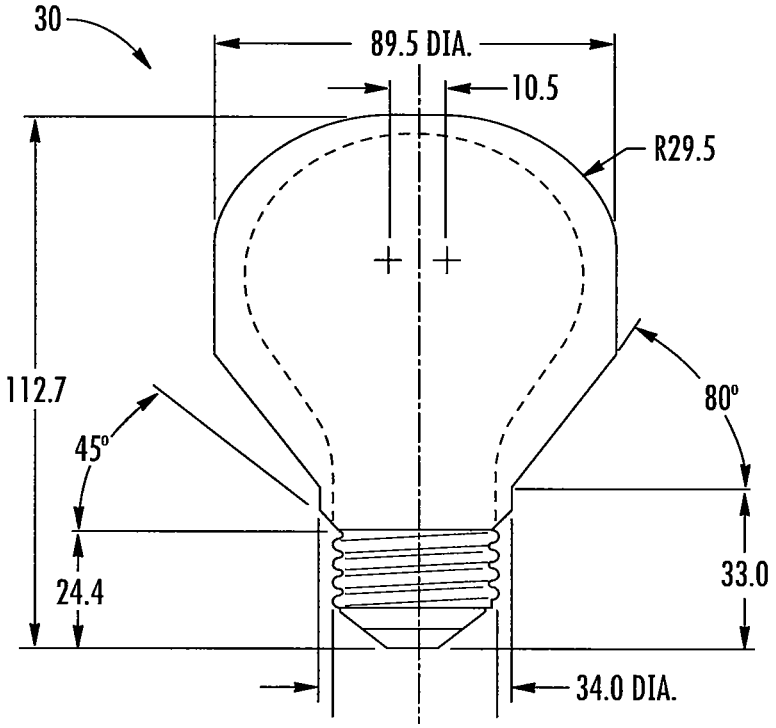
FIG. 52 is a view of the ANSI standard dimensions for an A19 bulb.
Figure 53:
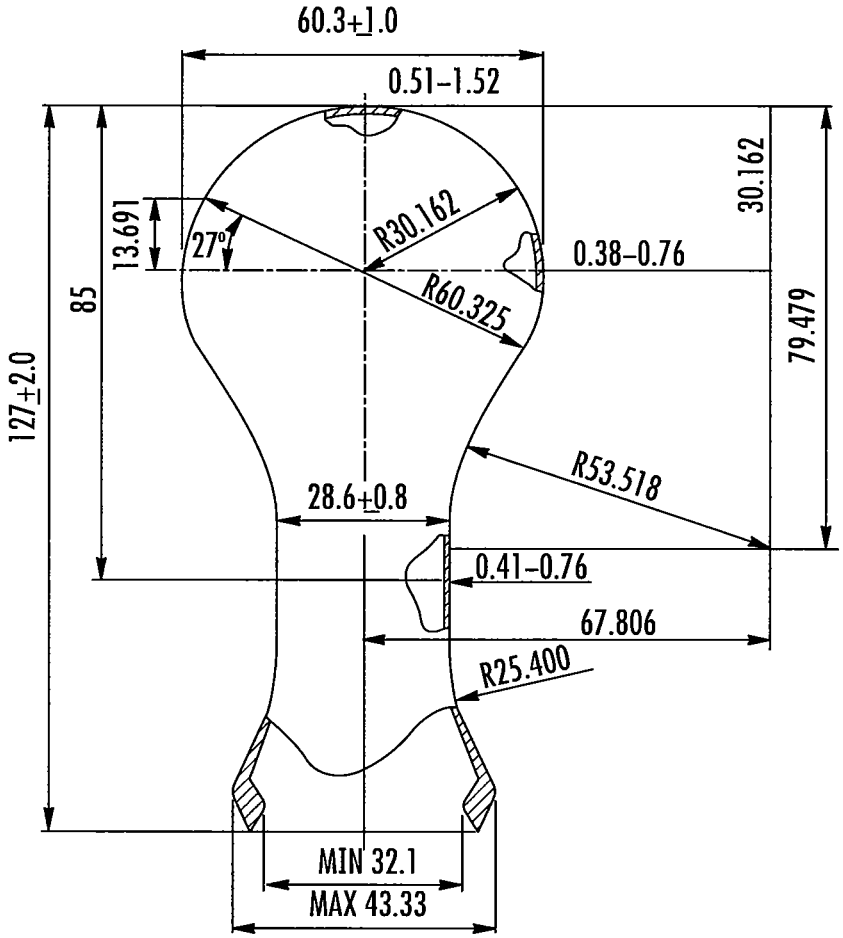
FIGS. 53-55 show embodiments of the enclosure including dimensions.
Figure 54:
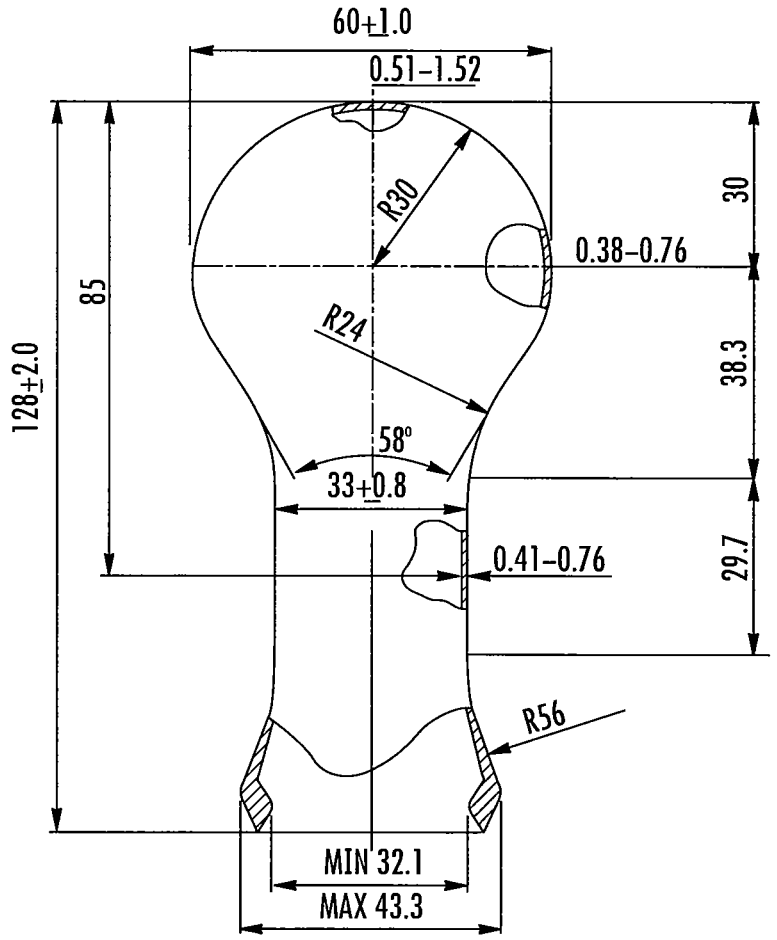
Figure 55:
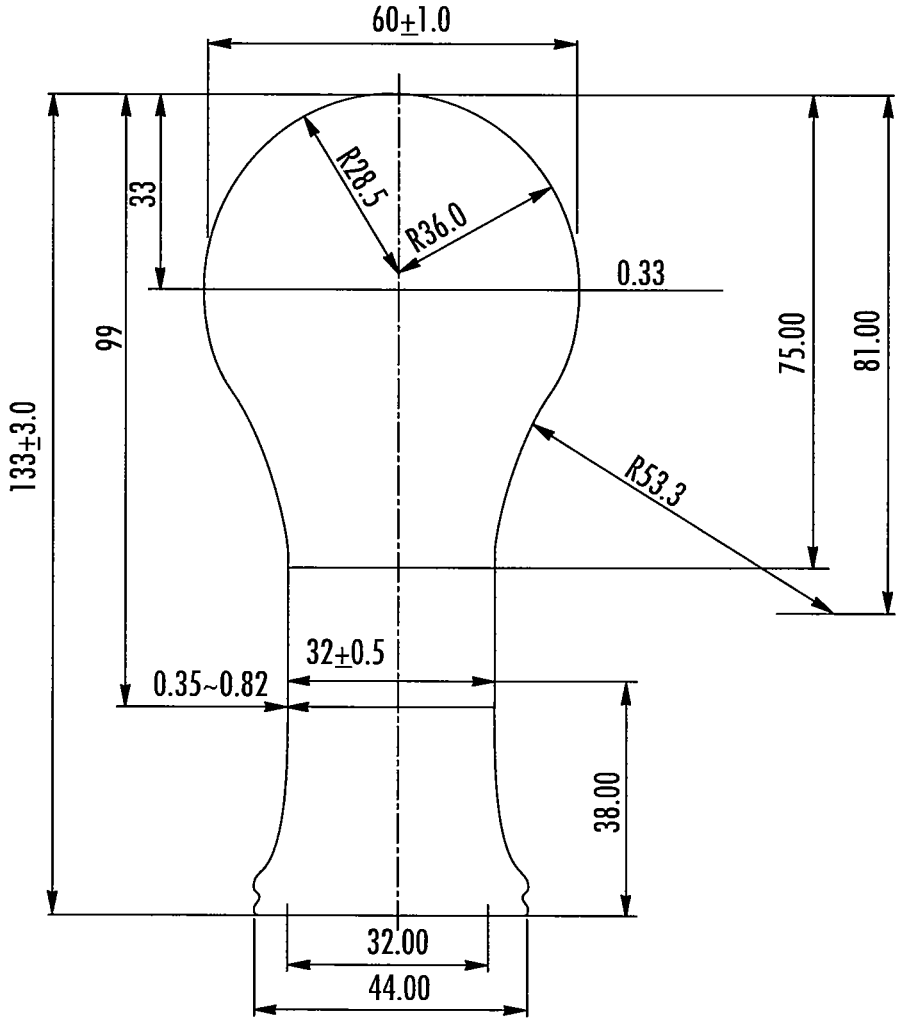
Figure 56A:
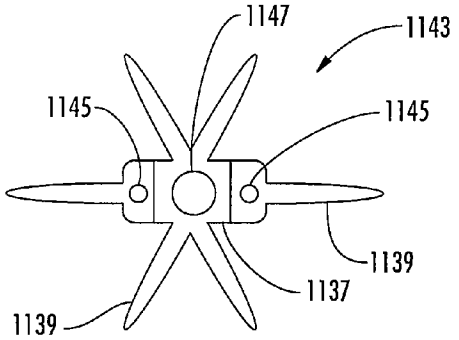
FIGS. 56a-56d show additional embodiments of portions of the lamp of the invention.
Figure 56B:
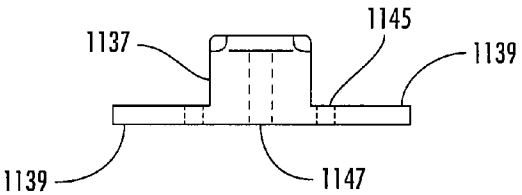
Figure 56C:
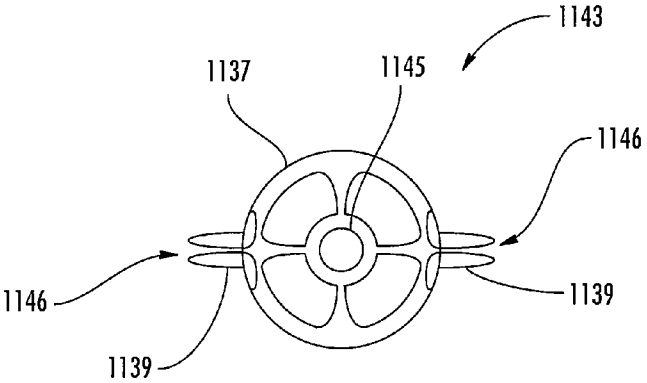
Figure 56D:
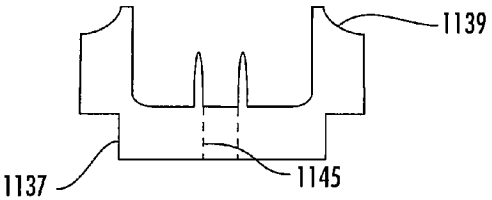

In one embodiment, the distance between the heat sink structure 1149 and the enclosure 1112, at the closest point between the heat shrink structure and the enclosure, is less than about 8 mm. In the illustrated embodiment this is accomplished by arranging the heat sink structure to one side of the LED array such that the distal end of the heat sink structure is disposed adjacent the narrow neck portion 1115 of the enclosure where the narrowed neck brings the surface of the enclosure into close proximity with the heat sink structure. Suitable dimensions of one embodiment of a lamp are shown in FIG. 48 where the dimensions are in millimeters (mm). Note the bulb in FIG. 48 is slightly longer than the ANSI standard for an A19 bulb (FIG. 52); however, the bulb shown in FIG. 48 is suitable as a replacement for an A19 bulb. Moreover, the dimensions of the bulb may be varied by using different enclosures such as shown in FIGS. 53-55 where the dimensions are in millimeters (mm). In some embodiments an enclosure having a wider neck may be used where the LED assembly may be made wider and the overall length of the bulb shortened to be within the ANSI standard dimensions. In other embodiments, fins or other structures may be formed to extend toward the enclosure and may extend to other areas of the enclosure than the narrow neck. In other embodiments, the distance between the heat sink structure 1149 and the enclosure 1112, at the closest point between the heat shrink structure and the enclosure, is less than about 5 mm, in another embodiment the distance is approximately between about 4 mm and about 5 mm, and in some embodiments the distance is less than 4 mm. In some embodiments, the heat sink structure 1149 may contact the enclosure 1112 to make the distance between the heat sink structure and the enclosure zero. Moreover, in other embodiments the distance between the heat sink structure 1149 and the enclosure 1112, at the closest point between the heat shrink structure and the enclosure, is between about 3 mm and about 8 mm. Moreover, in other embodiments the heat sink structure may be offset relative to the LED array towards the top of the enclosure (away from base 1102).

Figure 51:
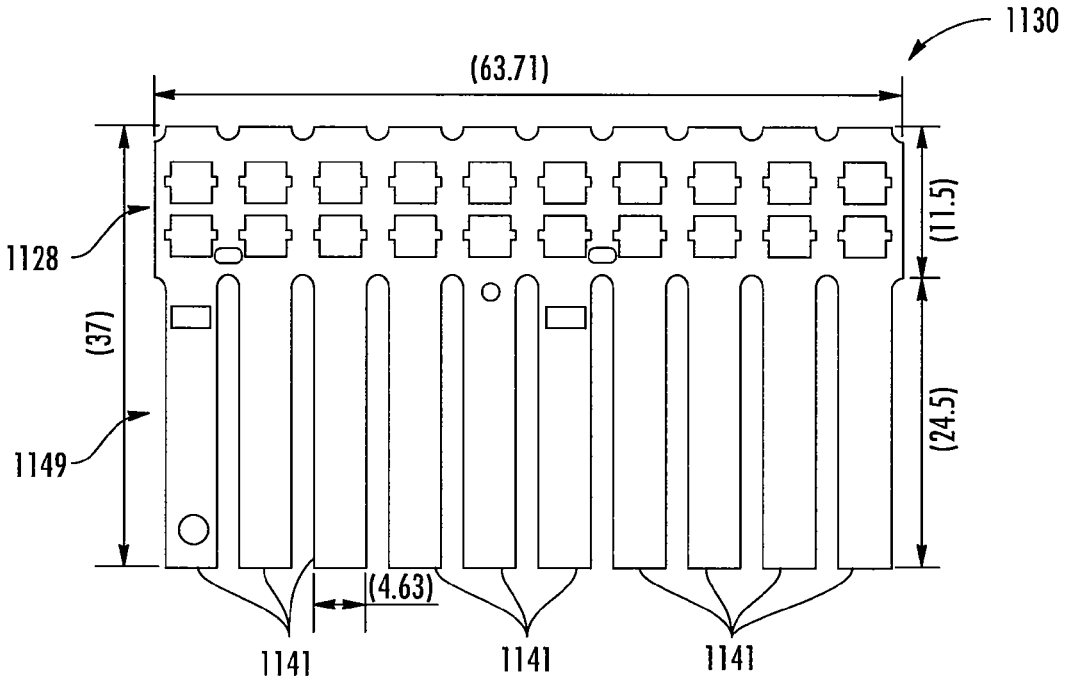
FIG. 51 is a plan view of an embodiment of a substrate usable in embodiments of the LED assembly of the invention showing dimensions.

In one embodiment, the surface area of the LED assembly is at least about 3,000 square mm. In some embodiments, the exposed surface area of the heat sink structure is at least 4,000 square mm, at least 5,000 square mm, and at least 8,000 square mm. The exposed surface area may be between approximately 2,000 to 10,000 square mm and in one embodiment the surface area may be approximately between 4,000 square mm and 5,000 square mm. In another embodiment, the exposed surface area of one side of the heat sink structure 1149 may approximately between 1500 square mm and 4000 square mm. Referring to FIG. 51 an embodiment of a suitable substrate is illustrated having a heat sink structure 1149 and a LED array supporting structure 1128. The substrate may comprise a metal core board or other thermally conductive material. Suitable dimensions are shown in FIG. 51 for one embodiment of a suitable substrate where the dimensions are in millimeters (mm). In this embodiment the thickness of the substrate may be about 1 mm-2.0 mm thick. For example the thickness may be about 1.6 mm or about 1 mm. In other embodiments a copper or copper based lead frame may be used. Such a lead frame may have a thickness of about 0.25-1.0 mm, for example, 0.25 mm or 0.5 mm. In other embodiments, other dimensions including thicknesses are possible. As shown the entire area of the substrate is thermally conductive such that the entire LED assembly will dissipate heat to the surrounding gas. In such an embodiment the first portion functions both to support the LED array and to act as a heat sink while the second portion forms a heat sink structure 1149. The substrate of FIG. 51 may be bent into the configuration of the LED assembly shown in FIG. 50. In such embodiments the LEDs may be spaced from the enclosure a distance of 25 mm or less from the enclosure. In some embodiments, the LEDs may be spaced from the enclosure a distance of 20 mm or less and in other embodiments, the LEDs may be spaced from the enclosure a distance of 15 mm or less. In some embodiments the distance between opposed LEDs on the LED array may be approximately ⅓ of the total width of the enclosure at the level of the LEDs. The LEDs may be spaced from the upper end of the enclosure approximately 25 mm. In one embodiment, the enclosure and base are dimensioned to be a replacement for an ANSI standard A19 bulb such that the dimensions of the bulb fall within the ANSI standards for an A19 bulb. The relative dimensions, distances, areas described above and/or ratios thereof may vary depending on the size and shape of the bulb provided that the arrangement is able to effectively conduct heat away from the LEDs through the gas and enclosure as described herein. For bulbs other than A19 replacement bulbs the relative dimensions, distances, areas described above and/or ratios thereof may be different and are determined by the physical characteristics of the bulb and the heat generated by the LEDs and may be scaled to function in different size bulbs. For example, FIG. 52 shows the ANSI standard envelope for an ANSI A19 standard; however, ranges and dimensions may be scaled for other ANSI standards including, but not limited to, A21 and A23 standards. In other embodiments, the LED bulb can have any shape, including standard and non-standard shapes.

In some embodiments, the LED bulb 1000 is equivalent to a 60 Watt incandescent light bulb. In one embodiment of a 60 Watt equivalent LED bulb, the LED assembly 1130 comprises an LED array 1128 of 20 XLamp® XT-E High Voltage white LEDs manufactured by Cree, Inc., where each XLamp® XT-E LED has a 46 V forward voltage and includes 16 DA LED chips manufactured by Cree, Inc. and configured in series. The XLamp® XT-E LEDs may be configured in four parallel strings with each string having five LEDs arranged in series, for a total of greater than 200 volts, e.g. about 230 volts, across the LED array 1128. In another embodiment of a 60 Watt equivalent LED bulb, 20 XLamp® XT-E LEDs are used where each XT-E has a 12 V forward voltage and includes 16 DA LED chips arranged in four parallel strings of four DA chips arranged in series, for a total of about 240 volts across the LED array 1128 in this embodiment. In some embodiments, the LED bulb 1000 is equivalent to a 40 Watt incandescent light bulb. In such embodiments, the LED array 1130 may comprise 10 XLamp® XT-E LEDs where each XT-E includes 16 DA LED chips configured in series. The 10 46V XLamp® XT-E® LEDs may be configured in two parallel strings where each string has five LEDs arranged in series, for a total of about 230 volts across the LED array 1128. In other embodiments, different types of LEDs are possible, such as XLamp® XB-D LEDs manufactured by Cree, Inc. or others. Other arrangements of chip on board LEDs and LED packages may be used to provide LED based light equivalent to 40, 60 and/or greater other watt incandescent light bulbs, at about the same or different voltages across the LED array 1128.

In one embodiment, the LED assembly 1130 has a maximum outer dimension of the first portion that includes the LED array 1128 that fits into the open neck of the enclosure 1112 during the manufacturing process and an internal dimension of a portion of the second portion that is at least as wide as the width or diameter of the stem 1120. In one embodiment, at least an upper portion of the LED assembly has a maximum diameter that is less than the diameter of the neck and a lower portion has an internal dimension that is at least as wide as the width or diameter of the stem. In one embodiment the LED array is dimensioned so as to be able to be inserted through the neck of the enclosure and at least another portion of the LED assembly has a greater diameter than the stem. In some embodiments the LED assembly, stem and neck have a cylindrical shape such that the relative dimensions of the stem, LED assembly and the neck may be described as diameters. In one embodiment, the diameter of the LED assembly may be approximately 20 mm. In other embodiments some or all of these components may be other than cylindrical or round in cross-section. In such arrangements the major dimensions of these elements may have the dimensional relationships set forth above. In other embodiments, the LED assembly 1130 can have different shapes, such as triangular, square and/or other polygonal shapes with or without curved surfaces.

Still referring to FIGS. 48 and 49, a modified base 1102 is shown comprising a two part base having an upper part 1102a that is connected to enclosure 1112 and a lower part 1102b that is joined to the upper part 1102a. An Edison screw 1103 is formed on the lower part 1102b for connecting to an Edison socket. The base 1102 may be connected to the enclosure 1112 by any suitable mechanism including adhesive, welding, mechanical connection or the like. The lower part 1102b is joined to the upper part 1102a by any suitable mechanism including adhesive, welding, mechanical connection or the like. The base 1102 may be made reflective to reflect light generated by the LED lamp. The base 1102 has a relatively narrow proximal end 1102d that is secured to the enclosure 1112 where the base gradually expands in diameter from the proximal end to a point P between the proximal end and the Edison screw 1103. By providing the base 1102 with a larger diameter at an intermediate portion thereof the internal volume of the base is expanded over that provided by a cylindrical base. As a result, a larger internal space 1105 is provided for receiving and retaining the power supply 1111 and drivers 1110 in the base. From point P the base gradually narrows toward the Edison screw 1103 such that the diameter of the Edison screw may be received in a standard Edison socket. The external surface of the base 1102 is formed by a smooth curved shape such that the base uniformly reflects light outwardly. Providing a relatively narrow proximal end 1102d prevents the base 1102 from blocking light from being projected generally downward and the concave portion 1107 reflects the light outwardly in a smooth pattern. The smooth transition from the narrower concave portion 1107 to the wider convex portion 1109 also provides a soft reflection without any sharp shadow lines. Because the base 1102 in the embodiment of FIGS. 48 and 49 is relatively long compared to a traditional Edison screw, moving the LED assembly downward toward the base as explained above with reference to FIG. 48, allows the overall dimensions of the bulb to remain within the ANSI standard for an A19 bulb.

Figures 57A, 57B, 57C, 58A, 58B:
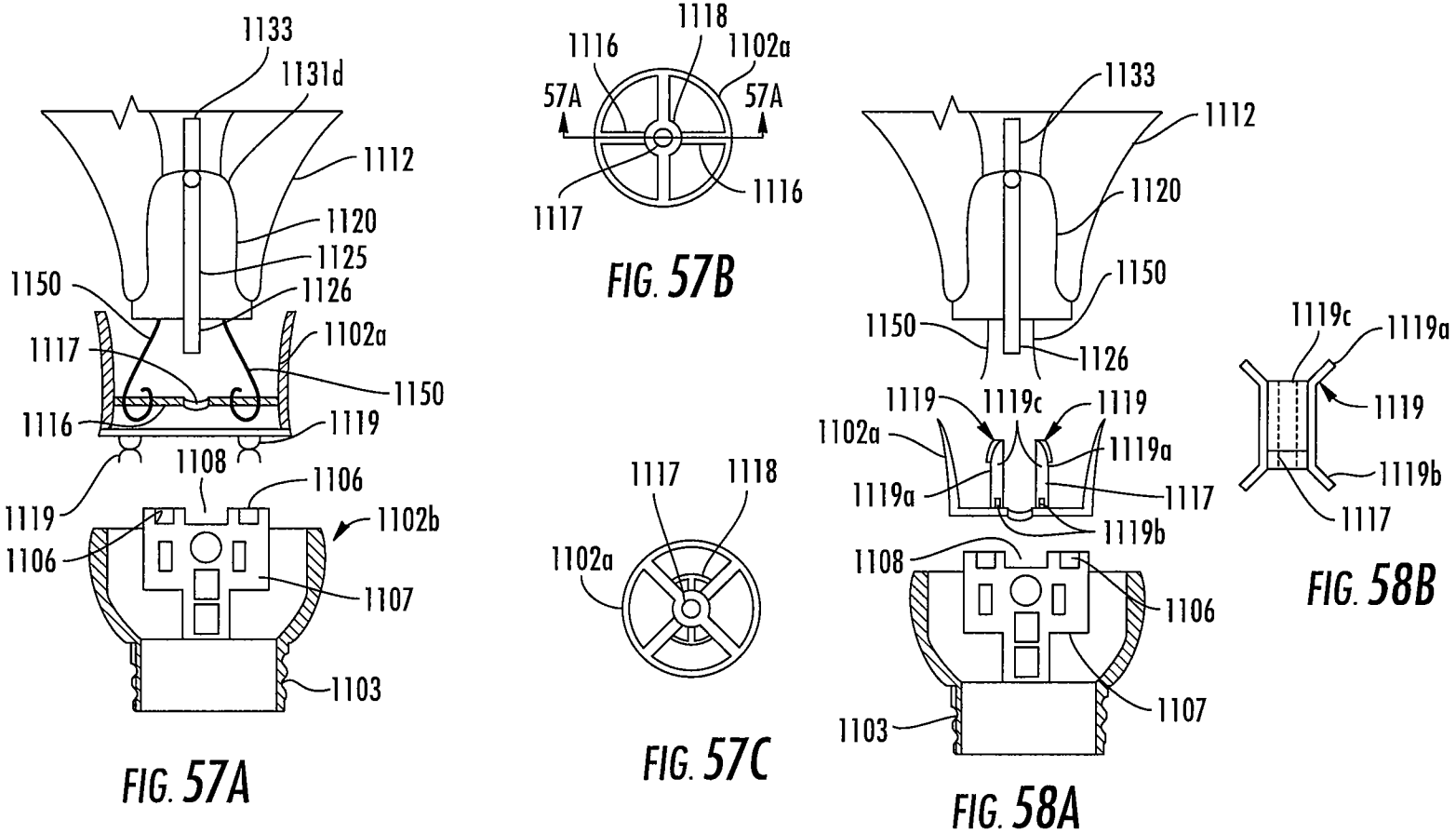

FIG. 57a shows a portion of an exploded view of an embodiment of the LED bulb 1000 showing further detail of how the electrical wires 1150 are connected to the Edison base socket 1103. As shown, the electrical wires 1150 run through the stem 1120 which has been fused to the enclosure 1115 as described herein. The base upper part 1102a comprises wire retention features 1116. In this embodiment, the wire retention features are simply members 1116 that extend across the base upper part 1102a. The wires are wrapped or at least retained by the wire retention features. In certain embodiments, the retention members 1116 can include holes, grooves or other features that aid in the alignment and retention of the wires 1150. In this embodiment the retention members 1116 are integral with a cavity or hole 1117 which assists in aligning the upper base 1102a with tube 1126 and thereby the enclosure 1112. Other alignment, support and/or retention features are possible. FIG. 57c shows an alternative embodiment with a different arrangement of alignment, retention and/or support features, such as retention features 1118 to align the wires 1150, the upper enclosure 1112, the upper base 1102 and/or the lower base 102b.

As shown in FIG. 57a, in some embodiments, electrical coupling arrangement or connectors 1119, such as conductive clips are used to electrically couple the electrical wires 1150 to contacts 1106 of a printed circuit board 1107 which includes the power supply, including large capacitor and EMI components that are across the input AC line along with the driver circuitry as described herein. The printed circuit board 1107 includes a notch 1108 which receives the tube 1126 to assist in aligning the base lower part 1102b with the base upper part 1102a. Depending on the embodiment, the lower and upper parts 1102a and 1102b can snap together or connected together by other means. Depending on the embodiment, the upper and lower parts 1102a and 1102b could be integrated into one piece which is electrically coupled to the electrical wires 1150.

FIG. 58a shows another embodiment of the base upper part 1102a in which an electrical coupling 1119 is integral with the upper base 102a. In this embodiment, the electrical coupling or interconnect 1119 includes a first contact portion 1119a that engages the wires 1150, and a second contact portion 1119b that engages the contacts 1106 of the circuitry 1110 in the lower base 1102b when the upper base 102a, the lower base 1102b and the enclosure 1112 are connected together. In this embodiment, the electrical coupling 1119 includes a hole 1117 which receives the tube 1126 to aid in alignment and retention of the electrical wires 1150 and of the electrical coupling 1119 as well as the upper base 1102a with the enclosure 1112. Other configurations are possible for the electrical interconnect 1119, the lower base 1102b and/or the upper base 1102a. Depending on the embodiment, the electrical coupling between the wires 1150 and any circuitry 1110 in the base 1102 as well as any alignment or wire retention features 1116, 1117 or 1118, the lower base 1102b and/or the upper base 1102a can be integrated into a single component and/or comprise multiple components. For example, FIG. 58b shows a separate interconnect 1119 comprising a first contact portion 1119a and a second contact portion 1119b that engages the contacts of the circuitry 1110. The interconnect 1119 comprises a hole 1117 which receives the tube 1126 such that the interconnect 1119 slides onto tube 1126 and electrically couples the wires 1150 with the contacts 1106 for the circuitry 1110 in the lower base 1102b. Additional features providing electrical connection, alignment retention and physical connection are possible. In some embodiments, the circuitry 1110 can be within the enclosure 1112, for example mounted to the LED assembly 1130, then the interconnect 1119 could be as simple as a contact between wires 1150 and the Edison base 1103. In other embodiments, the a portion of the circuitry 1110 could be in the base 1102 and a portion of the circuitry 1110 could be within the enclosure 1112, such as including circuitry that is across the AC line being positioned within the base 1102 and the driver circuitry being positioned within the interior of the LED assembly 1130.

Figure 59:
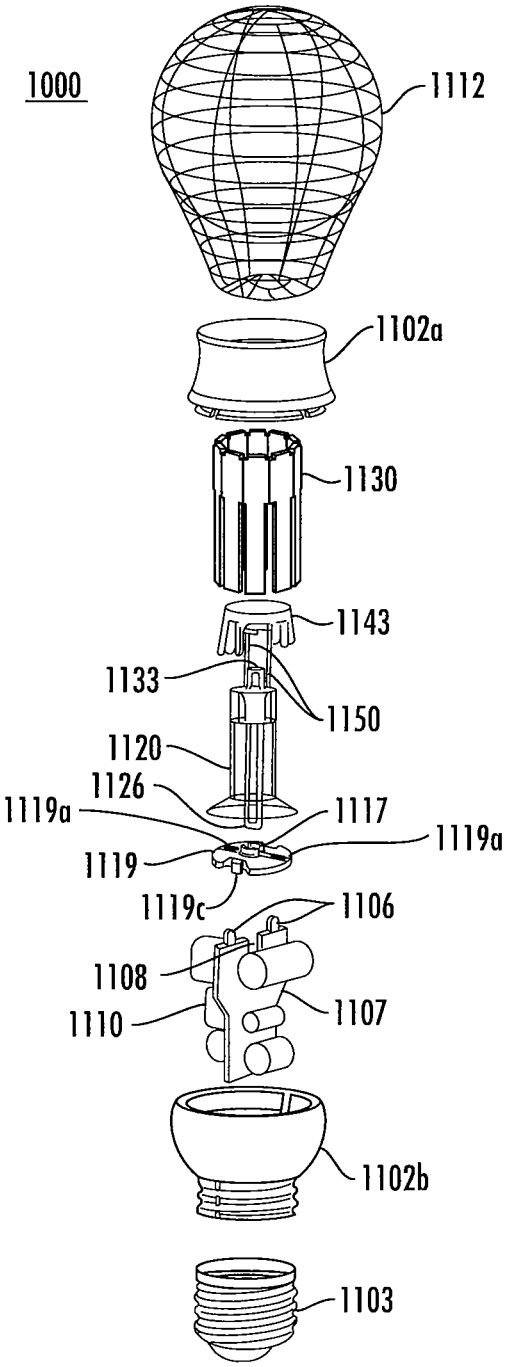
FIG. 59 is an exploded view of an embodiment of the lamp of the invention.
Figure 60A:
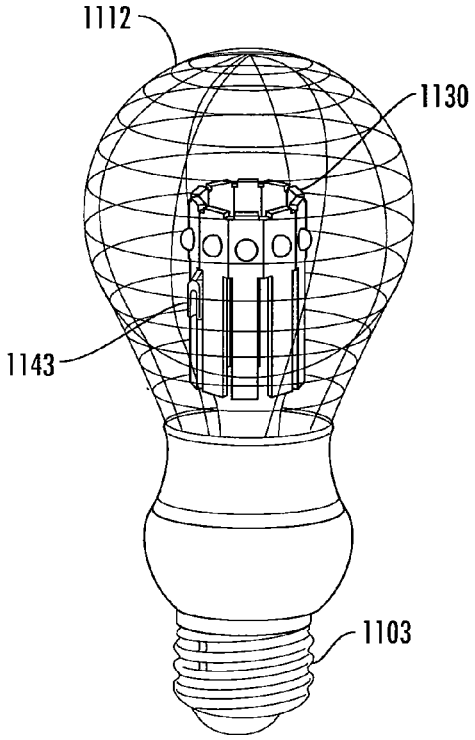
FIG. 60a is a perspective view of the embodiment of the lamp of FIG. 59.
Figure 60B:
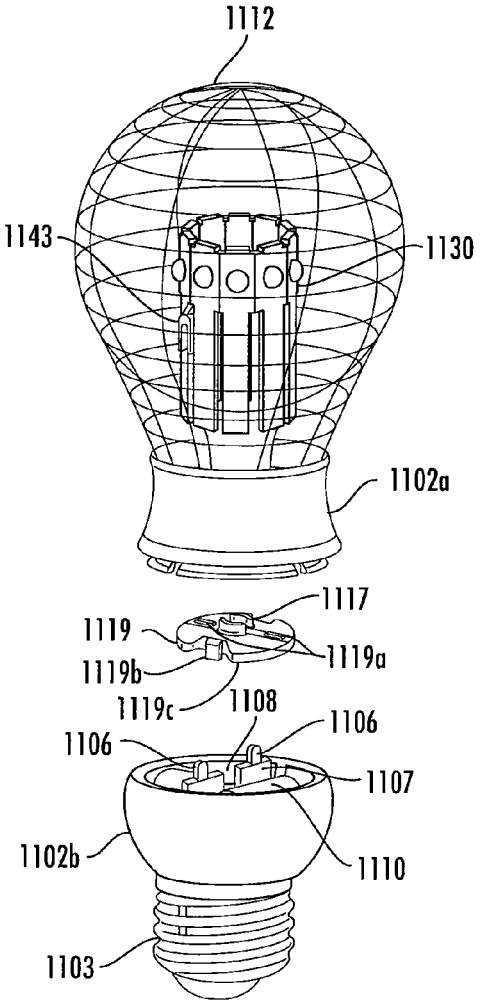
FIG. 60b is a partial exploded view of the embodiment of the lamp of FIG. 59.
Figure 60C:
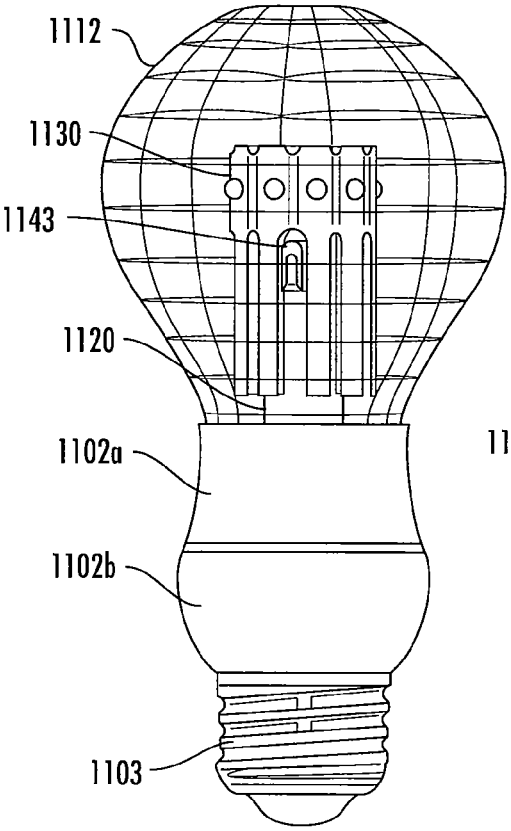
FIGS. 60c, 60d and 60e are top side and bottom views of the embodiment of the lamp of FIG. 59.
Figure 60D:
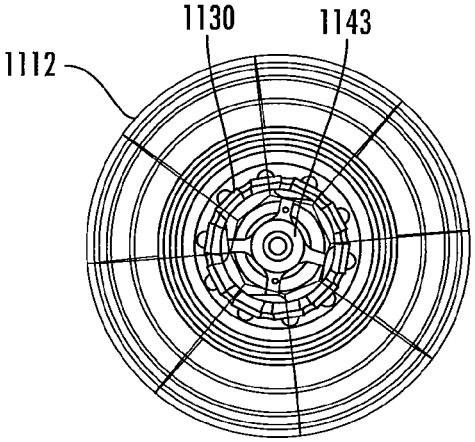
Figure 60E:
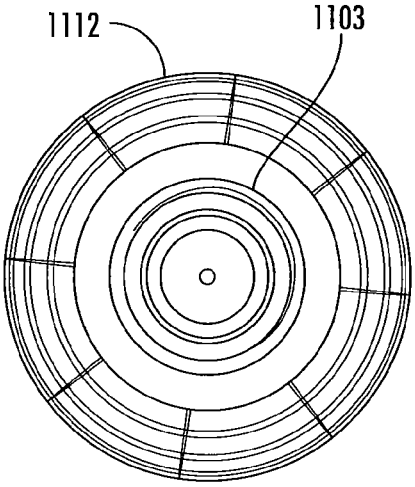

FIGS. 59-60e illustrate an embodiment of a lamp 1000 that can serve as a replacement for an incandescent bulb. This embodiment makes use of similar components or features which have already been described using the reference numbers shown in the drawings. In this embodiment, the support 1143 is similar to the support described with reference to FIGS. 56c and 56d. An interconnect or electrical coupling 1119 is shown as a separate piece with a first electrical contact portion 1119a and a second contact portion 1119b respectively contacting the wires 1150 and the contacts 1106 on a printed circuit board 1107 on which is mounted circuitry 1110. The electrical contacts of the interconnect 1119 are on a support 1119c such as a plastic support. The interconnect 1119 includes a hole 1117 for engaging the stem 1126 for alignment and support. The stem 1126 also engages a notch 1108 in the printed circuit board 1107 to provide alignment and support as has been described above. In this embodiment, the EMI circuitry across the AC line and driver circuitry/power supply comprising a boost converter or topology as described above is mounted on the printed circuit board 1107. In the FIGS. 59-60e, the enclosure 1112 is shown as transparent. It should be understood that the enclosure 1112 could be frosted. Other embodiments are possible.

Any aspect or features of any of the embodiments described herein can be used with any feature or aspect of any other embodiments described herein or integrated together or implemented separately in single or multiple components.

Figure 11:
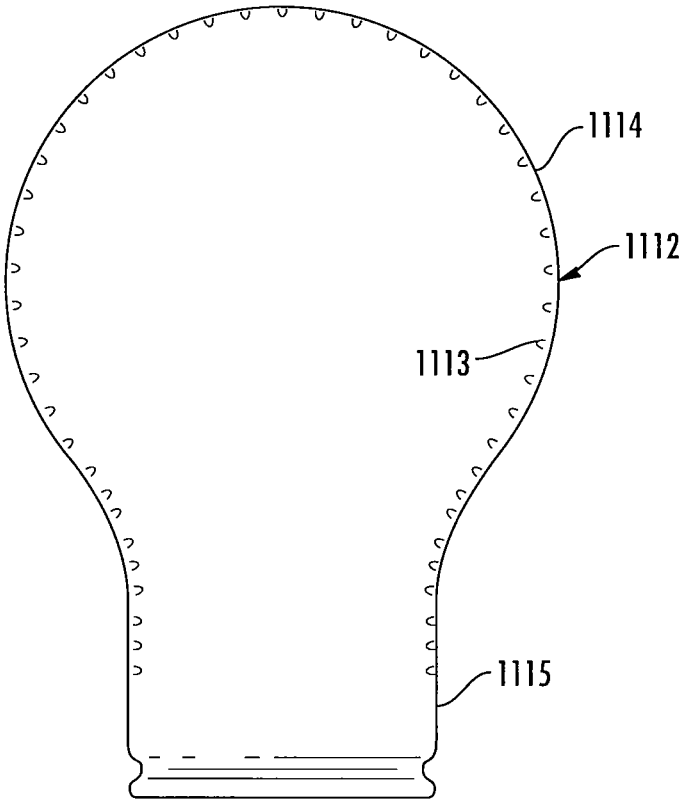
FIG. 11 is a side view of an embodiment of an enclosure usable in the manufacture of the embodiment of FIG. 10.

To further explain the structure and operation of an embodiment of the lamp 1000 an embodiment of a method of making a lamp will be described. Referring to FIG. 11, an enclosure 1112 may be created having a main body 1114 and a relatively narrow neck 1115. In one embodiment the enclosure 1112 is made of glass and may be coated by silica 1113 or other coating as explained herein. The enclosure 1112 may have the form of an incandescent bulb, PAR lamp, or other existing form factor.

Figure 12:
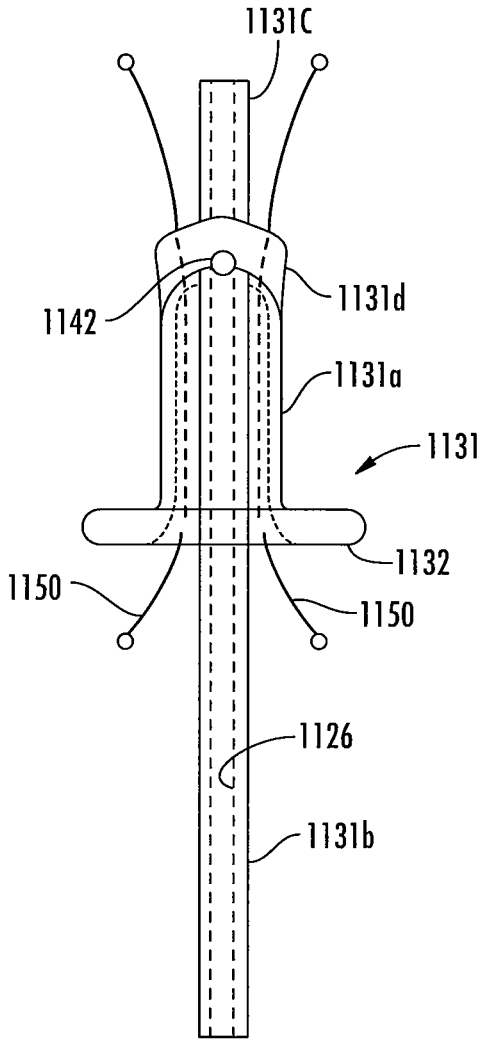
FIG. 12 is a side view of an embodiment of a stem part usable in the manufacture of the embodiment of FIG. 10.

Referring to FIG. 12, a glass stem part 1131 is provided that forms glass stem 1120, tube 1126, and tube 1133 in lamp 1000. Stem part 1131 comprises a tube having a flared first portion 1131a that extends into the enclosure 1112 and forms stem 1120 in the finished lamp as described with reference to FIG. 10. The stem part 1131 comprises a second portion 1131b that is a tube that is an extension of tube 1126 located inside of stem 1120. Second portion 1131b extends outside of the enclosure 1112 during manufacture of the lamp and is substantially removed from the finished lamp. Located between the first portion 1131a and the second portion 1131b is a glass flange or disc 1132 that protrudes radially from the dome 1121. The flange 1132 is dimensioned such that it substantially fills the open area of the neck 1115. A third portion 1131c extends from the first portion 1131a and defines tube 1133 and internal bore 1135 in lamp 1000. To make the stem part 1131 the area 1131d between the first portion 1131a and the third portion 1131c is fused such that the passage 1126 is blocked between the first portion 1131a and the third portion 1131c. A pair of holes 1142 are formed in the area of fused portion 1131d that communicate passageway 1126 with the exterior of the stem part 1131 such that when the stem part 1131 is secured to the enclosure 1112 the interior of the enclosure is in communication with the exterior of the enclosure via the passage 1126 and holes 1142. The holes 1142 may be formed by creating thin portions in the stem and blowing out the thinned portions by introducing gas under pressure into passageway 1126. The wires 1150 for powering the LEDs may extend through and fused into area 1131d such that the wires extend from outside the stem part 1131 through annular cavity 1125 and out the stem part 1131 adjacent flange 1132. If used, the support wires 1117 may be embedded in the fused area 1131d.

Figure 13:
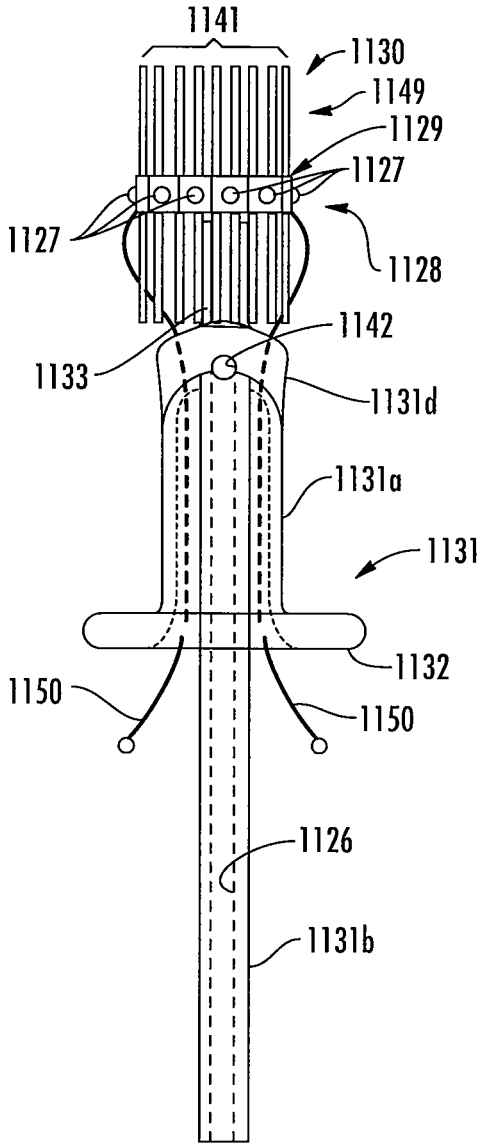
FIG. 13 is a side view of an embodiment of a stem part and LED assembly usable in the manufacture of the embodiment of FIG. 10.

Referring to FIG. 13, an LED assembly 1130 is mounted to the stem part 1131 by support wires 1121, wires 1150 and/or support 1143. The LED assembly 1130 may comprise the LED array 1128, the submount 1129, the heat sink structure 1149, the driver and/or power supply, and/or the gas movement device 1116 as previously described. The wires 1150 are connected to the LED assembly 1130 for delivering current to the LEDs 1127. The wires 1150 extend from the LED assembly 1130 through the stem part 1131 to be connected to the electronics in the base 1102. The LEDs 1127 are positioned in the LED assembly 1130 and the LED assembly 1130 is positioned in the enclosure 1112 such that a desired light pattern is generated by the LEDs and lamp 1000. For a replacement incandescent bulb the LEDs 1127 may be centrally located in the enclosure 1112 such that the light is emitted from the enclosure substantially uniformly about the surface of the enclosure. The lamp may also comprise a directional lamp such as BR-style lamp or a PAR-style lamp where the LEDs may be arranged to provide directional light.

Figure 14:
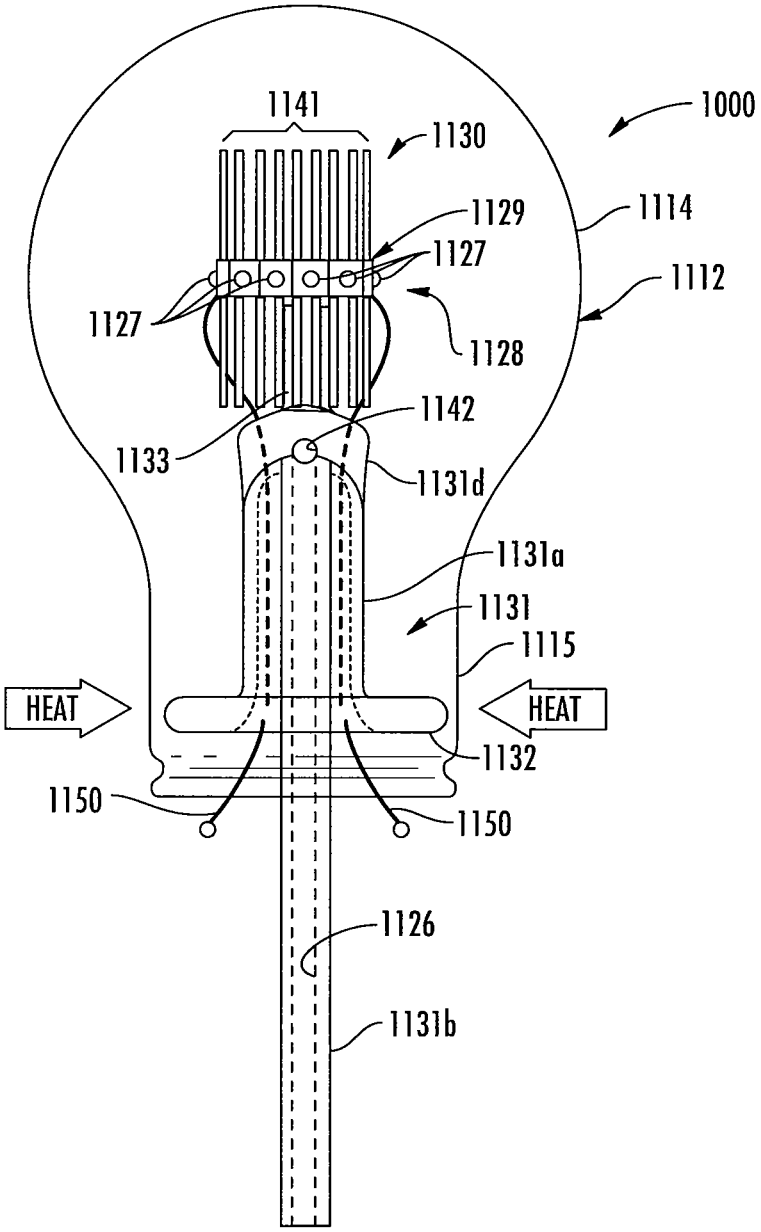
FIG. 14 is a side view of an embodiment of a stem part and LED assembly of FIG. 12 disposed in the enclosure of FIG. 11 showing the manufacture of the embodiment of FIG. 10.
Figure 15:
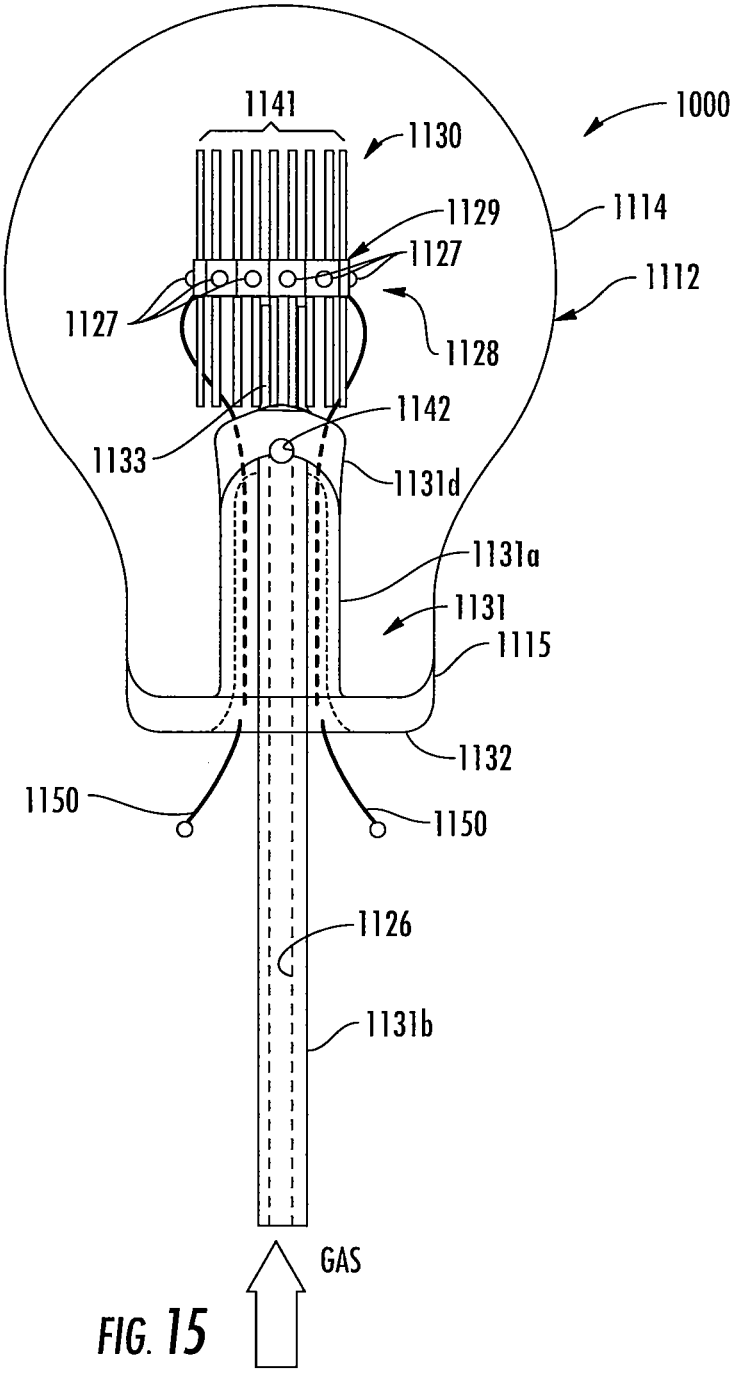
FIG. 15 is a side view of an embodiment of a stem part and LED assembly of FIG. 12 fused to the enclosure of FIG. 11 showing the manufacture of the embodiment of FIG. 10.

Referring to FIG. 14, the stem part 1131 with the LED assembly 1130 is inserted into the enclosure 1112 such that the flange 1132 is disposed in the lamp neck 1115 and the LED assembly 1130 is positioned in the body 1114. The stem portion 1131b and wires 1150 extend from the enclosure 1112. The neck 1115 and flange 1132 are heated. The glass becomes molten and the flange 1132 is fused to the neck 1115 such that an air tight seal is created to isolate the interior of the enclosure 1112 from the exterior of the enclosure as shown in FIG. 15. The heating process may be performed in a gas pressurized mandrel such that the neck and flange are formed into a desired shape. After fusing the enclosure 1112 to the stem part 1131 communication between the interior of the enclosure 1112 and the exterior of the enclosure may only be made through the passage 1126 and holes 1142.

Because the LEDs 1127 and LED assembly 1130 are heat sensitive the application of heat to fuse the stem part 1131 to the enclosure 1112 may cause an overtemperature situation for the LED assembly 1130. Overtemperature is a concern for at least two reasons. First, overtemperature may degrade the performance of the LEDs 1127 in use such as by substantially shortening LED life. Overtemperature may also affect the solder connection between the LEDs 1127 and the PCB, base or other submount where the LEDs may loosen or become dislodged from the LED assembly 1130. Overtemperature may be caused by a combination of both peak temperature and the length of time the LED assembly 1130 is exposed to heat. Overtemperature as used herein means a heating of the LED assembly 1130 or LEDs 1127 such that either the performance of the LEDs is degraded or the solder connection is degraded or both. It is desired when attaching the stem part 1131 to the enclosure 1112 that heat transferred to the LEDs 1127 during the fusing process is minimized. The fusing operation occurs at approximately 800 degrees C. and the temperature of the LED array and LEDs must typically be maintained below 325 degrees C. Depending upon the type of LED and its construction in some embodiments the temperature of the LED array and LEDs must be maintained below 300 degrees C., 275 degrees C., 250 degrees C., 235 degrees C., and 215 degrees C. The time of exposure of the heat must also be controlled depending upon the reflow characteristics of the solder and the LED assembly specifications. The overall cycle time of the fusing operation is approximately 15 seconds to 45 seconds in duration, with the glass in the molten stage for 5 to 15 seconds. Prior to the molten stage the glass to be fused is preheated so that residual stress is not incorporated into the assembly. The thermal resistance of the electrical path is selected so as to not cause overtemperature for the duration of the heating process such that the long-term operation of the LEDs and/or the bonds to the submount are not degraded. The temperature at the LEDs should be maintained at least below the temperature and time period where the LED remains bonded to the submount and/or does not fall apart or degrade. Depending on the particular LEDs and bonding materials, these temperatures may vary. Additionally, these temperatures may change depending on the time duration of the exposure to the elevated temperatures.

Figure 20:
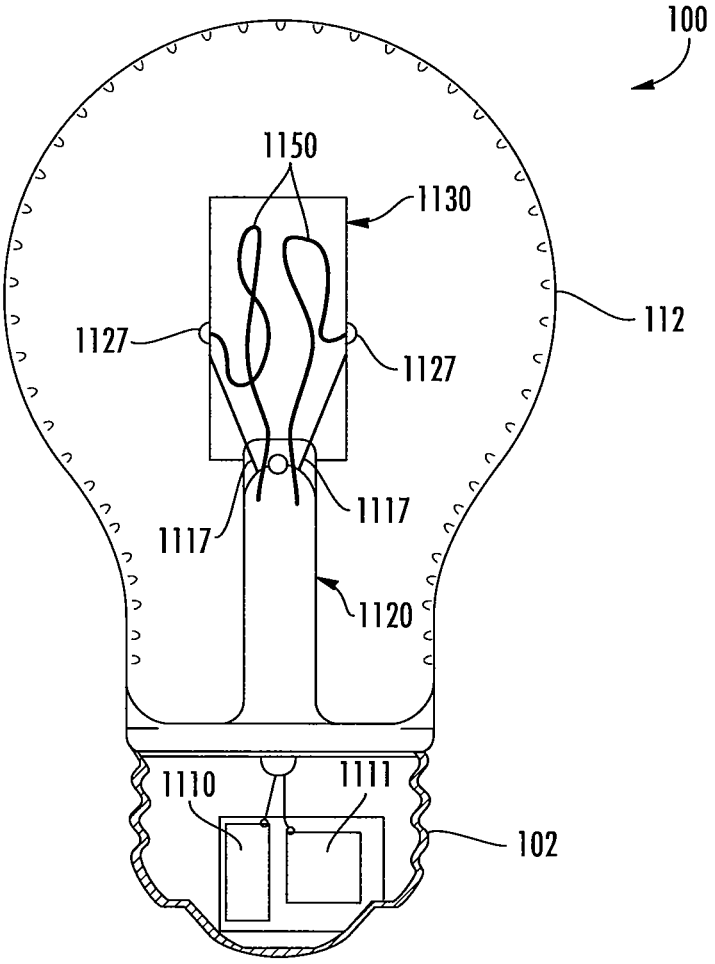
FIG. 20 is a schematic side view of yet another embodiment of the lamp of FIG. 10.

The inventors of the present invention have determined that during the fusing operation the transfer of heat to the LEDs results primarily from heat conduction through the wires 1150 rather than heat convection through the ambient environment. The inventors have concluded that by increasing the thermal resistance through the wires 1150 and/or by increasing the thermal resistance of the electrical path from the connection point of the wires 1150 to the LED assembly 1130 and the LEDs 1127, the heat transfer to the LEDs during the fusing operation may be maintained below overtemperature levels. Increasing the thermal resistance of the wires 1150 may be accomplished using a variety of techniques. In one embodiment the thermal resistance of the wires is increased by increasing the length of the wires. The wire length may be increased by simply making the wires 1150 longer as shown in FIG. 17 such that the distance between the connection point A of the wires 1150 to the LEDs 1127 and the point on the stem part 1131 where the heat is applied is great enough that overtemperature does not occur. The wire length may also be increased by adding length to the wires without increasing the distance between these points. For example, as shown in FIG. 18 the wires 1150 may be formed with a zigzag pattern. Similarly, the wires 1150 may be formed as a helix or coil as shown in FIG. 19. The wires 1150 may be formed with a torturous, circuitous or random pattern as shown in FIG. 20. The wires 1150 may be formed with a combination of such shapes. In these embodiments, the path of the wires, and therefore the thermal resistance, may be increased without increasing the overall distance between the point of application of the heat and the connection point A between the wires 1150 and the LED assembly 1130.

Thermal resistance of the wires may also be increased by making the cross-sectional area of the wires thin enough that the heat does not cause an overtemperature. The thermal resistance of the wires may also be increased by a combination of making the cross-sectional area of the wires thinner and increasing the length of the wire path.

Figure 21:
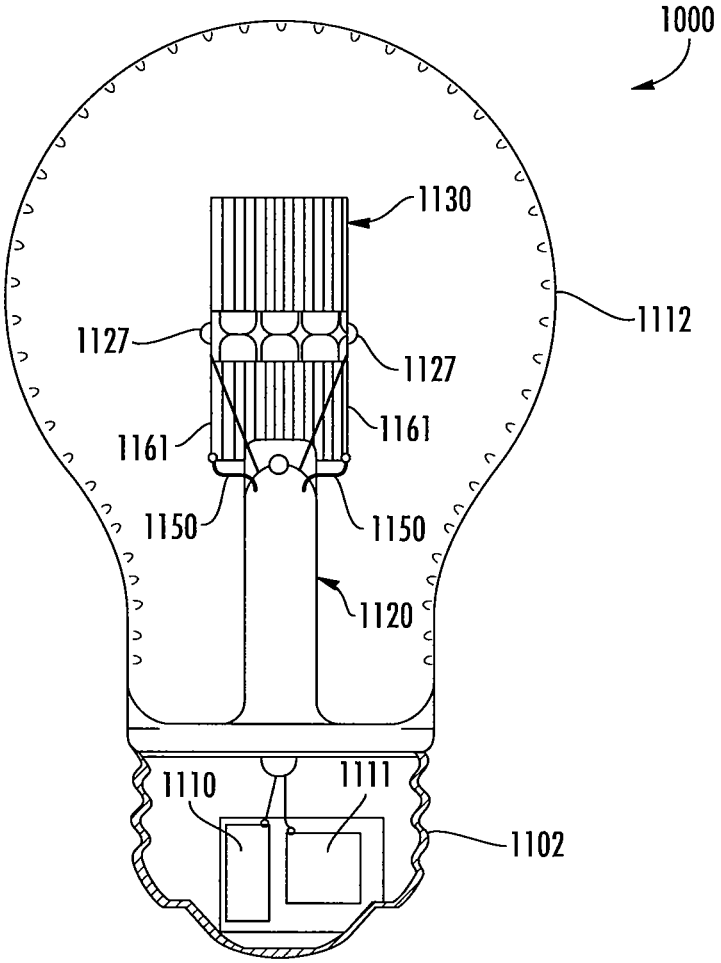
FIG. 21 is a schematic side view of still another embodiment of the lamp of FIG. 10.
Figure 22:
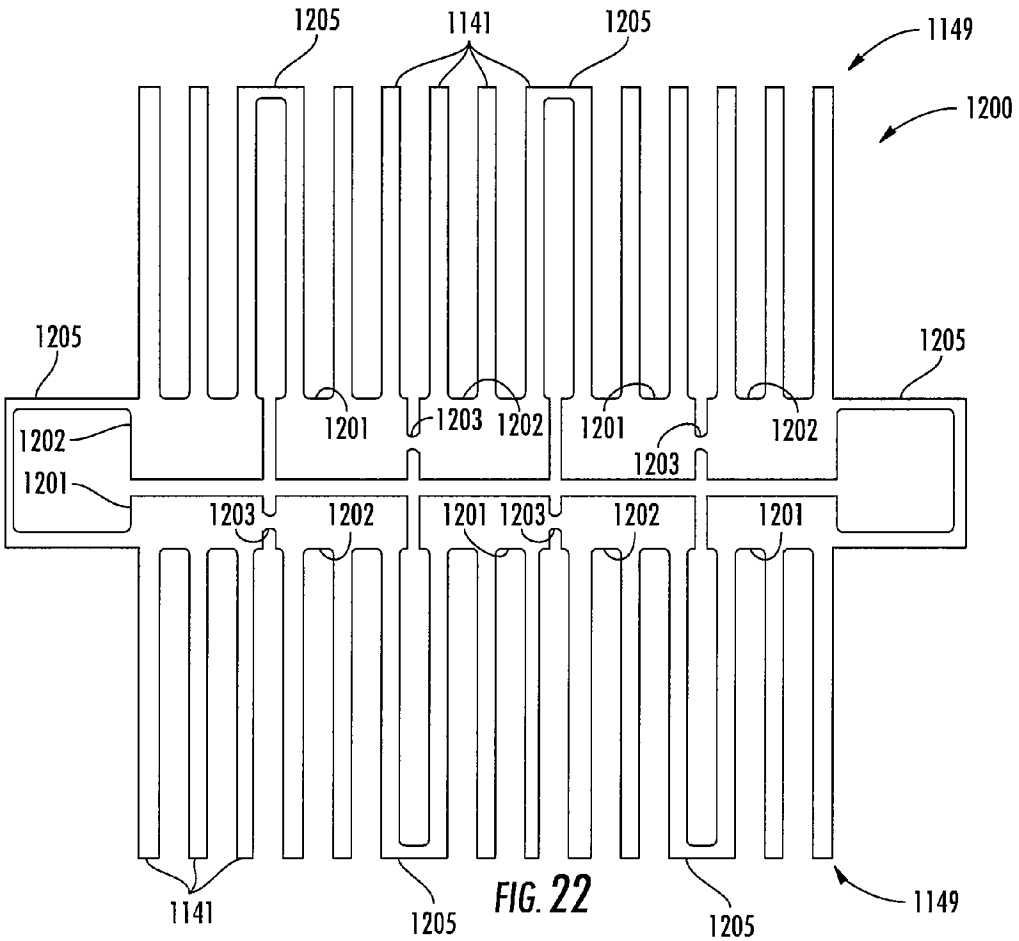
FIG. 22 is a plan view of a lead frame usable in embodiments of the LED assembly of the invention.
Figure 40:
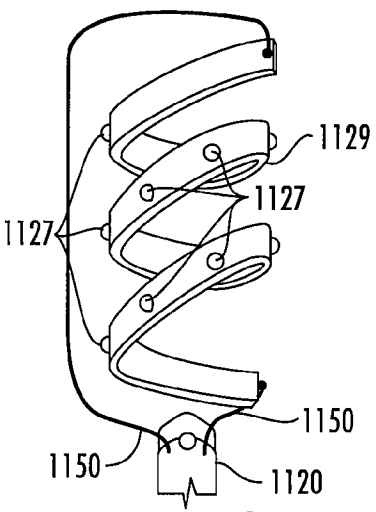
FIG. 40 is a schematic side view similar to FIG. 38 of yet another embodiment of the LED assembly usable in the lamp of FIG. 10.
Figure 39:
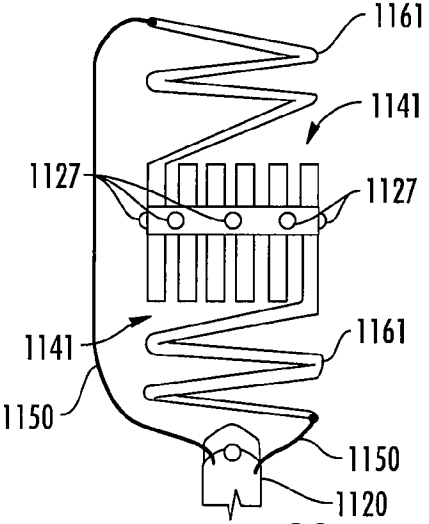
FIG. 39 is a schematic side view similar to FIG. 38 of still another embodiment of the LED assembly usable in the lamp of FIG. 10.
Figure 38:
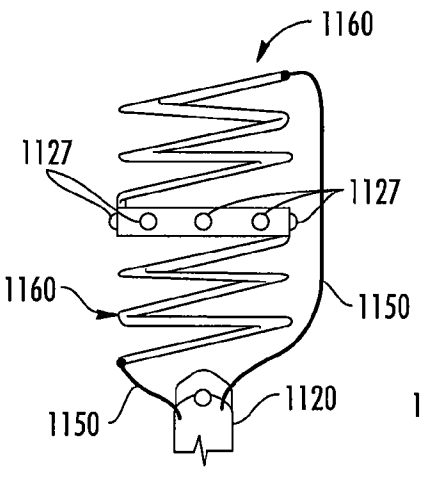
FIG. 38 is a schematic side view of still another embodiment of the LED assembly usable in the lamp of FIG. 10.

Another technique for increasing the thermal resistance of the electrical path between the heat source during the fusing operation and the LEDs 1127 is to connect the wires to an electrically conductive element that is remote from LEDs 1127 as shown in FIGS. 21 and 38 through 40. In these embodiments the length of wires 1150 may be relatively short but the electrical connection with the LEDs 1127 is made though an electrically conductive portion of the LED assembly 1130. In such an embodiment the length of the thermal path between the LEDs and the heat source is increased to thereby increase its thermal resistance without increasing the length of the wires 1150. This technique may be used in combination with making the cross-sectional area of the wires thinner and/or increasing the length of the wires 1150. FIG. 21 shows an embodiment where a heat sink structure comprises a plurality of extending fins where the electrical connection between the wires 1150 and the LEDs 1127 is made through selected ones of the fins 1161. In the embodiment of FIG. 38 the heat sink structure 1160 comprises a zigzag or helical shape where the electrical connection between wires 1150 and the LEDs 1127 is made through the length of these components. In the embodiment of FIG. 39 a heat sink structure comprising fins 1141 is provided in addition to a zigzag or helical shape connector 1161 where the electrical connection between wires 1150 and the LEDs 1127 is made through the length of connectors 1161. Connectors 1161 may also function as a heat sink. In the embodiment of FIG. 40 the submount 1129 has a helical or serpentine path where the LEDs 1127 are mounted along the length of the submount. The wires 1150 are connected to the submount 1129 at positions remote from the LEDs 1127 such that the thermal resistance of the path between the point of application and the LEDs is raised to acceptable limits. In all of these embodiments the wires 1150 may be provided with additional length to further increase the thermal resistance of the electrical connection.

Figure 16:
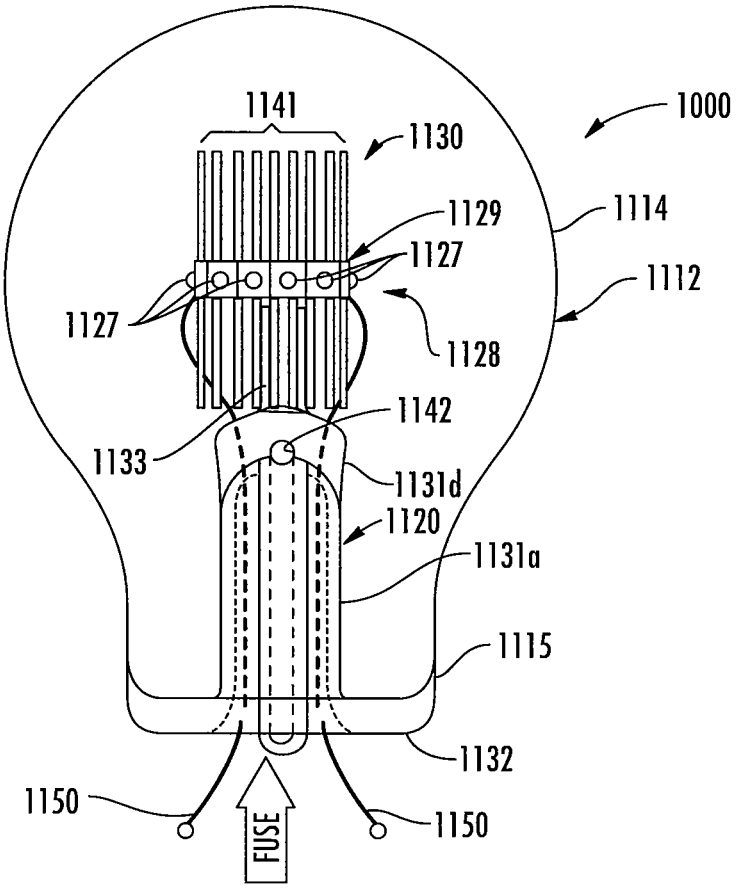
FIG. 16 is a side view of an embodiment of a stem and LED assembly fused to the enclosure of FIG. 11 showing the manufacture of the embodiment of FIG. 10.

Referring to FIG. 15, after the flange 1132 of stem part 1131 is fused to the enclosure 1112, gas such as helium, hydrogen or a non-explosive mixture of helium and hydrogen, or other thermal gas may be introduced into the enclosure through the passage 1126 and holes 1142. Typically, the enclosure 1112 is evacuated using nitrogen before the thermal gas is introduced. The gas may be introduced at pressures as previously described. After filling the enclosure with the thermal gas, the stem part portion 1131b is fused to close passage 1126 and seal the gas in the enclosure 1112 as shown in FIG. 16. The fusing of the stem removes the excess length of the stem part 1131 (portion 1131b) such that the neck 1115 may be secured to base 1102. The sealed enclosure 1112 is then attached to the base 1102 with the wires 1150 being connected to the electric path.

The steps described herein may be performed in an automated assembly line having rotary tables or other conveyances for moving the components between assembly stations.

While specific reference has been made with respect to an A-series lamp with an Edison base 1102 the structure and assembly method may be used on other lamps such as a PAR-style lamp such as a replacement for a PAR-38 incandescent bulb or a BR-style lamp. Moreover, while the use of a thermally conductive gas in the enclosure has been found to adequately manage heat, additional heat sinks may be provided if desired. For example heat conductive elements may be formed in or adjacent to the glass stem 1120 to conduct heat from the LEDs 1127 to the base 1102 where the heat may be dissipated by the base or an associated heat sink.

An embodiment of the LED assembly 1130 will be described with reference to FIGS. 22 through 30. In some embodiments, the submount 1129 of the LED assembly 1130 comprises a lead frame 1200 made of an electrically conductive material such as copper, copper alloy, aluminum, steel, gold, silver, alloys of such metals, thermally conductive plastic or the like. In one embodiment, the exposed surfaces of lead frame 1200 may be coated with silver or other reflective material to reflect light inside of enclosure 1112 during operation of the lamp. The lead frame 1200 comprises a series of anodes 1201 and cathodes 1202 arranged in pairs for connection to the LEDs 1127. In the illustrated embodiment five pairs of anodes and cathodes are shown for an LED assembly having five LEDs 1127; however, a greater or fewer number of anode/cathode pairs and LEDs may be used. Moreover, more than one lead frame may be used to make a single LED assembly 1130. For example, two of the illustrated lead frames may be used to make an LED assembly 1130 having ten LEDs.

Connectors 1203 connect the anode 1201 from one pair to the cathode 1202 of the adjacent pair to provide the electrical path between the pairs during operation of the LED assembly 1130. Typically, tie bars 1205 are also provided in the lead frame 1200 to hold the first portion of the lead frame to the second portion of the lead frame and to maintain the structural integrity of the lead frame during manufacture of the LED assembly. The tie bars 1205 are cut from the finished LED assembly and perform no function during operation of the LED assembly 1130. The lead frame 1200 also comprises a heat sink structure 1149 such as fins 1141 that are connected to the anodes 1201 and cathodes 1202 to conduct heat away from the LEDs and transfer the heat to the thermal gas in enclosure 1112 where the heat may be dissipated from the lamp. While a specific embodiment of fins 1141 is shown, the heat sink structure 1149 may have a variety of shapes, sizes and configurations. The lead frame 1200 may be formed by a stamping process and a plurality of lead frames may be formed in a single strip or sheet or the lead frames may be formed independently. In one method, the lead frame 1200 is formed as a flat member and is bent into a suitable three-dimensional shape such as a cylinder, sphere, polyhedra or the like to form LED assembly 1130. Because the lead frame 1200 is made of thin bendable material, and the anodes 1201 and cathodes 1202 may be positioned on the lead frame 1200 in a wide variety of locations, and the number of LEDs may vary, the lead frame 1200 may be configured such that it may be bent into a wide variety of shapes and configurations.

Figure 23:
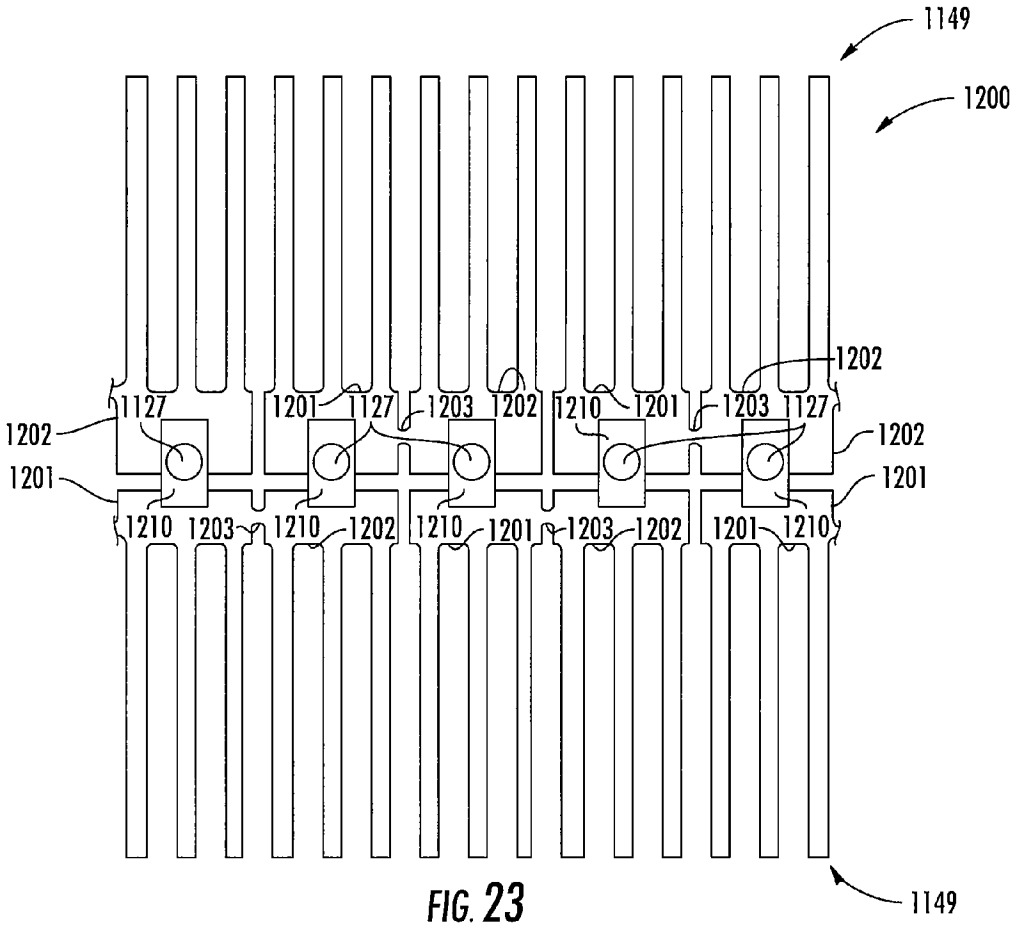
FIG. 23 is a plan view of a lead frame and LED packages usable in embodiments of the LED assembly of the invention.

Referring to FIG. 23, an LED package 1210 containing at least one LED 1127 is secured to each anode and cathode pair where the LED package 1210 spans the anode 1201 and cathode 1202. The LED packages 1210 may be attached to the lead frame 1200 by soldering. Once the LED packages 1210 are attached, the tie bars 1205 may be removed because the LED packages 1210 hold the first portion of the lead frame to the second portion of the lead frame.

Figure 24:
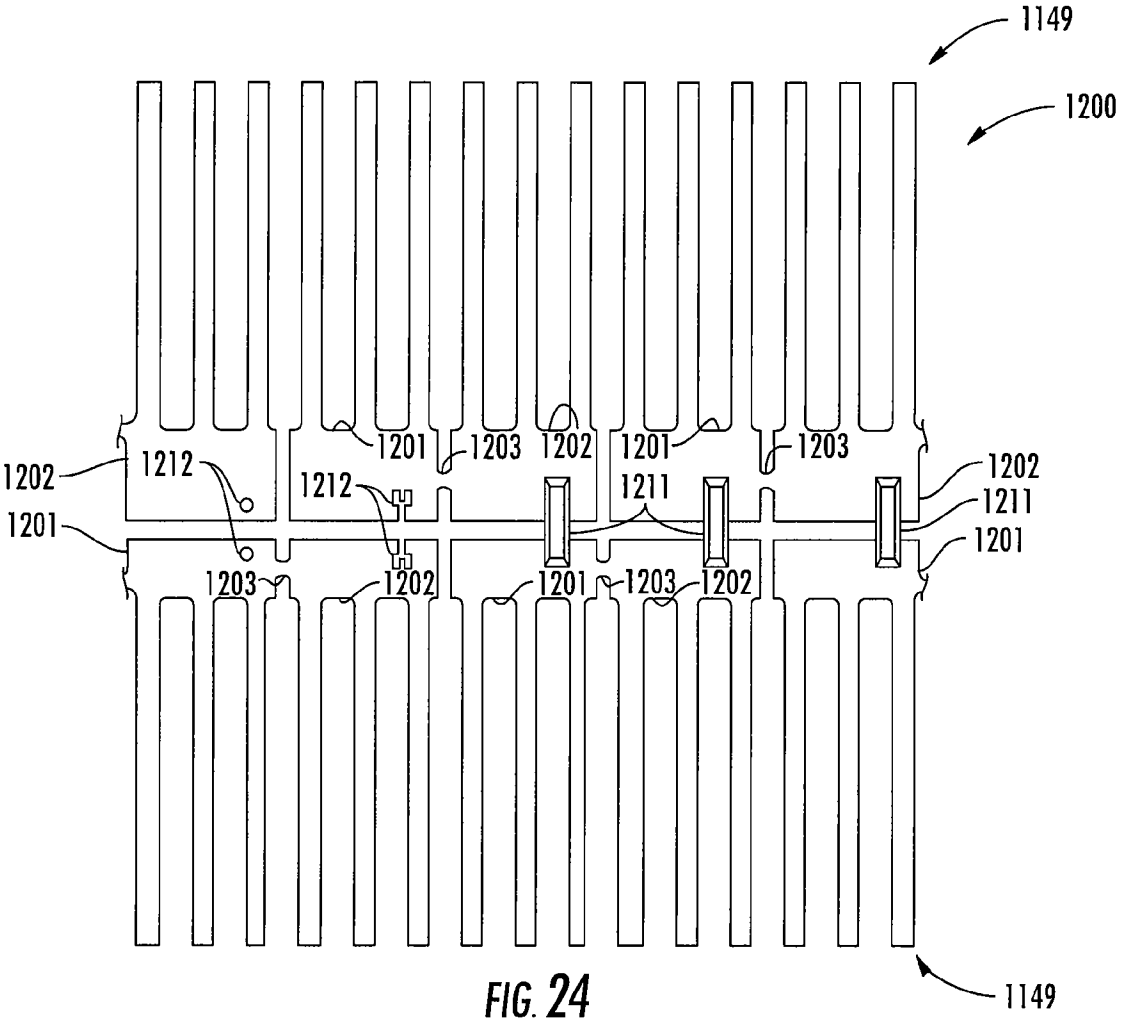
FIG. 24 is a plan view of an alternate embodiment of the lead frame usable in embodiments of the LED assembly of the invention.

In some embodiments, the LED packages 1210 may not hold the lead frame 1200 together with sufficient structural integrity. In some embodiments separate supports 1211 may be provided to hold the lead frame 1200 together as shown in FIG. 24. The supports 1211 may comprise non-conductive material attached between the anode and cathode pairs to secure the lead frame together. The supports 1211 may comprise insert molded or injection molded plastic members that tie the anodes 1201 and cathodes 1202 together. The lead frame 1200 may be provided with areas 1212 that receive the supports 1211 to provide holds that may be engaged by the supports. For example, the areas 1212 may comprise notches or through holes that receive the plastic flow during a molding operation. The supports 1211 may also be molded or otherwise formed separately from the lead frame 1200 and attached to the lead frame in a separate assembly operation such as by using a snap-fit connection, adhesive, fasteners, a friction fit, a mechanical connection or the like.

The LED packages 1210 may be secured to the lead frame 1200 before or after the supports 1211 are attached. While in the illustrated embodiments the supports 1211 are connected between the anodes 1201 and cathodes 1202 the supports 1211 may connect between other components such as portions of the heat sink structure 1149. The supports 1211 may be made of polyphthalamide white reflective plastic such as AMODEL® manufactured by Solvay Plastics. The material of the supports 1211 may preferably have the same coefficient of thermal expansion as the LED substrate of LED packages 1210 such that the LED packages and supports 1211 expand and contract at the same rate to prevent stresses from being created between the components. This may be accomplished using a liquid crystal polymer to make the supports 1211 with the desired engineered parameters The lead frame 1200 may be bent or folded such that the LEDs 1127 provide the desired light pattern in lamp 1000. In one embodiment the lead frame 1200 is bent into a cylindrical shape as shown, for example, in FIG. 25. The LEDs 1127 are disposed about the axis of the cylinder such that light is projected outward. The lead frame of FIG. 24 may be bent at connectors 1203 to form the three dimensional LED assembly shown in FIG. 25. The LEDs 1127 are arranged around the perimeter of the cylinder to project light radially.

Figure 43:
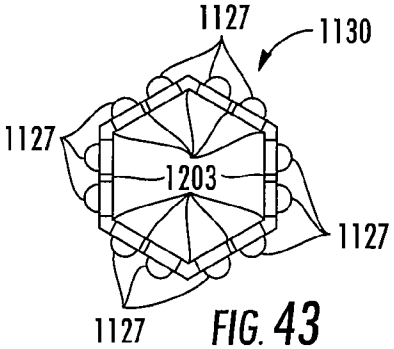
FIGS. 41 through 43 are end views of various embodiments of the LED assembly showing illustrative shapes.
Figure 42:
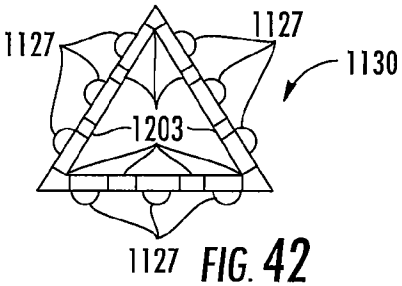
Figure 41:
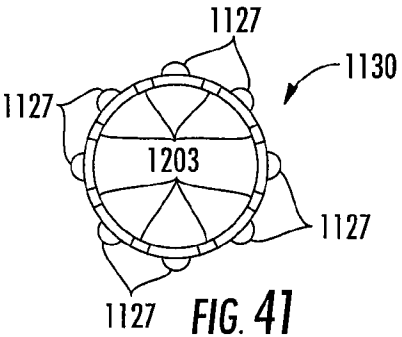

Because the lead frame 1200 is pliable and the LED placement on the lead frame may be varied, the lead frame may be formed and bent into a variety of configurations. FIG. 26 shows the lead frame 1200 such as used to make the LED assembly of FIG. 25 bent such that one of the LEDs (not shown) is angled toward the bottom of the LED assembly and another of the LEDs 1127' is angled toward the top of the LED assembly 1130 with the remaining LEDs projecting light radially from the cylindrical LED assembly. LEDs typically project light over less than 180 degrees such that tilting selected ones of the LEDs ensures that a portion of the light is projected toward the bottom and top of the lamp. Some LEDs project light through an angle of 120 degrees. By angling selected ones of the LEDs approximately 30 degrees relative to the axis of the LED assembly 1130 the light projected from the cylindrical array will project light over 360 degrees. The angles of the LEDs and the number of LEDs may be varied to create a desired light pattern. For example, FIG. 27 shows an embodiment of a three tiered LED assembly where each tier 1230, 1231 and 1232 comprises a series of a plurality of LEDs 1127 arranged around the perimeter of the cylinder. FIG. 28 shows an embodiment of a three tiered LED assembly where each tier 1230, 1231 and 1232 comprises a series of a plurality of LEDs 1127 arranged around the perimeter of the cylinder. Selected ones of the LEDs 1127a, 1127b are angled with respect to the LED array to project a portion of the light along the axis of the cylindrical LED assembly toward the top and bottom of the LED assembly. FIG. 29 shows an embodiment of an LED assembly shaped into a polyhedron with the heat sink structure removed for clarity. FIG. 30 shows an embodiment of the LED array arranged as a double helix with two series of LED packages each arranged in series to form a helix shape. In the embodiments of FIGS. 25 through 28 the lead frame is formed to have a generally cylindrical shape; however, the lead frame may be bent into a variety of shapes. FIG. 41 shows an end view of an LED assembly 1130 bent to have a generally cylindrical shape similar to that of FIG. 25. FIG. 42 shows an end view of a LED assembly 1130 bent to have a generally triangular shape and FIG. 43 shows an end view of a LED assembly 1130 bent to have a generally hexagonal shape. The LED assembly 1130 may have any suitable shape and the lead frame 1300 may be bent into any suitable shape including any polygonal shape or even more complex shapes such as shown in FIG. 29.

Another embodiment of a lead frame is shown in FIGS. 61 through 64. The lead frame 1500 may be made of an electrically conductive material such as copper, copper alloy, nickel plated copper, aluminum, steel, gold, silver, alloys of such metals, thermally conductive plastic or the like. In one embodiment, the exposed surfaces of lead frame 1500 may be coated with silver or other reflective material to reflect light inside of enclosure 1112 during operation of the lamp. The lead frame 1500 comprises a series of anodes 1501 and cathodes 1502 arranged in pairs for connection to the LEDs 1127. The mounting areas for the LEDs are identified by the squares 1503. The LEDs are not shown in FIGS. 61 through 64 to more clearly illustrate the configuration of the lead frame. In the illustrated embodiment ten pairs of anodes and cathodes are shown each arranged to be connected to two LEDs such that the illustrated lead frame is for an LED assembly having 20 LEDs 1127; however, a greater or fewer number of anode/cathode pairs and LEDs may be used. Moreover, more than one lead frame may be used to make a single LED assembly 1130. For example, two of the illustrated lead frames may be used to make an LED assembly 1130 having forty LEDs.

The anodes 1501 are connected to the cathodes 1502 by the LEDs to provide the electrical path between the pairs during operation of the LED assembly 1130. Typically, tie bars 1505 are also provided in the lead frame 1500 to hold the portions of the lead frame together and to maintain the structural integrity of the lead frame during manufacture of the LED assembly. The tie bars 1505 are cut from the finished LED assembly and perform no function during operation of the LED assembly 1130. The tie bars may be located at other locations and a greater or fewer number of tie bars may be used.

The lead frame 1500 also comprises a heat sink structure 1549 such as fins 1541 that are connected to the anodes 1501 and cathodes 1502 to conduct heat away from the LEDs and transfer the heat to the thermal gas in enclosure 1112 where the heat may be dissipated from the lamp. While a specific embodiment of fins 1541 is shown, the heat sink structure 1549 may have a variety of shapes, sizes and configurations. The lead frame 1500 may be formed by a stamping process and a plurality of lead frames may be formed in a single strip or sheet or the lead frames may be formed independently. In one method, the lead frame 1500 is formed as a flat member and is bent into a suitable three-dimensional shape such as a cylinder, sphere, polyhedra or the like to form LED assembly 1130. Because the lead frame 1500 is made of thin bendable material, and the anodes 1501 and cathodes 1502 may be positioned on the lead frame 1500 in a wide variety of locations, and the number of LEDs may vary, the lead frame 1500 may be configured such that it may be bent into a wide variety of shapes and configurations. In one embodiment the lead frame is approximately 10-12 thousandths of an inch thick.

An LED package containing at least one LED 1127 is secured to each anode and cathode pair where the LED package spans the anode 1501 and cathode 1502. The LED packages are located in the squares 1503. The LED packages may be attached to the lead frame 1500 by soldering. Once the LED packages are attached, the tie bars 1505 may be removed because the LED packages 1510 hold the portions of the lead frame together.

Figure 61:
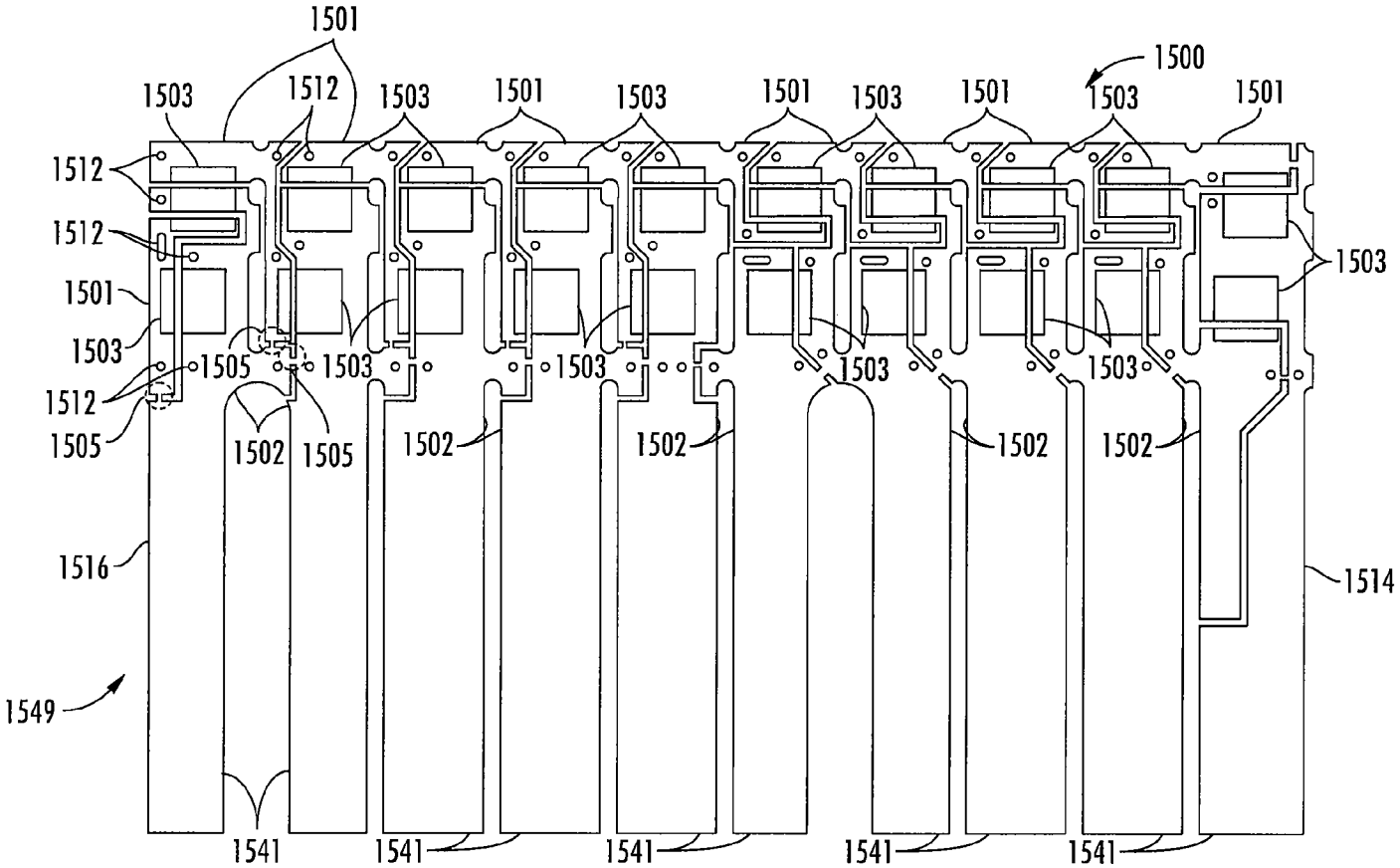
FIG. 61 is a plan view of another embodiment of a substrate usable in embodiments of the LED assembly of the invention.
Figure 62:
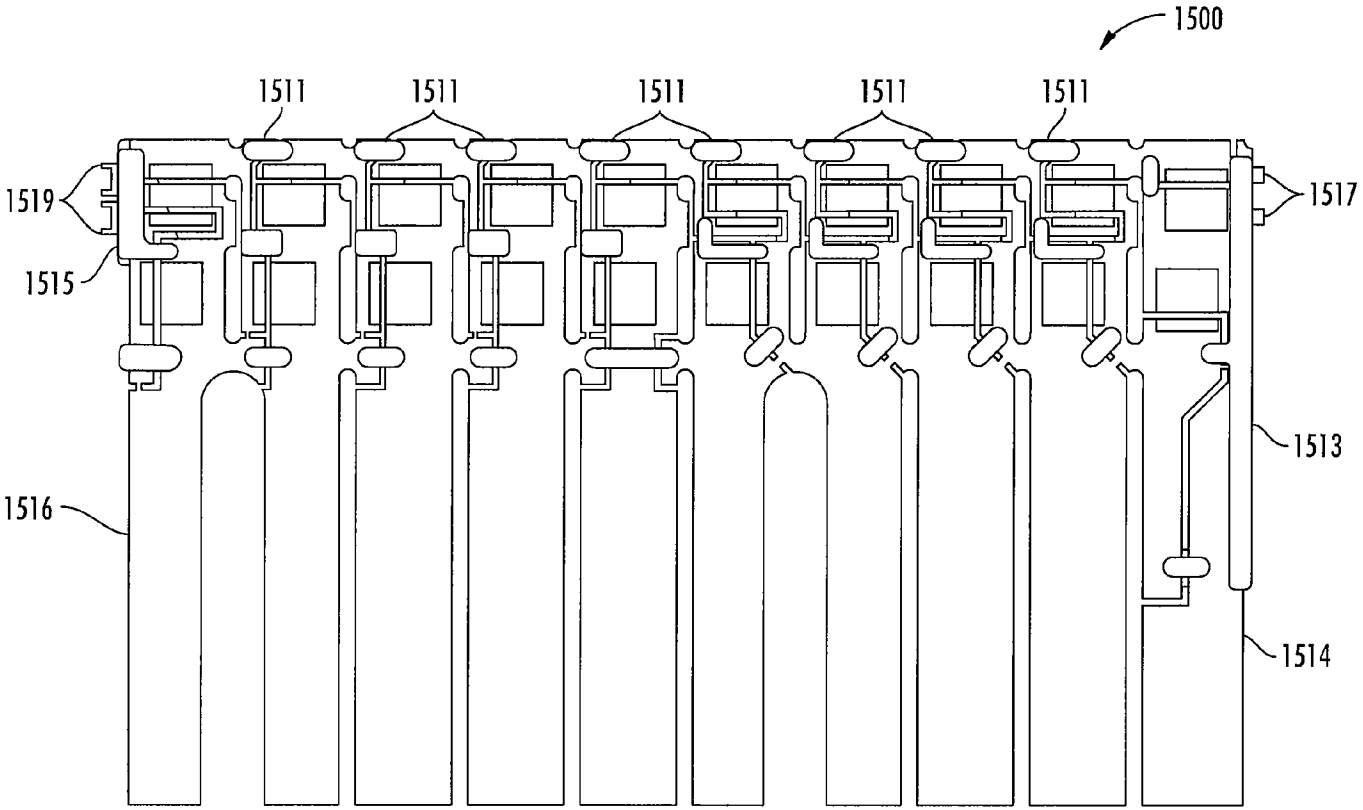
FIG. 62 is a front view similar to FIG. 61 showing the plastic supports mounted on the substrate.
Figure 63:
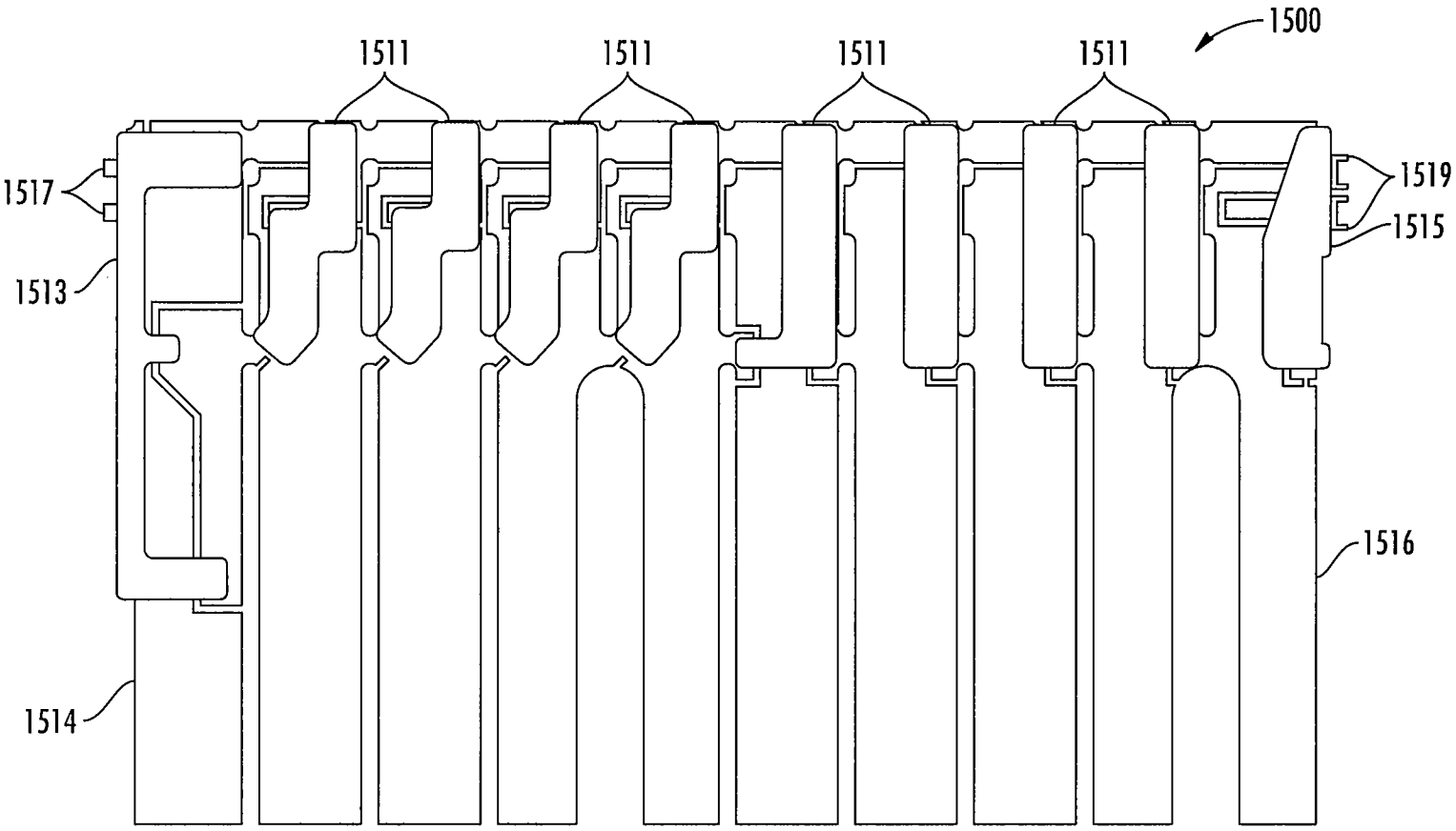
FIG. 63 is a back view of the substrate and supports of FIG. 62.

Referring to FIGS. 62 and 63, in some embodiments, separate stiffeners or supports 1511 may be provided to hold the lead frame 1500 together. The supports 1511 may comprise non-conductive material attached between the anode and cathode pairs to secure the lead frame together. The supports 1511 may comprise insert molded or injection molded plastic members that tie the anodes 1501 and cathodes 1502 together. The lead frame 1500 may be provided with pierced areas 1512 that receive the supports 1511 to provide holds that may be engaged by the supports as shown in FIG. 61. For example, the areas 1512 may comprise through holes that receive the plastic flow during a molding operation. The supports 1511 may also be molded or otherwise formed separately from the lead frame 1200 and attached to the lead frame in a separate assembly operation such as by using a snap-fit connection, adhesive, fasteners, a friction fit, a mechanical connection or the like.

The plastic material extends through the pierced areas 1212 to both sides of the lead frame 1200 such that the plastic material bridges the components of the lead from to hold the components of the lead frame together after the tie bars 1205 are cut. The supports 1211 on the outer side of the lead frame 1200 (the term "outer" as used herein is the side of the lead frame to which the LEDs are attached) comprises a minimum amount of plastic material such that the outer surface of the lead frame is largely unobstructed by the plastic material (FIG. 62). The plastic material should avoid the mounting areas 1503 for the LEDs such that the LEDs have an unobstructed area at which the LEDs may be attached to the lead frame. On the inner side of the lead frame (the term "inner" as used herein is the side of the lead frame opposite the side to which the LEDs are attached) the application of the plastic material may mirror the size and shape of the supports on the outer side; however, the supports on the inner side does need to be as limited such that the supports 1211 may comprise larger plastic areas and a greater area of the lead frame may be covered (FIG. 63).

Further, referring to FIG. 62 a first plastic overhang 1513 may be provided on a first lateral edge 1514 of the lead frame and a second plastic overhang 1515 is provided on a second lateral edge 1516 of the lead frame. Because, in one embodiment the flat lead frame 1500 is bent to form a three-dimensional LED assembly, it may be necessary to electrically isolate the two ends of the lead frame 1500 from one another in the assembled LED assembly where the two ends have different potentials. In the illustrated embodiment, the lead frame 1500 is bent to form a cylindrical LED assembly where the lateral edges 1514 and 1516 of the lead frame are brought in close proximity relative to one another. The plastic overhangs 1513 and 1515 are arranged such that the two edges of the lead frame are physically separated and electrically insulated from one another by the overhangs. In the illustrated embodiment, the overhangs 1513 and 1515 are provided along a portion of the two edges 1514 and 1516 of the lead frame; however, the plastic insulating overhangs may extend over the entire side edges of the lead frame and the length and thickness of the overhangs depends upon the amount of insulation required for the particular application.

In addition to electrically insulating the edges of the lead frame, the plastic overhangs 1513 and 1515 may be used to join the edges 1514 and 1516 of the lead frame 1500 together in the three dimensional LED assembly. One of the overhangs may be provided with a first connector or connectors 1517 that mates with a second connector or connectors 1519 provided on the second overhang. The first connectors may comprise a male or female member and the second connectors may comprise a mating female or male member. Because the overhangs are made of plastic the connectors may comprise deformable members that create a snap-fit connection. The mating connectors formed on the first overhang 1513 and second overhang 1515 may be engaged with one another to hold the lead frame in the final configuration.

Figure 64:
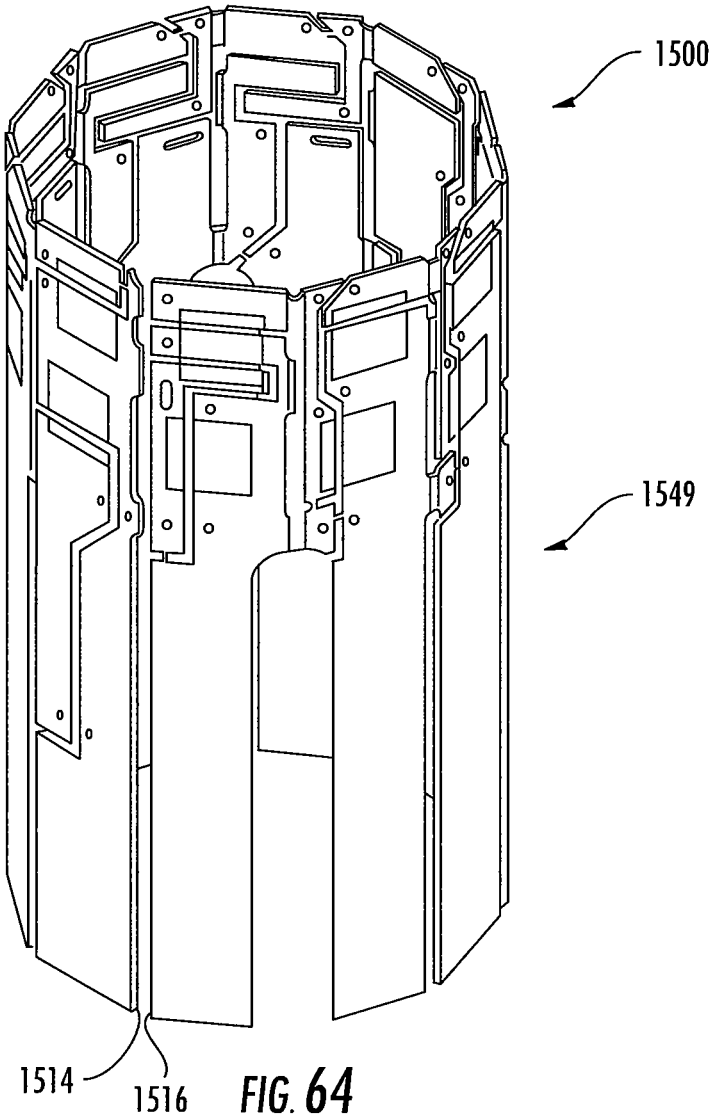
FIG. 64 shows the substrate of FIG. 61 bent into a three-dimensional shape.

The LED packages 1210 may be secured to the lead frame 1500 before or after the supports 1511 are attached. While in the illustrated embodiments the supports 1511 are connected between the anodes 1501 and cathodes 1502 the supports 1511 may be connected between other components such as portions of the heat sink structure 1149. The supports 1511 may be made of polyphthalamide white reflective plastic such as AMODEL® manufactured by Solvay Plastics. The material of the supports 1511 may preferably have the same coefficient of thermal expansion as the LED substrate of LED packages 1210 such that the LED packages and supports 1511 expand and contract at the same rate to prevent stresses from being created between the components. This may be accomplished using a liquid crystal polymer to make the supports 1511 with the desired engineered parameters The lead frame 1500 may be bent or folded such that the LEDs 1127 provide the desired light pattern in lamp 1000. In one embodiment the lead frame 1500 is bent into a cylindrical shape as shown in FIG. 64. The LEDs 1127 are disposed about the axis of the cylinder such that light is projected outward.

Another alternate embodiment of LED assembly 1130 is shown in FIGS. 31 through 36. In this embodiment and in the embodiment of FIGS. 50 and 51 the submount comprises a metal core board 1300 such as a metal core printed circuit board (MCPCB). The metal core board comprises a thermally and electrically conductive core 1301 made of aluminum or other similar pliable metal material. The core 1301 is covered by a dielectric material 1302 such as polyimide. Metal core boards allow traces to be formed therein. In one method, the core board 1300 is formed as a flat member and is bent into a suitable shape such as a cylinder, sphere, polyhedra or the like. Because the core board 1300 is made of thin bendable material and the anodes, and cathodes may be positioned in a wide variety of locations, and the number of LED packages may vary, the lead frame may be configured such that it may be bent into a wide variety of shapes and configurations.

Figure 31:
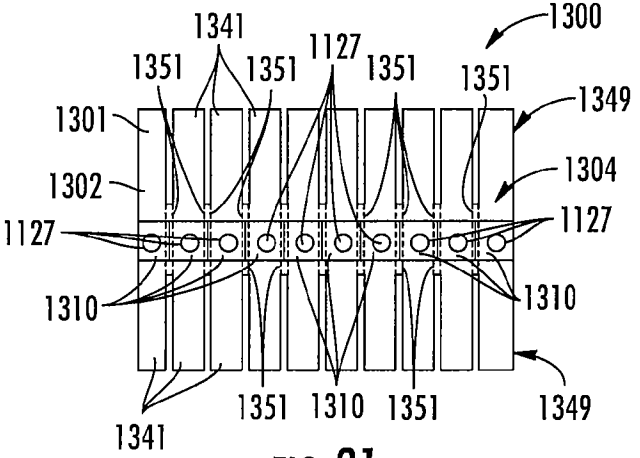
FIG. 31 is a plan view of a core board configuration usable in embodiments of the LED assembly of the invention.
Figure 32:
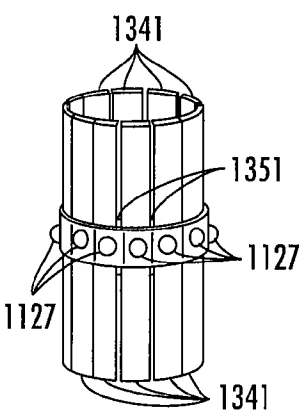
FIG. 32 is a perspective view of a core board configuration usable in embodiments of the LED assembly of the invention.
Figure 33:
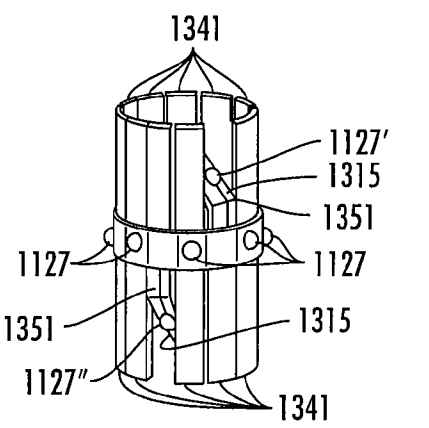
FIG. 33 is a perspective view of another core board configuration usable in embodiments of the LED assembly of the invention.
Figure 34:
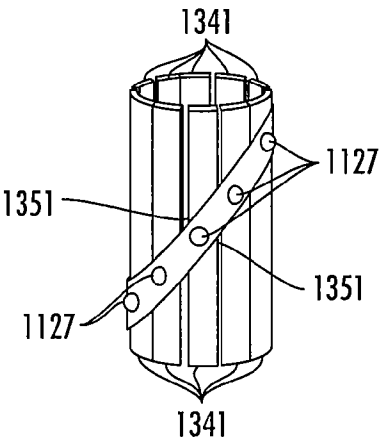
FIG. 34 is a perspective view of yet another core board configuration usable in embodiments of the LED assembly of the invention.
Figure 35:
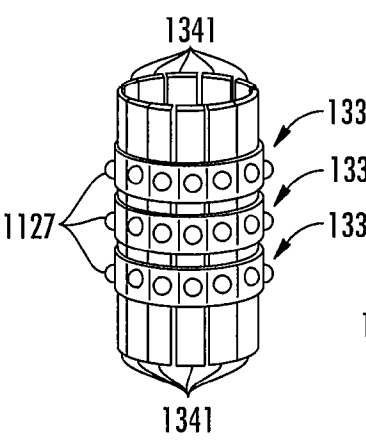
FIG. 35 is a perspective view of still another core board configuration usable in embodiments of the LED assembly of the invention.
Figure 36:
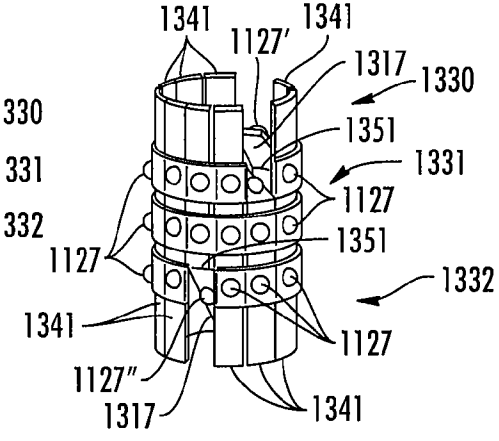
FIG. 36 is a perspective view of yet another core board configuration usable in embodiments of the LED assembly of the invention.

In one embodiment the core board 1300 is formed as a flat member having a central band 1304 on which the LED packages 1310 containing LEDs 1127 are mounted as shown in FIG. 31. A heat sink structure 1349 such as a plurality of fins 1341 or other heat dissipating elements extend from the central band. The central band 1304 is divided into sections by thinned areas or score lines 1351. The LED packages 1310 are located on the sections such that the core board 1300 may be bent along the score lines 1351 to form the planar core board into a variety of three-dimensional shapes where the shape is selected to project a desired light pattern from the lamp 1000. In the illustrated embodiment, a fin extends from each side of the sections such that the sections may be bent relative to one another along the score lines 1351 to create a cylindrical LED assembly as shown in FIG. 32. Moreover, the LEDs or selected ones of the LEDS 1127', 1127" may be located on portions 1315 of the metal core board 1300 that are bent such that the light is projected more axially as shown in FIG. 33. The LEDs 1127 may be placed on the core board 1300 to form a helix or other pattern as shown in FIG. 34. FIG. 35 shows an embodiment of a three tiered LED assembly where each tier 1330, 1331 and 1332 comprises a series of LEDs 1127. FIG. 36 shows a three tiered system where selected ones of the LEDs 1127', 1127" are mounted on sections 1317 of the core board 1317 that are angled with respect to the LED array to project a portion of the light along the axis of the LED assembly. In the embodiments of FIGS. 32 through 36 the core board 1300 is formed to have a generally cylindrical shape; however, the core board may be bent into a variety of shapes. FIG. 41 shows an end view of an LED assembly 1130 bent to have a generally cylindrical shape similar to that of FIG. 32. FIG. 42 shows an end view of a LED assembly 1130 bent to have a generally triangular shape and FIG. 43 shows an end view of a LED assembly 1130 bent to have a generally hexagonal shape. The LED assembly 1130 may have any suitable shape and the core board 1300 may be bent into any suitable shape including any polygonal shape or even more complex shapes.

Figure 47:
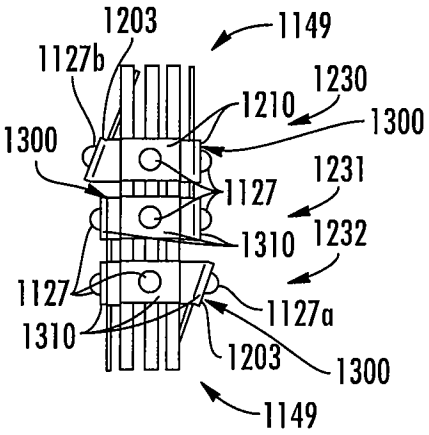
FIG. 47 is a side view of still another metal core board/lead frame configuration usable in embodiments of the LED assembly of the invention.
Figure 46:
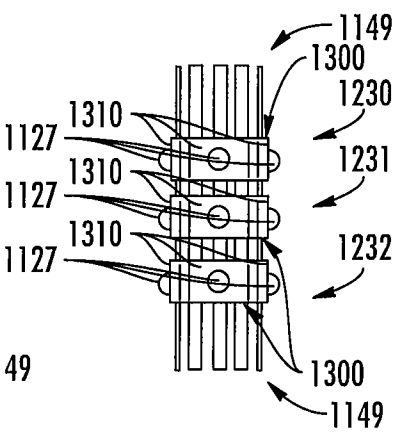
FIG. 46 is a side view of yet another metal core board/lead frame configuration usable in embodiments of the LED assembly of the invention.
Figure 45:
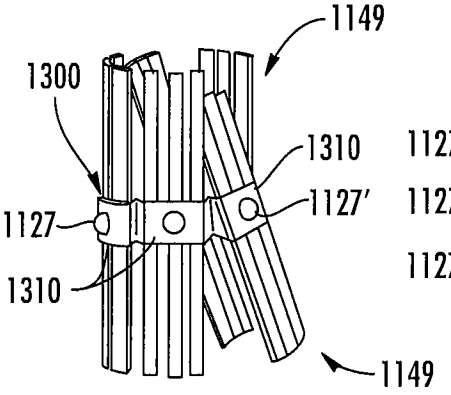
FIG. 45 is a perspective view of another metal core board/lead frame configuration usable in embodiments of the LED assembly of the invention.
Figure 44:
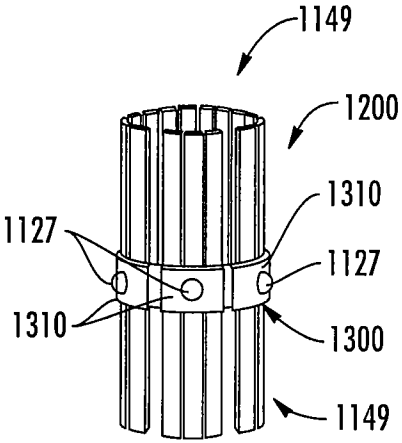
FIG. 44 is a perspective view of a metal core board/lead frame configuration usable in embodiments of the LED assembly of the invention.

Referring to FIGS. 44 through 47 alternate embodiments of the LED assembly is shown. In some embodiments, the LED assembly 1130 comprises a hybrid of a metal core board 1300 on which the LED packages 1310 containing LEDs 1127 are mounted where the metal core board 1300 may be thermally and/or electrically coupled to a lead frame structure 1200. The lead frame 1200 forms the heat sink structure or spreaders 1149 that are attached to the back side of the metal core printed circuit board 1300. Both the lead frame 1200 and the metal core board 1300 may be bent into the various configurations discussed herein. The metal core board 1300 may be provided with score lines or reduced thickness areas 1351 as previously described with reference to FIG. 31 to facilitate the bending of the core board. In one example embodiment, FIG. 44 shows the LED assembly bent into a generally cylindrical shape. In another example embodiment, FIG. 45 shows the LED assembly bent into a generally cylindrical shape where at least some of the LEDs 1127' are mounted so as to project light along the axis of the cylinder. In another example embodiment, FIG. 46 shows the LED assembly bent into a generally cylindrical shape where three tiers 1230, 1231 and 1232 of core boards 1300 and LEDs 1127 are used. In another example embodiment, FIG. 47 shows the LED assembly bent into a generally cylindrical shape where three tiers 1230, 1231 and 1232 of core boards 1300 and LEDs 1127 are used and at least some of the LEDs 1127a and 1127b are mounted so as to project light along the axis of the cylinder. In addition to this hybrid version, the LED assembly may also comprise a PCB made with FR4 and thermal vias rather than the metal core board where the thermal vias are then connected to lead frame based heat spreaders. In such embodiments arrangement the LED assembly may be formed as shown in FIGS. 44 through 47.

Another embodiment of LED assembly 1130 is shown in FIG. 37. LED assembly 1130 comprises an extruded submount 1400 which may be formed of aluminum or copper or other similar material. A flex circuit or board 1401 is mounted on the extruded submount that supports LEDs 1127. A plurality of heat sinks such as fins 1441 are extruded with the submount 1400 and may be located inside of the submount. The extruded submount may comprise a variety of shapes such as illustrated in FIGS. 41 through 43 and the heat sinks such as fins 1441 may have any suitable shape and may be located on the outside surface of the submount. A gas movement device 1116 may be located in the interior of the submount 1400 to move the gas over the fins 1300.

The LED assembly, whether made of a lead frame submount, metal core board submount, or a hybrid combination of metal core board/lead frame or a PCB made with FR4/lead frame may be formed to have any of the configurations shown herein or other suitable three-dimensional geometric shape. The LED assembly may be advantageously bent into any suitable three-dimensional shape. A "three-dimensional" LED assembly as used herein and as shown in the drawings means an LED assembly where the substrate comprises mounting surfaces for different ones of the LEDs that are in different planes such that the LEDs mounted on those mounting surfaces are also oriented in different planes. In some embodiments the planes are arranged such that the LEDs are disposed over a 360 degree range. The substrate may be bent from a flat configuration, where all of the LEDs are mounted in a single plane on a generally planar member, into a three-dimensional shape where different ones of the LEDs and LED mounting surfaces are in different planes.

As previously mentioned, at least some embodiments of the invention make use of a submount on which LED devices are mounted. In some embodiments, power supply or other LED driver components can also be mounted on the submount. A submount in example embodiments is a solid structure, which can be transparent, semi-transparent, diffusively transparent or translucent. A submount with any of these optical properties or any similar optical property can be referred to herein as optically transmissive. Such a submount may be a paddle shaped form, with two sides for mounting LEDs. If the submount is optically transmissive, light from each LED can shine in all directions, since it can pass through the submount. A submount for use with embodiments of the invention may have multiple mounting surfaces created by using multiple paddle or alternatively shaped portions together. Notwithstanding the number of portions or mounting surfaces for LEDs, the entire assembly for mounting the LEDs may be referred to herein as a submount. An optically transmissive submount may be made from a ceramic material, such as alumina, or may be made from some other optically transmissive material such as sapphire. Many other materials may be used.

An LED array and submount as described herein can be used in solid-state lamps making use of thermic constituents other than a gas. A thermic constituent is any substance, material, structure or combination thereof that serves to cool an LED, an LED array, a power supply or any combination of these in a solid-state lamp. For example, an optically transmissive substrate with LEDs as described herein could be cooled by a traditional heatsink made of various materials, or such an arrangement could be liquid cooled. As examples, a liquid used in some embodiments of the invention can be oil. The oil can be petroleum-based, such as mineral oil, or can be organic in nature, such as vegetable oil. The liquid may also be a perfluorinated polyether (PFPE) liquid, or other fluorinated or halogenated liquid. An appropriate propylene carbonate liquid having at least some of the above-discussed properties might also be used. Suitable PFPE-based liquids are commercially available, for example, from Solvay Solexis S.p.A of Italy. Flourinert™ manufactured by the 3M Company in St. Paul, Minn., U.S.A. can be used as coolant.

As previously mentioned, the submount in a lamp according to embodiments of the invention can optionally include the power supply or driver or some components for the power supply or driver for the LED array. In some embodiments, the LEDs can actually be powered by AC. Various methods and techniques can be used to increase the capacity and decrease the size of a power supply in order to allow the power supply for an LED lamp to be manufactured more cost-effectively, and/or to take up less space in order to be able to be built on a submount. For example, multiple LED chips used together can be configured to be powered with a relatively high voltage. Additionally, energy storage methods can be used in the driver design. For example, current from a current source can be coupled in series with the LEDs, a current control circuit and a capacitor to provide energy storage. A voltage control circuit can also be used. A current source circuit can be used together with a current limiter circuit configured to limit a current through the LEDs to less than the current produced by the current source circuit. In the latter case, the power supply can also include a rectifier circuit having an input coupled to an input of the current source circuit.

Some embodiments of the invention can include a multiple LED sets coupled in series. The power supply in such an embodiment can include a plurality of current diversion circuits, respective ones of which are coupled to respective nodes of the LED sets and configured to operate responsive to bias state transitions of respective ones of the LED sets. In some embodiments, a first one of the current diversion circuits is configured to conduct current via a first one of the LED sets and is configured to be turned off responsive to current through a second one of the LED sets. The first one of the current diversion circuits may be configured to conduct current responsive to a forward biasing of the first one of the LED sets and the second one of the current diversion circuit may be configured to conduct current responsive to a forward biasing of the second one of the LED sets.

In some of the embodiments described immediately above, the first one of the current diversion circuits is configured to turn off in response to a voltage at a node. For example a resistor may be coupled in series with the sets and the first one of the current diversion circuits may be configured to turn off in response to a voltage at a terminal of the resistor. In some embodiments, for example, the first one of the current diversion circuits may include a bipolar transistor providing a controllable current path between a node and a terminal of a power supply, and current through the resistor may vary an emitter bias of the bipolar transistor. In some such embodiments, each of the current diversion circuits may include a transistor providing a controllable current path between a node of the sets and a terminal of a power supply and a turn-off circuit coupled to a node and to a control terminal of the transistor and configured to control the current path responsive to a control input. A current through one of the LED sets may provide the control input. The transistor may include a bipolar transistor and the turn-off circuit may be configured to vary a base current of the bipolar transistor responsive to the control input.

It cannot be overemphasized that with respect to the features described above with various example embodiments of a lamp, the features can be combined in various ways. For example, the various methods of including phosphor in the lamp can be combined and any of those methods can be combined with the use of various types of LED arrangements such as bare die vs. encapsulated or packaged LED devices. The embodiments shown herein are examples only, shown and described to be illustrative of various design options for a lamp with an LED array.

LEDs and/or LED packages used with an embodiment of the invention and can include light emitting diode chips that emit hues of light that, when mixed, are perceived in combination as white light. Phosphors can be used as described to add yet other colors of light by wavelength conversion. For example, blue or violet LEDs can be used in the LED assembly of the lamp and the appropriate phosphor can be in any of the ways mentioned above. LED devices can be used with phosphorized coatings packaged locally with the LEDs or with a phosphor coating the LED die as previously described. For example, blue-shifted yellow (BSY) LED devices, which typically include a local phosphor, can be used with a red phosphor on or in the optically transmissive enclosure or inner envelope to create substantially white light, or combined with red emitting LED devices in the array to create substantially white light. Such embodiments can produce light with a CRI of at least 70, at least 80, at least 90, or at least 95. By use of the term substantially white light, one could be referring to a chromacity diagram including a blackbody locus of points, where the point for the source falls within four, six or ten MacAdam ellipses of any point in the blackbody locus of points.

A lighting system using the combination of BSY and red LED devices referred to above to make substantially white light can be referred to as a BSY plus red or "BSY+R" system. In such a system, the LED devices used include LEDs operable to emit light of two different colors. In one example embodiment, the LED devices include a group of LEDs, wherein each LED, if and when illuminated, emits light having dominant wavelength from 440 to 480 nm. The LED devices include another group of LEDs, wherein each LED, if and when illuminated, emits light having a dominant wavelength from 605 to 630 nm. A phosphor can be used that, when excited, emits light having a dominant wavelength from 560 to 580 nm, so as to form a blue-shifted-yellow light with light from the former LED devices. In another example embodiment, one group of LEDs emits light having a dominant wavelength of from 435 to 490 nm and the other group emits light having a dominant wavelength of from 600 to 640 nm. The phosphor, when excited, emits light having a dominant wavelength of from 540 to 585 nm. A further detailed example of using groups of LEDs emitting light of different wavelengths to produce substantially while light can be found in issued U.S. Pat. No. 7,213,940, which is incorporated herein by reference.

Figure 4:
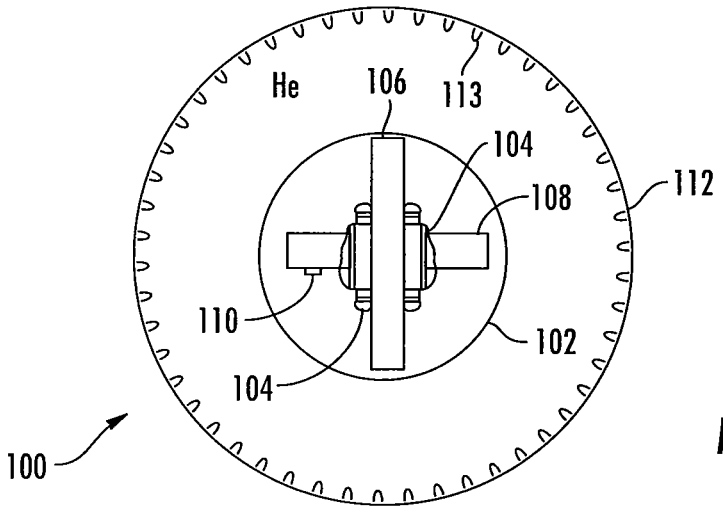
FIG. 4 is a top down view of the LED lamp of FIG. 1. Again, the optical enclosure of the lamp is shown as cross-sectioned so that the inter detail may be appreciated.
Figure 5:
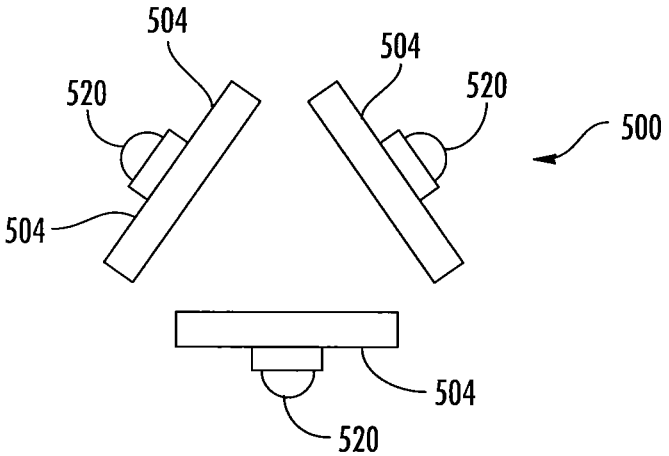
FIG. 5 is a top down view of a submount for an LED lamp according to additional embodiments of the invention.

FIGS. 4 and 5 are top views illustrating, comparing and contrasting two example submounts that can be used with embodiments of the invention. FIG. 4 is a top view of the LED lamp 100 of FIG. 1. LEDs 104, which are die encapsulated along with a phosphor to provide local wavelength conversion, are visible in this view, while other LEDs are obscured. The light transmissive submount portions 106 and 108 are also visible. Power supply or other driver components 110 are schematically shown on the bottom portion of the submount. As previously mentioned, enclosure 112 is, in some embodiments, a glass enclosure of similar shape to that commonly used in household incandescent bulbs. The glass enclosure is coated on the inside with silica 113 to provide diffusion, uniformity of the light pattern, and a more traditional appearance to the lamp. The enclosure is shown cross-sectioned so that the submount is visible, and the inside of the base of the lamp 102 is also visible in this top view.

FIG. 5 is a top view of another submount and LED array that can be used in a lamp according to example embodiments of the invention. Submount 500 has three identical portions 504 spaced evenly and symmetrically about a center point. Each has two LED devices, one of which is visible. LED devices 520 are individually encapsulated, each in a package with its own lens. In some embodiments, at least one of these devices is encapsulated with a phosphor by coating the lens of the LED package with a phosphor. With packaged LEDs like those shown, light is not normally emitted from the bottom of the package. Therefore there is less benefit in making the submount from optically transmissive material if packaged LEDs are used. Nevertheless, if the inside of the lamp or fixture includes reflective elements, it may still be desirable to use optically transmissive submounts to allow reflected light to pass through the submounts to produce a desired lighting pattern.

Figure 6A:
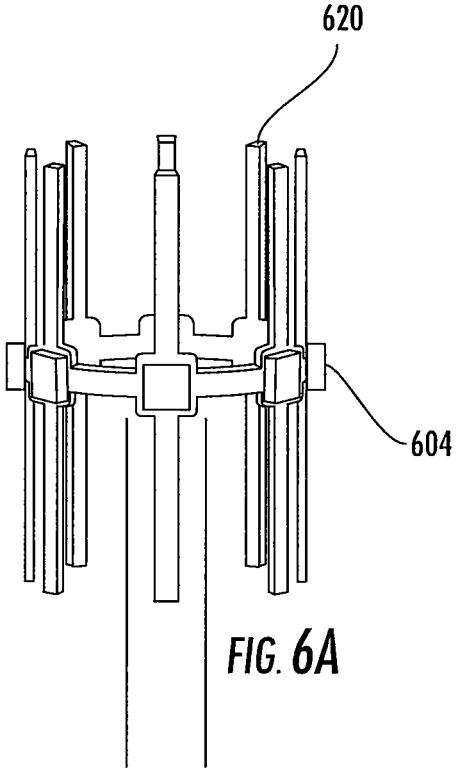
FIGS. 6A and 6B show an additional alternative for a submount for an LED lamp.
Figure 6B:
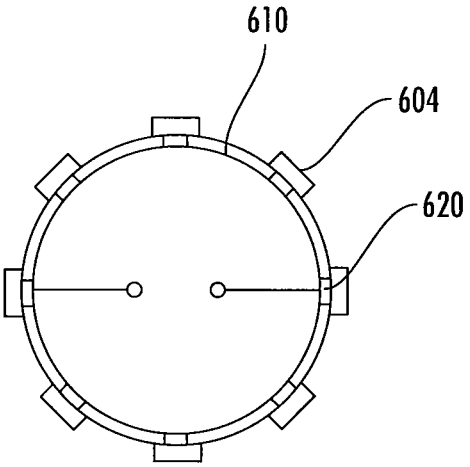

FIGS. 6A and 6B are a side view and a top view, respectively, illustrating an example submount that can be used with embodiments of the invention. LEDs 604 are dies which may be covered with a silicone or similar encapsulant (not shown) which may include a phosphor (not shown). The submount in this case is a wire frame structure 610 with "finger" portions 620 that provide additional coupling between the submount and gas within the optical enclosure or envelope of a lamp. In this and other examples where coupling mechanisms are used, the gas and the coupling mechanism together might be considered the thermic constituent for the lamp.

Figure 7A:
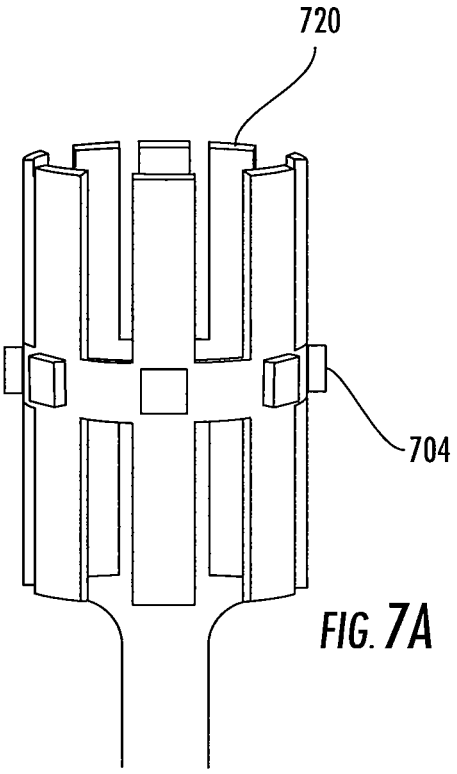
FIGS. 7A and 7B show a further alternative for a submount for an LED lamp.
Figure 7B:
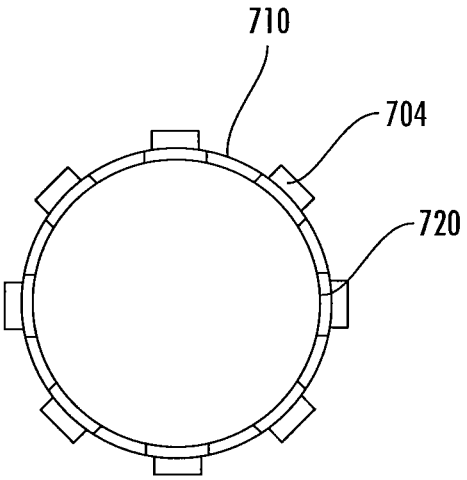

FIGS. 7A and 7B are a side view and a top view, respectively, illustrating another example submount that can be used with embodiments of the invention. LEDs 704 are dies which may be covered with a silicone or similar encapsulant (not shown) which may include a phosphor (not shown). The submount in this case is a printed circuit board structure 710 with "finger" portions 720 that provide additional coupling between the submount and gas within the optical enclosure or envelope of a lamp.

Figure 8:
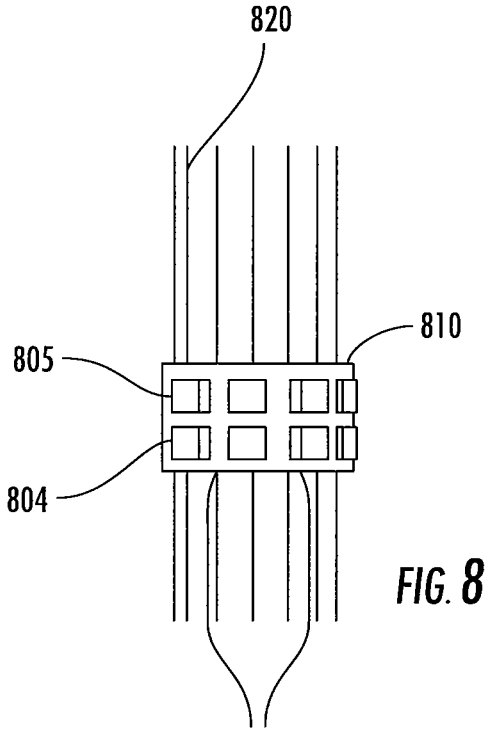
FIGS. 8 and 9 show further alternatives for submounts for and LED lamp according to example embodiments of the invention.

FIG. 8 is a side view, illustrating another example submount that can be used with embodiments of the invention. The LEDs in this case are arranged in two rows, which can optionally provide for combinations of different types of emitters. For example, LEDs 804 can which may be covered with a silicone or similar encapsulant (not shown) which may include a phosphor (not shown) to provide local wavelength conversion and LEDs 805 might have no such phosphor. The submount in this case is a printed circuit board structure 810 with metal fingers 820 attached to provide additional coupling between the submount and gas within the optical enclosure or envelope of a lamp.

Figure 9:
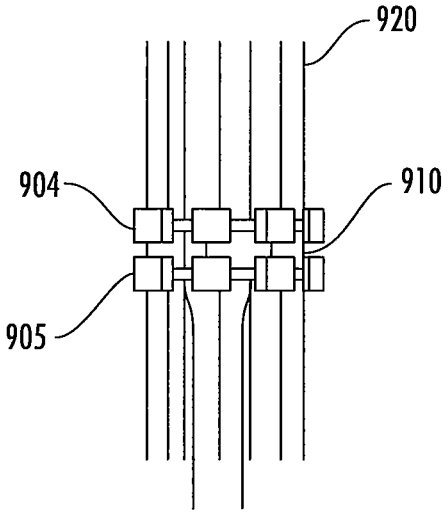

FIG. 9 is a side view, illustrating another example submount that can be used with embodiments of the invention. The LEDs are again arranged in two rows, which can optionally provide for combinations of different types of emitters. For example, LEDs 904 can which may be covered with a silicone or similar encapsulant (not shown) which may include a phosphor (not shown) to provide local wavelength conversion and LEDs 905 might have no such phosphor. The submount in this case is a wire frame structure 910 with metal fingers 920 to provide coupling between the submount and gas within the optical enclosure or envelope of a lamp.

The various parts of an LED lamp according to example embodiments of the invention can be made of any of various materials. A lamp according to embodiments of the invention can be assembled using varied fastening methods and mechanisms for interconnecting the various parts. For example, in some embodiments locking tabs and holes can be used. In some embodiments, combinations of fasteners such as tabs, latches or other suitable fastening arrangements and combinations of fasteners can be used which would not require adhesives or screws. In other embodiments, adhesives, solder, brazing, screws, bolts, or other fasteners may be used to fasten together the various components.

Although specific embodiments have been illustrated and described herein, those of ordinary skill in the art appreciate that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A lamp comprising:

an optically transmissive enclosure connected to a base to define an interior space;

an LED array disposed in the optically transmissive enclosure operable to emit light when energized through an electrical connection;

a gas contained in the enclosure to provide thermal coupling to the LED array; and a heat sink structure thermally coupled to the LED array for transmitting heat from the LED array to the enclosure primarily through the gas, wherein the heat sink structure is positioned entirely inside of the enclosure and *is* spaced from the base such that the heat sink structure is supported in the interior space at a distance from the enclosure of less than 8 mm.

2. The lamp of claim 1 where the LED array is disposed at one end of an LED assembly and the heat sink structure extends at least substantially to one side of the LED array.

3. The lamp of claim 1 wherein the heat sink structure comprises fins.

4. The lamp of claim 2 wherein the LED array is disposed toward a top of the LED assembly and the heat sink structure extends toward a bottom of the LED assembly.

5. The lamp of claim 1 wherein the LED array is disposed on an LED assembly and the LED assembly is supported on a glass stem where the heat sink structure at least partially surrounds the glass stem.

6. The lamp of claim 1 wherein the LED array is positioned such that it is disposed substantially in the center of the enclosure and the heat sink structure is offset to one side of the enclosure.

7. The lamp of claim 1 wherein the heat sink structure contacts the enclosure.

8. The lamp of claim 1 wherein the gas comprises helium.

9. The lamp of claim 1 wherein the gas comprises hydrogen.

[10. A lamp comprising:

an optically transmissive enclosure;

an LED array disposed in the optically transmissive enclosure to be operable to emit light when energized through an electrical connection;

a gas contained in the enclosure to provide thermal coupling to the LED array; and a heat sink structure thermally coupled to the LED array for transmitting heat from the LED array to the gas, where the heat sink structure comprises an outside surface that supports the LED array and faces the enclosure and an inside surface that faces away from the enclosure where the inside surface and the outside surface are surrounded by the gas.]

11. A lamp comprising:

an optically transmissive enclosure;

an LED array disposed in the optically transmissive enclosure to be operable to emit light when energized through an electrical connection, the LED array being thermally coupled to the enclosure; and an electrically insulating base comprising an upper part that is connected to *the* enclosure and a [separate] lower part *that is a separate component from the upper part and* that is joined to the upper part and an electrical connector connected to the lower part that forms part of the electrical connection to the LED assembly.

12. The lamp of claim 11 wherein the electrical connector comprises an Edison screw.

13. The lamp of claim 11 wherein the base has a relatively narrow proximal end that is secured to the enclosure where a diameter of the base gradually increases from the proximal end to a point along the base.

14. The lamp of claim 13 wherein a portion of the base with a larger diameter defines an internal space for receiving a power supply.

15. The lamp of claim 11 wherein the base has a relatively narrow proximal end that is secured to the enclosure where a diameter of the base gradually increases from the proximal end to a point along the base and the diameter of the base gradually narrows from the point to the electrical connector.

16. The lamp of claim 11 wherein an external surface of the base is formed by a smooth curved shape.

17. The lamp of claim 16 wherein the external surface of the base transitions from a relatively smaller concave portion to a relatively larger convex portion from the proximal end to the electrical connector.

[18. The lamp of claim 1 wherein the heat sink structure is spaced from the enclosure.]

*19. A lamp comprising: an optically transmissive sealed enclosure; an LED array disposed in the optically transmissive enclosure operable to emit light when energized through an electrical connection, the LED array forming part of an LED assembly comprising a light transmissive submount; a gas contained in the enclosure to provide thermal coupling to the LED array where the gas comprises oxygen, the gas surrounding the LED array such that heat is transmitted from the LED assembly primarily through the gas, and a gas movement device.*

*20. The lamp of claim 19 where the oxygen is provided in the enclosure in an amount that is sufficient to prevent degradation of the LED array.*

*21. The lamp of claim 19 where the gas comprises less than approximately 40% by volume of oxygen.*

*22. The lamp of claim 21 where the gas comprises a second thermally conductive gas.*

*23. The lamp of claim 22 where the second thermally conductive gas has a higher thermal conductivity than oxygen.*

*24. The lamp of claim 22 where the second thermally conductive gas comprises helium, the helium comprising at least 40% by volume of the gas.*

*25. The lamp of claim 19 where the gas has a thermal conductivity of about at least 87.5 mW/m-K.*

*26. The lamp of claim 19 where the lamp emits light equivalent to a 60 watt equivalent bulb and the gas comprises approximately 100% by volume of oxygen.*

*27. The lamp of claim 19 wherein the gas movement device comprises at least one of an electric fan, a rotary fan, a piezoelectric fan, corona or ion wind generator, and diaphragm pump.*

*28. The lamp of claim 19 where the lamp emits light equivalent to a 40 watt equivalent bulb and the gas comprises approximately 1-5% by volume of oxygen.*

*29. The lamp of claim 19 where the gas comprises at least approximately 4% by volume of oxygen.*

*30. The lamp of claim 19 where the gas comprises less than approximately 50% by volume of oxygen.*

*31. The lamp of claim 19 where the gas comprises less than approximately 5% by volume of oxygen.*

*32. The lamp of claim 19 where the gas comprises approximately 40-60% by volume of oxygen.*

*33. The lamp of claim 19 wherein the LED assembly is supported on a glass stem where the glass stem is fused to the enclosure.*

*34. The lamp of claim 19 wherein the LED assembly is supported on a glass stem where the glass stem is fused to the enclosure and wherein the electrical connection comprises a thermally resistive electrical path configured to prevent overtemperature of the LED array during fusing of the glass stem to the enclosure.*

* * * * *